US010312798B2

(12) United States Patent
Green et al.

(10) Patent No.: US 10,312,798 B2
(45) Date of Patent: Jun. 4, 2019

(54) POWER FACTOR CORRECTION CIRCUITS AND METHODS INCLUDING PARTIAL POWER FACTOR CORRECTION OPERATION FOR BOOST AND BUCK POWER CONVERTERS

(71) Applicant: Emerson Climate Technologies, Inc., Sidney, OH (US)

(72) Inventors: Charles E. Green, Fenton, MO (US); Joseph G. Marcinkiewicz, St. Peters, MO (US); Kraig Bockhorst, Lake St. Louis, MO (US)

(73) Assignee: EMERSON ELECTRIC CO., St. Louis, MO (US)

( * ) Notice: Subject to any disclaimer, the term of this patent is extended or adjusted under 35 U.S.C. 154(b) by 0 days.

(21) Appl. No.: 15/487,151

(22) Filed: Apr. 13, 2017

(65) Prior Publication Data
US 2017/0302159 A1   Oct. 19, 2017

Related U.S. Application Data

(60) Provisional application No. 62/398,641, filed on Sep. 23, 2016, provisional application No. 62/398,658, (Continued)

(51) Int. Cl.
*H02M 1/42* (2007.01)
*H02M 1/08* (2006.01)
(Continued)

(52) U.S. Cl.
CPC ............ *H02M 1/42* (2013.01); *F25B 49/025* (2013.01); *H02M 1/08* (2013.01); *H02M 1/14* (2013.01);
(Continued)

(58) Field of Classification Search
CPC ............ H02M 1/08; H02M 1/14; H02M 1/32; H02M 1/36; H02M 1/42; H02M 1/4208;
(Continued)

(56) References Cited

U.S. PATENT DOCUMENTS 4,388,578 A    6/1983   Green et al.
4,437,146 A *  3/1984   Carpenter ........... H02M 1/4225
                                                      323/222
(Continued)

FOREIGN PATENT DOCUMENTS

CN       103822334 A       5/2014
EP       0744816 A2       11/1996
(Continued)

OTHER PUBLICATIONS

Applicant-Initiated Interview Summary regarding U.S. Appl. No. 15/419,423 dated Aug. 9, 2018.
(Continued)

*Primary Examiner* — Timothy J. Dole
*Assistant Examiner* — Shahzeb K Ahmad
(74) *Attorney, Agent, or Firm* — Harness, Dickey & Pierce, P.L.C.

(57) ABSTRACT

A PFC circuit is provided. A bridge rectification circuit receives an AC voltage and generates a rectified AC voltage. A power converter converts the rectified AC voltage to a first DC voltage, where the power converter includes a switch and supplies the first DC voltage to a DC bus to power a compressor. A current sensor detects an amount of current. A control module, while operating in a correction mode: based on the rectified AC voltage, a phase angle of the rectified AC voltage, a second DC voltage of the DC bus, or the detected amount of current, control operation of the switch to transition between operating in a high activity mode and an inactive or low activity mode; transition the
(Continued)

switch between open and closed states while in the high and low activity modes; and maintain the power converter in an OFF state while in the inactive mode.

39 Claims, 18 Drawing Sheets

Related U.S. Application Data filed on Sep. 23, 2016, provisional application No. 62/323,607, filed on Apr. 15, 2016, provisional application No. 62/323,498, filed on Apr. 15, 2016, provisional application No. 62/323,505, filed on Apr. 15, 2016.

(51) Int. Cl.
| | |
|---|---|
| *H02M 1/14* | (2006.01) |
| *H02M 1/32* | (2007.01) |
| *H02M 1/44* | (2007.01) |
| *H02M 7/06* | (2006.01) |
| *F25B 49/02* | (2006.01) |
| *H02P 27/06* | (2006.01) |
| *H02M 5/458* | (2006.01) |
| *H02P 5/74* | (2006.01) |
| *H02M 1/00* | (2006.01) |
| *H02M 7/5387* | (2007.01) |

(52) U.S. Cl.
CPC ........... *H02M 1/32* (2013.01); *H02M 1/4225* (2013.01); *H02M 1/44* (2013.01); *H02M 5/458* (2013.01); *H02M 7/06* (2013.01); *H02P 5/74* (2013.01); *H02P 27/06* (2013.01); *F25B 2600/021* (2013.01); *F25B 2600/024* (2013.01); *F25B 2600/111* (2013.01); *F25B 2700/151* (2013.01); *H02M 1/4208* (2013.01); *H02M 1/4216* (2013.01); *H02M 7/53871* (2013.01); *H02M 2001/008* (2013.01); *H02M 2001/0009* (2013.01); *H02M 2001/0032* (2013.01); *H02M 2001/327* (2013.01); *H02M 2001/4291* (2013.01); *Y02B 30/741* (2013.01); *Y02B 30/743* (2013.01); *Y02B 70/126* (2013.01); *Y02B 70/16* (2013.01)

(58) Field of Classification Search
CPC .................. H02M 1/425; H02M 1/44; H02M 2001/0003; H02M 2001/0009; H02M 3/156; H02M 7/06; H02M 7/12; H02M 7/125; H02M 7/155; H02M 7/1555; H02M 7/21
See application file for complete search history.

(56) References Cited

U.S. PATENT DOCUMENTS

| | | |
|---|---|---|
| 4,504,922 A | 3/1985 | Johnson et al. |
| 4,939,473 A | 7/1990 | Eno |
| 5,367,617 A | 11/1994 | Goossen et al. |
| 5,410,360 A | 4/1995 | Montgomery |
| 5,493,101 A | 2/1996 | Innes |
| 5,506,484 A | 4/1996 | Munro et al. |
| 5,583,420 A | 12/1996 | Rice et al. |
| 5,594,635 A | 1/1997 | Gegner |
| 5,600,233 A | 2/1997 | Warren et al. |
| 5,754,036 A | 5/1998 | Walker |
| 5,801,516 A | 9/1998 | Rice et al. |
| 5,823,004 A | 10/1998 | Polley et al. |
| 5,903,130 A | 5/1999 | Rice et al. |
| 6,018,200 A | 1/2000 | Anderson et al. |
| 6,031,749 A | 2/2000 | Covington et al. |
| 6,115,051 A | 9/2000 | Simons et al. |
| 6,137,253 A | 10/2000 | Galbiati et al. |
| 6,158,887 A | 12/2000 | Simpson |
| 6,169,670 B1 | 1/2001 | Okubo et al. |
| 6,181,587 B1 | 1/2001 | Kuramoto et al. |
| 6,188,203 B1 | 2/2001 | Rice et al. |
| 6,215,287 B1 | 4/2001 | Matsushiro et al. |
| 6,239,523 B1 | 5/2001 | Janicek et al. |
| 6,249,104 B1 | 6/2001 | Janicek |
| 6,281,658 B1 | 8/2001 | Han et al. |
| 6,282,910 B1 | 9/2001 | Helt |
| 6,295,215 B1 | 9/2001 | Faria et al. |
| 6,307,759 B1 | 10/2001 | Inarida et al. |
| 6,309,385 B1 | 10/2001 | Simpson |
| 6,313,602 B1 | 11/2001 | Arefeen et al. |
| 6,384,579 B2 | 5/2002 | Watanabe |
| 6,433,504 B1 | 8/2002 | Branecky |
| 6,437,997 B1 | 8/2002 | Inarida et al. |
| 6,476,663 B1 | 11/2002 | Gauthier et al. |
| 6,483,265 B1 | 11/2002 | Hollenbeck et al. |
| 6,498,451 B1 | 12/2002 | Boules et al. |
| 6,515,437 B1 | 2/2003 | Zinkler et al. |
| 6,556,462 B1 | 4/2003 | Steigerwald et al. |
| 6,586,904 B2 | 7/2003 | McClelland et al. |
| 6,593,881 B2 | 7/2003 | Vail et al. |
| 6,629,776 B2 | 10/2003 | Bell et al. |
| 6,693,407 B2 | 2/2004 | Atmur |
| 6,693,409 B2 | 2/2004 | Lynch et al. |
| 6,710,573 B2 | 3/2004 | Kadah |
| 6,717,457 B2 | 4/2004 | Nanba et al. |
| 6,737,833 B2 | 5/2004 | Kalman et al. |
| 6,781,802 B2 | 8/2004 | Kato et al. |
| 6,801,028 B2 | 10/2004 | Kernahan et al. |
| 6,806,676 B2 | 10/2004 | Papiernik et al. |
| 6,810,292 B1 | 10/2004 | Rappenecker et al. |
| 6,859,008 B1 | 2/2005 | Seibel |
| 6,885,161 B2 | 4/2005 | de Nanclares et al. |
| 6,885,568 B2 | 4/2005 | Kernahan et al. |
| 6,900,607 B2 | 5/2005 | Kleinau et al. |
| 6,902,117 B1 | 6/2005 | Rosen |
| 6,906,500 B2 | 6/2005 | Kernahan |
| 6,906,933 B2 | 6/2005 | Taimela |
| 6,909,266 B2 | 6/2005 | Kernahan et al. |
| 6,930,459 B2 | 8/2005 | Fritsch et al. |
| 6,949,915 B2 | 9/2005 | Stanley |
| 6,952,089 B2 | 10/2005 | Matsuo |
| 6,961,015 B2 | 11/2005 | Kernahan et al. |
| 6,979,967 B2 | 12/2005 | Ho |
| 6,979,987 B2 | 12/2005 | Kernahan et al. |
| 6,984,948 B2 | 1/2006 | Nakata et al. |
| 7,015,679 B2 | 3/2006 | Ryba et al. |
| 7,053,569 B2 | 5/2006 | Takahashi et al. |
| 7,061,195 B2 | 6/2006 | Ho et al. |
| 7,068,016 B2 | 6/2006 | Athari |
| 7,068,191 B2 | 6/2006 | Kuner et al. |
| 7,071,641 B2 | 7/2006 | Arai et al. |
| 7,081,733 B2 | 7/2006 | Han et al. |
| 7,112,940 B2 | 9/2006 | Shimozono et al. |
| 7,135,830 B2 | 11/2006 | El-Ibiary |
| 7,148,664 B2 | 12/2006 | Takahashi et al. |
| 7,149,644 B2 | 12/2006 | Kobayashi et al. |
| 7,154,238 B2 | 12/2006 | Kinukawa et al. |
| 7,164,590 B2 | 1/2007 | Li et al. |
| 7,176,644 B2 | 2/2007 | Ueda et al. |
| 7,180,273 B2 | 2/2007 | Bocchiola et al. |
| 7,181,923 B2 | 2/2007 | Kurita et al. |
| 7,193,383 B2 | 3/2007 | Sarlioglu et al. |
| 7,202,626 B2 | 4/2007 | Jadric et al. |
| 7,208,891 B2 | 4/2007 | Jadric et al. |
| 7,221,121 B2 | 5/2007 | Skaug et al. |
| 7,239,257 B1 | 7/2007 | Alexander et al. |
| 7,256,564 B2 | 8/2007 | MacKay |
| 7,274,241 B2 | 9/2007 | Ho et al. |
| 7,309,977 B2 | 12/2007 | Gray et al. |
| 7,330,011 B2 | 2/2008 | Ueda et al. |
| 7,336,514 B2 | 2/2008 | Amarillas et al. |
| 7,339,346 B2 | 3/2008 | Ta et al. |
| 7,358,706 B2 | 4/2008 | Lys |
| 7,359,224 B2 | 4/2008 | Li |

(56) References Cited

U.S. PATENT DOCUMENTS

| | | |
|---|---|---|
| 7,425,806 B2 | 9/2008 | Schnetzka et al. |
| 7,459,864 B2 | 12/2008 | Lys |
| 7,463,006 B2 | 12/2008 | Ta et al. |
| 7,495,404 B2 | 2/2009 | Sarlioglu et al. |
| 7,508,688 B2 | 3/2009 | Virolainen |
| 7,532,491 B2 | 5/2009 | Lim et al. |
| 7,573,275 B2 | 8/2009 | Inagaki et al. |
| 7,592,820 B2 | 9/2009 | Laakso et al. |
| 7,598,698 B2 | 10/2009 | Hashimoto et al. |
| 7,612,522 B2 | 11/2009 | Williams et al. |
| 7,613,018 B2 | 11/2009 | Lim et al. |
| 7,616,466 B2 | 11/2009 | Chakrabarti et al. |
| 7,633,249 B2 | 12/2009 | Sekimoto et al. |
| 7,650,760 B2 | 1/2010 | Nakata et al. |
| 7,659,678 B2 | 2/2010 | Maiocchi |
| 7,667,986 B2 | 2/2010 | Artusi et al. |
| 7,671,557 B2 | 3/2010 | Maeda et al. |
| 7,675,759 B2 | 3/2010 | Artusi et al. |
| 7,723,964 B2 | 5/2010 | Taguchi |
| 7,750,595 B2 | 7/2010 | Yamada et al. |
| 7,771,115 B2 | 8/2010 | Pan |
| 7,847,507 B2 | 12/2010 | Wagoner |
| 7,880,430 B2 | 2/2011 | Gale et al. |
| 7,888,922 B2 | 2/2011 | Melanson |
| 7,903,441 B2 | 3/2011 | Chen et al. |
| 7,952,293 B2 | 5/2011 | Kelly |
| 7,966,079 B2 | 6/2011 | Graves |
| 7,966,081 B2 | 6/2011 | Graves |
| 8,032,323 B2 | 10/2011 | Taylor |
| 8,040,703 B2 | 10/2011 | Melanson |
| 8,044,623 B2 | 10/2011 | Takeuchi et al. |
| 8,050,063 B2 | 11/2011 | Wagoner et al. |
| 8,054,033 B2 | 11/2011 | Kern et al. |
| 8,065,023 B2 | 11/2011 | Graves |
| 8,072,170 B2 | 12/2011 | Hwang et al. |
| 8,092,084 B2 | 1/2012 | Riddle et al. |
| 8,096,139 B2 | 1/2012 | Taras et al. |
| 8,120,299 B2 | 2/2012 | Hwang et al. |
| 8,130,522 B2 | 3/2012 | Maksimovic |
| 8,154,230 B2 | 4/2012 | Kimura |
| 8,164,292 B2 | 4/2012 | Park |
| 8,169,180 B2 | 5/2012 | Hwang et al. |
| 8,174,853 B2 | 5/2012 | Kane et al. |
| 8,182,245 B2 | 5/2012 | Maeda et al. |
| 8,193,756 B2 | 6/2012 | Jadric et al. |
| 8,223,508 B2 | 7/2012 | Baarman et al. |
| 8,228,700 B2 | 7/2012 | Yahata et al. |
| 8,264,192 B2 | 9/2012 | Green et al. |
| 8,264,860 B2 | 9/2012 | Green |
| 8,269,370 B2 | 9/2012 | Haga |
| 8,278,778 B2 | 10/2012 | Rockenfeller et al. |
| 8,288,985 B2 | 10/2012 | Takahashi |
| 8,292,503 B2 | 10/2012 | Pan |
| 8,299,653 B2 | 10/2012 | Rockenfeller et al. |
| 8,305,780 B2 | 11/2012 | Saruwatari et al. |
| 8,320,145 B2 | 11/2012 | Horii |
| 8,321,039 B2 | 11/2012 | Graves |
| 8,335,095 B2 | 12/2012 | Mi et al. |
| 8,344,638 B2 | 1/2013 | Shteynberg et al. |
| 8,345,454 B1 | 1/2013 | Krolak et al. |
| 8,358,098 B2 | 1/2013 | Skinner et al. |
| 8,395,874 B2 | 3/2013 | Yamai et al. |
| 8,400,089 B2 | 3/2013 | Bonner et al. |
| 8,406,021 B2 | 3/2013 | Green |
| 8,432,108 B2 | 4/2013 | Kelly et al. |
| 8,432,713 B2 * | 4/2013 | Popescu ............ H02M 1/4225 323/285 |
| 8,467,197 B2 | 6/2013 | Perisic et al. |
| 8,477,514 B2 | 7/2013 | Artusi et al. |
| 8,477,517 B2 | 7/2013 | Joshi |
| 8,487,601 B2 * | 7/2013 | Saint-Pierre ........ H02M 1/4225 323/284 |
| 8,493,014 B2 | 7/2013 | Henderson et al. |
| 8,508,165 B2 | 8/2013 | Shinomoto et al. |
| 8,508,166 B2 | 8/2013 | Marcinkiewicz et al. |
| 8,520,415 B1 | 8/2013 | Krishnamoorthy et al. |
| 8,520,420 B2 | 8/2013 | Jungreis et al. |
| 8,547,024 B2 | 10/2013 | Grotkowski et al. |
| 8,547,713 B2 | 10/2013 | Kono et al. |
| 8,564,982 B2 | 10/2013 | Song et al. |
| 8,582,263 B2 | 11/2013 | Butler |
| 8,587,962 B2 | 11/2013 | Perisic et al. |
| 8,599,577 B2 | 12/2013 | Kajouke et al. |
| 8,614,562 B2 | 12/2013 | Bouchez et al. |
| 8,633,668 B2 | 1/2014 | Marcoccia |
| 8,638,074 B2 | 1/2014 | Babcock et al. |
| 8,648,558 B2 | 2/2014 | Clothier et al. |
| 8,657,585 B2 | 2/2014 | Hong et al. |
| 8,669,805 B2 | 3/2014 | Serventi et al. |
| 8,693,228 B2 | 4/2014 | Matan et al. |
| 8,698,433 B2 | 4/2014 | Green |
| 8,704,409 B2 | 4/2014 | Owens |
| 8,736,207 B2 | 5/2014 | Ritter et al. |
| 8,749,222 B2 | 6/2014 | Williams |
| 8,751,374 B2 | 6/2014 | Graves |
| 8,760,089 B2 | 6/2014 | Smith |
| 8,760,096 B2 | 6/2014 | Inamura et al. |
| 8,767,418 B2 | 7/2014 | Jungreis et al. |
| 8,773,052 B2 | 7/2014 | Clothier et al. |
| 8,796,967 B2 | 8/2014 | Sato |
| 8,817,506 B2 | 8/2014 | Shimomugi et al. |
| 8,823,292 B2 | 9/2014 | Sumi et al. |
| 8,829,976 B2 | 9/2014 | Kuwabara et al. |
| 8,836,253 B2 | 9/2014 | Kato et al. |
| 8,847,503 B2 | 9/2014 | Chang et al. |
| 8,866,459 B2 | 10/2014 | Zilberberg |
| 8,884,560 B2 | 11/2014 | Ito |
| 8,896,248 B2 | 11/2014 | Becerra et al. |
| 8,928,262 B2 | 1/2015 | Chretien |
| 8,933,654 B2 | 1/2015 | Chen et al. |
| 8,937,821 B2 | 1/2015 | Amano et al. |
| 8,941,347 B2 | 1/2015 | Otorii et al. |
| 8,941,365 B2 | 1/2015 | Murdock et al. |
| 8,976,551 B2 | 3/2015 | Igarashi et al. |
| 9,020,731 B2 | 4/2015 | Yamada |
| 9,030,143 B2 | 5/2015 | Guzelgunler |
| 9,065,365 B2 | 6/2015 | Omata et al. |
| 9,065,367 B2 | 6/2015 | Greetham |
| 9,070,224 B1 | 6/2015 | Esfahbod MirHosseinZadeh Sarabi et al. |
| 9,071,186 B2 | 6/2015 | Wu et al. |
| 9,088,232 B2 | 7/2015 | Marcinkiewicz et al. |
| 9,088,237 B2 | 7/2015 | Sanchez et al. |
| 9,093,941 B2 | 7/2015 | Lawrence et al. |
| 9,100,019 B2 | 8/2015 | Akiyama |
| 9,109,959 B2 | 8/2015 | Nieddu et al. |
| 9,118,260 B2 | 8/2015 | Gautier et al. |
| 9,124,095 B1 | 9/2015 | Barron et al. |
| 9,124,200 B2 | 9/2015 | Dai |
| 9,130,493 B2 | 9/2015 | Chen et al. |
| 9,134,183 B2 | 9/2015 | Jeong et al. |
| 9,136,757 B2 | 9/2015 | Arisawa et al. |
| 9,136,790 B2 | 9/2015 | Park et al. |
| 9,185,768 B2 | 11/2015 | Navabi-Shirazi et al. |
| 9,188,491 B2 | 11/2015 | Pan |
| 9,190,926 B2 | 11/2015 | Taguchi |
| 9,197,132 B2 | 11/2015 | Artusi et al. |
| 9,214,881 B2 | 12/2015 | Sekimoto et al. |
| 9,225,258 B2 | 12/2015 | Shimomugi et al. |
| 9,225,284 B2 | 12/2015 | Ried |
| 9,240,739 B2 | 1/2016 | Fukuta et al. |
| 9,246,398 B2 | 1/2016 | Sakakibara et al. |
| 9,246,418 B2 | 1/2016 | Becker et al. |
| 9,247,608 B2 | 1/2016 | Chitta et al. |
| 9,250,299 B1 | 2/2016 | Yarlagadda et al. |
| 9,257,931 B2 | 2/2016 | Tooyama et al. |
| 9,300,241 B2 | 3/2016 | Becerra et al. |
| 9,312,780 B2 | 4/2016 | Taguchi |
| 9,322,717 B1 | 4/2016 | Dhaliwal et al. |
| 9,322,867 B2 | 4/2016 | Chatroux et al. |
| 9,325,517 B2 | 4/2016 | Grohman |
| 9,331,598 B2 | 5/2016 | Jeong et al. |
| 9,331,614 B2 | 5/2016 | Becerra et al. |
| 9,387,800 B2 | 7/2016 | Tran |

(56) References Cited

U.S. PATENT DOCUMENTS

| | | |
|---|---|---|
| 9,407,093 B2 | 8/2016 | Cummings |
| 9,407,135 B2 | 8/2016 | Kinomura et al. |
| 9,419,513 B2 | 8/2016 | Mao et al. |
| 9,425,610 B2 | 8/2016 | Nakashita et al. |
| 9,431,915 B2 | 8/2016 | Arisawa et al. |
| 9,431,923 B2 | 8/2016 | Harada et al. |
| 9,438,029 B2 | 9/2016 | Cameron |
| 9,444,331 B2 | 9/2016 | Carletti et al. |
| 9,461,577 B2 | 10/2016 | Ried |
| 9,479,070 B2 | 10/2016 | van der Merwe |
| 9,502,981 B2 | 11/2016 | Schaemann et al. |
| 9,504,105 B2 | 11/2016 | Ekbote et al. |
| 9,560,718 B2 | 1/2017 | Sadwick |
| 9,564,846 B2 | 2/2017 | Marcinkiewicz et al. |
| 9,564,848 B2 | 2/2017 | Ishizeki et al. |
| 9,565,731 B2 | 2/2017 | DeJonge |
| 9,577,534 B2 | 2/2017 | Ishizeki et al. |
| 9,580,858 B2 | 2/2017 | Maekawa et al. |
| 9,581,626 B2 | 2/2017 | Schwind |
| 9,595,889 B2 | 3/2017 | Li et al. |
| 9,618,249 B2 | 4/2017 | Hatakeyama et al. |
| 9,621,101 B2 | 4/2017 | Kane |
| 9,625,190 B2 | 4/2017 | Lee et al. |
| 9,634,602 B2 | 4/2017 | Hou et al. |
| 9,640,617 B2 | 5/2017 | Das et al. |
| 9,641,063 B2 | 5/2017 | Ramabhadran et al. |
| 9,641,115 B2 | 5/2017 | Chretien |
| 9,654,048 B2 | 5/2017 | West et al. |
| 9,667,169 B2 | 5/2017 | Nawa et al. |
| 9,683,904 B2 | 6/2017 | Matsumoto et al. |
| 9,692,312 B2 | 6/2017 | Yuasa et al. |
| 9,692,332 B2 | 6/2017 | Taoka et al. |
| 9,696,693 B2 | 7/2017 | Element |
| 9,698,768 B2 | 7/2017 | Leong et al. |
| 9,712,071 B2 | 7/2017 | Yuasa et al. |
| 9,715,913 B1 | 7/2017 | Yin et al. |
| 9,722,488 B2 | 8/2017 | Ishizeki et al. |
| 9,732,991 B2 | 8/2017 | An et al. |
| 9,741,182 B2 | 8/2017 | Zhu |
| 9,742,319 B2 | 8/2017 | Marvelly et al. |
| 9,742,346 B2 | 8/2017 | Esnault |
| 9,746,812 B2 | 8/2017 | Kosaka |
| 9,762,119 B2 | 9/2017 | Kim et al. |
| 9,772,131 B2 | 9/2017 | Hatakeyama et al. |
| 9,772,381 B2 | 9/2017 | Bock et al. |
| 9,780,683 B2 | 10/2017 | Sakakibara et al. |
| 9,787,175 B2 | 10/2017 | Phadke |
| 9,787,246 B2 | 10/2017 | Tsumura et al. |
| 9,791,327 B2 | 10/2017 | Rhee et al. |
| 9,800,138 B2 | 10/2017 | Katsumata |
| 9,813,000 B2 | 11/2017 | Jabusch et al. |
| 9,816,743 B2 | 11/2017 | Nakase et al. |
| 9,819,294 B2 | 11/2017 | Park et al. |
| 9,823,105 B2 | 11/2017 | Lehmkuhl et al. |
| 9,829,226 B2 | 11/2017 | Hatakeyama et al. |
| 9,829,234 B2 | 11/2017 | Hatakeyama et al. |
| 9,837,952 B1 | 12/2017 | Carcia et al. |
| 9,839,103 B2 | 12/2017 | Avrahamy |
| 9,852,559 B2 | 12/2017 | Rettig et al. |
| 9,853,559 B2 | 12/2017 | Taniguchi et al. |
| 9,867,263 B2 | 1/2018 | Avrahamy |
| 9,870,009 B2 | 1/2018 | Erwin et al. |
| 9,882,466 B2 | 1/2018 | Kondo et al. |
| 9,888,535 B2 | 2/2018 | Chitta et al. |
| 9,888,540 B2 | 2/2018 | DeJonge |
| 9,893,522 B2 | 2/2018 | Wallace et al. |
| 9,893,603 B2 | 2/2018 | Nishizawa et al. |
| 9,893,668 B2 | 2/2018 | Hart et al. |
| 9,899,916 B2 | 2/2018 | Okamura et al. |
| 9,929,636 B2 | 3/2018 | Shinomoto et al. |
| 9,935,569 B2 | 4/2018 | Tsumura et al. |
| 9,935,571 B2 | 4/2018 | Frampton et al. |
| 9,941,834 B2 | 4/2018 | Tsukano et al. |
| 9,954,473 B2 | 4/2018 | Je et al. |
| 9,954,475 B2 | 4/2018 | Cho et al. |
| 9,965,928 B2 | 5/2018 | Green |
| 9,973,129 B2 | 5/2018 | Schuster et al. |
| 9,998,049 B2 | 6/2018 | Kashima et al. |
| 10,003,277 B2 | 6/2018 | Taguchi et al. |
| 10,014,858 B2 | 7/2018 | Flynn et al. |
| 2002/0085468 A1 | 7/2002 | Kobayashi |
| 2003/0021127 A1 | 1/2003 | Loef et al. |
| 2003/0117818 A1 | 6/2003 | Ota |
| 2003/0218448 A1 | 11/2003 | Lidak et al. |
| 2004/0136208 A1 | 7/2004 | Agarwal et al. |
| 2004/0183513 A1 | 9/2004 | Vinciarelli |
| 2005/0017695 A1 | 1/2005 | Stanley |
| 2005/0017699 A1 | 1/2005 | Stanley |
| 2005/0028539 A1 | 2/2005 | Singh et al. |
| 2005/0068337 A1 | 3/2005 | Duarte et al. |
| 2005/0076659 A1 | 4/2005 | Wallace et al. |
| 2005/0109047 A1 | 5/2005 | Park et al. |
| 2005/0122082 A1 | 6/2005 | Eckardt |
| 2006/0022648 A1 | 2/2006 | Ben-Yaakov et al. |
| 2006/0245219 A1* | 11/2006 | Li .................... G05F 1/565 363/89 |
| 2007/0036212 A1 | 2/2007 | Leung et al. |
| 2007/0217233 A1 | 9/2007 | Lim et al. |
| 2008/0104983 A1 | 5/2008 | Yamai et al. |
| 2008/0122418 A1 | 5/2008 | Briere et al. |
| 2008/0272748 A1 | 11/2008 | Melanson |
| 2008/0310201 A1* | 12/2008 | Maksimovic ....... H02M 3/1584 363/85 |
| 2009/0178424 A1 | 7/2009 | Hwang et al. |
| 2009/0273297 A1 | 11/2009 | Kelly |
| 2010/0117545 A1 | 5/2010 | Kelly et al. |
| 2010/0253295 A1 | 10/2010 | Tan et al. |
| 2010/0309700 A1 | 12/2010 | Maeda et al. |
| 2011/0012526 A1 | 1/2011 | Kelly |
| 2011/0015788 A1 | 1/2011 | Celik et al. |
| 2011/0030396 A1 | 2/2011 | Marcinkiewicz et al. |
| 2011/0030398 A1 | 2/2011 | Marcinkiewicz et al. |
| 2011/0031911 A1 | 2/2011 | Marcinkiewicz et al. |
| 2011/0031920 A1 | 2/2011 | Henderson et al. |
| 2011/0031942 A1 | 2/2011 | Green |
| 2011/0031943 A1* | 2/2011 | Green ................ H02M 1/4208 323/205 |
| 2011/0034176 A1 | 2/2011 | Lord et al. |
| 2011/0141774 A1 | 6/2011 | Kane et al. |
| 2011/0164339 A1 | 7/2011 | Schmid et al. |
| 2011/0204820 A1 | 8/2011 | Tikkanen et al. |
| 2011/0205161 A1 | 8/2011 | Myers et al. |
| 2011/0304279 A1 | 12/2011 | Felty |
| 2012/0013282 A1 | 1/2012 | Introwicz |
| 2012/0075310 A1 | 3/2012 | Michail et al. |
| 2012/0153396 A1 | 6/2012 | Sugiura et al. |
| 2012/0153916 A1 | 6/2012 | Weinstein et al. |
| 2012/0179299 A1 | 7/2012 | Gyota et al. |
| 2012/0280637 A1 | 11/2012 | Tikkanen et al. |
| 2012/0313646 A1 | 12/2012 | Nishikawa |
| 2013/0010508 A1 | 1/2013 | Courtel |
| 2013/0020310 A1 | 1/2013 | Hacham |
| 2013/0182470 A1 | 7/2013 | Chen et al. |
| 2014/0001993 A1 | 1/2014 | Iwata et al. |
| 2014/0015463 A1 | 1/2014 | Merkel et al. |
| 2014/0077770 A1 | 3/2014 | Omoto et al. |
| 2014/0091622 A1 | 4/2014 | Lucas et al. |
| 2014/0169046 A1 | 6/2014 | Chen |
| 2014/0292212 A1 | 10/2014 | Gray et al. |
| 2015/0043252 A1 | 2/2015 | Kuang |
| 2015/0084563 A1 | 3/2015 | Lucas et al. |
| 2015/0191133 A1 | 7/2015 | Okamura et al. |
| 2015/0214833 A1 | 7/2015 | Ramabhadran et al. |
| 2015/0219503 A1 | 8/2015 | Yoshida |
| 2015/0229204 A1 | 8/2015 | Mao et al. |
| 2015/0236581 A1 | 8/2015 | Chen et al. |
| 2015/0285691 A1 | 10/2015 | Caffee et al. |
| 2015/0326107 A1 | 11/2015 | Hsiao et al. |
| 2015/0333633 A1 | 11/2015 | Chen et al. |
| 2015/0354870 A1 | 12/2015 | Lee et al. |
| 2015/0365034 A1 | 12/2015 | Marcinkiewicz et al. |
| 2016/0013740 A1 | 1/2016 | Skinner et al. |
| 2016/0043632 A1 | 2/2016 | Tomioka |
| 2016/0043633 A1 | 2/2016 | Phadke |

(56) References Cited

U.S. PATENT DOCUMENTS

| | | |
|---|---|---|
| 2016/0094039 A1 | 3/2016 | Winstanley et al. |
| 2016/0133411 A1 | 5/2016 | Bock et al. |
| 2016/0218624 A1 | 7/2016 | Ishizeki et al. |
| 2016/0248365 A1* | 8/2016 | Ishizeki .................. H02M 1/36 |
| 2016/0261217 A1 | 9/2016 | Tang |
| 2016/0263331 A1 | 9/2016 | Nessel et al. |
| 2016/0268839 A1 | 9/2016 | Mouridsen |
| 2016/0268949 A1 | 9/2016 | Benn |
| 2016/0268951 A1 | 9/2016 | Cho et al. |
| 2016/0320249 A1 | 11/2016 | Reiman et al. |
| 2016/0329716 A1 | 11/2016 | Inoue |
| 2017/0141709 A1 | 5/2017 | Fukuda et al. |
| 2017/0141717 A1 | 5/2017 | Winstanley et al. |
| 2017/0155347 A1 | 6/2017 | Park et al. |
| 2017/0190530 A1 | 7/2017 | Seki et al. |
| 2017/0201201 A1 | 7/2017 | Aoki et al. |
| 2017/0205103 A1 | 7/2017 | Newcomb |
| 2017/0214341 A1 | 7/2017 | Matthews et al. |
| 2017/0244325 A1 | 8/2017 | Carralero et al. |
| 2017/0264223 A1 | 9/2017 | Kitano et al. |
| 2017/0288561 A1 | 10/2017 | Lemberg et al. |
| 2017/0299444 A1 | 10/2017 | Green |
| 2017/0300107 A1 | 10/2017 | Green et al. |
| 2017/0301192 A1 | 10/2017 | Green |
| 2017/0302158 A1 | 10/2017 | Green |
| 2017/0302160 A1 | 10/2017 | Marcinkiewicz et al. |
| 2017/0302161 A1 | 10/2017 | Green |
| 2017/0302162 A1 | 10/2017 | Green |
| 2017/0302165 A1 | 10/2017 | Marcinkiewicz et al. |
| 2017/0302200 A1 | 10/2017 | Marcinkiewicz |
| 2017/0302212 A1 | 10/2017 | Marcinkiewicz et al. |
| 2017/0302214 A1 | 10/2017 | Marcinkiewicz et al. |
| 2017/0317623 A1 | 11/2017 | Taniguchi et al. |
| 2017/0317637 A1 | 11/2017 | VanEyll et al. |
| 2017/0324362 A1 | 11/2017 | Colangelo et al. |
| 2017/0328786 A1 | 11/2017 | Takechi |
| 2017/0373629 A1 | 12/2017 | Shin et al. |
| 2018/0026544 A1 | 1/2018 | Baumann et al. |
| 2018/0034403 A1 | 2/2018 | Kim et al. |
| 2018/0062551 A1 | 3/2018 | Moon et al. |
| 2018/0073934 A1 | 3/2018 | Horng et al. |
| 2018/0076748 A1 | 3/2018 | Yamasaki et al. |
| 2018/0082991 A1 | 3/2018 | Toyoda et al. |
| 2018/0091075 A1 | 3/2018 | Musil |
| 2018/0094512 A1 | 4/2018 | Sadilek et al. |
| 2018/0175752 A1 | 6/2018 | Takeoka et al. |
| 2018/0180490 A1 | 6/2018 | Barbier et al. |
| 2018/0191261 A1 | 7/2018 | Chung et al. |
| 2018/0191288 A1 | 7/2018 | Li et al. |

FOREIGN PATENT DOCUMENTS

| | | |
|---|---|---|
| EP | 1271067 A1 | 1/2003 |
| EP | 1641113 A1 | 3/2006 |
| JP | H11237427 A | 8/1999 |
| JP | 2006134607 A | 5/2006 |
| JP | 2010541256 A | 12/2010 |
| JP | 2011160508 A | 8/2011 |
| JP | 2015080316 A | 4/2015 |
| KR | 20040025420 A | 3/2004 |
| KR | 20130067440 A | 6/2013 |
| WO | WO-2007035407 A1 | 3/2007 |
| WO | WO-2010143239 A1 | 12/2010 |
| WO | WO-2011074972 A1 | 6/2011 |

OTHER PUBLICATIONS

Corrected Notice of Allowability regarding U.S. Appl. No. 15/419,394 dated Sep. 10, 2018.
Notice of Allowance regarding U.S. Appl. No. 15/419,394 dated Aug. 27, 2018.
Applicant-Initiated Interview Summary regarding U.S. Appl. No. 15/419,394, dated Oct. 30, 2017.
Office Action regarding U.S. Appl. No. 15/419,394, dated Dec. 7, 2017.
Office Action regarding U.S. Appl. No. 15/419,464 dated Dec. 29, 2017.
Office Action regarding U.S. Appl. No. 15/419,423 dated Jan. 8, 2018.
Office Action regarding U.S. Appl. No. 15/487,201 dated Jan. 9, 2018.
Interview Summary regarding U.S. Appl. No. 15/419,394 dated Jan. 29, 2018.
International Search Report regarding International Application No. PCT/US2017/027710, dated Sep. 20, 2017.
Written Opinion of the International Searching Authority regarding International Application No. PCT/US2017/027710, dated Sep. 20, 2017.
Amit Kumar Sinha et al. "SEPIC Based PFC Converter for PMBLDCM Drive in Air Conditioning System." International Journal of Advanced Computer Research, vol. 3, No. 1, Issue 8. Mar. 2013.
International Search Report regarding International Application No. PCT/US2017/027721, dated Sep. 20, 2017.
Written Opinion of the International Searching Authority regarding International Application No. PCT/US2017/027721, dated Sep. 20, 2017.
International Search Report regarding International Application No. PCT/US2017/027699, dated Sep. 20, 2017.
Written Opinion of the International Searching Authority regarding International Application No. PCT/US2017/027699, dated Sep. 20, 2017.
Applicant-Initiated Interview Summary regarding U.S. Appl. No. 15/487,201 dated May 30, 2018.
Restriction Requirement regarding U.S. Appl. No. 15/487,175 dated May 16, 2018.
Non-Final Office Action regarding U.S. Appl. No. 15/487,226 dated May 16, 2018.
Notice of Allowance regarding U.S. Appl. No. 15/419,394 dated Jul. 20, 2018.
Notice of Allowance regarding U.S. Appl. No. 15/487,201 dated Jul. 20, 2018.
Applicant-Initiated Interview Summary regarding U.S. Appl. No. 15/487,027 dated Jun. 21, 2018.
Applicant-Initiated Interview Summary regarding U.S. Appl. No. 15/487,101 dated Jun. 21, 2018.
Non-Final Office Action regarding U.S. Appl. No. 15/487,101 dated Apr. 9, 2018.
Final Office Action regarding U.S. Appl. No. 15/487,201 dated Apr. 19, 2018.
Non-Final Office Action regarding U.S. Appl. No. 15/419,423 dated May 14, 2018.
Notice of Allowance regarding U.S. Appl. No. 15/419,464 dated May 11, 2018.
Notice of Allowance regarding U.S. Appl. No. 15/419,394 dated May 11, 2018.
Advisory Action regarding U.S. Appl. No. 15/419,394 dated Mar. 12, 2018.
Applicant-Initiated Interview Summary regarding U.S. Appl. No. 15/487,201 dated Mar. 5, 2018.
Restriction Requirement regarding U.S. Appl. No. 15/487,226 dated Mar. 12, 2018.
Interview Summary regarding U.S. Appl. No. 15/419,423 dated Feb. 21, 2018.
Notice of Allowance regarding U.S. Appl. No. 15/430,978 dated Feb. 22, 2018.
International Search Report regarding International Application No. PCT/US2017/027726, dated Sep. 12, 2017.
Written Opinion of the International Searching Authority regarding International Application No. PCT/US2017/027726, dated Sep. 12, 2017.
International Search Report regarding International Application No. PCT/US2017/027729, dated Sep. 13, 2017.
Written Opinion of the International Searching Authority regarding International Application No. PCT/US2017/027729, dated Sep. 13, 2017.
U.S. Appl. No. 14/419,464, filed Jan. 30, 2017, Charles E. Green.

(56) References Cited

OTHER PUBLICATIONS

U.S. Appl. No. 15/430,978, filed Feb. 13, 2017, Charles E. Green.
U.S. Appl. No. 15/487,201, filed Apr. 13, 2017, Joseph G. Marcinkiewicz.
U.S. Appl. No. 15/487,426, filed Apr. 13, 2017, Charles E. Green.
International Search Report regarding International Application No. PCT/US2017/027691, dated Aug. 18, 2017.
Written Opinion of the International Searching Authority regarding International Application No. PCT/US2017/027691, dated Aug. 18, 2017.
International Search Report regarding International Application No. PCT/US2017/027744, dated Aug. 18, 2017.
Written Opinion of the International Searching Authority regarding International Application No. PCT/US2017/027744, dated Aug. 18, 2017.
International Search Report regarding International Application No. PCT/US2017/027738, dated Aug. 18, 2017.
Written Opinion of the International Searching Authority regarding International Application No. PCT/US2017/027738, dated Aug. 18, 2017.
Office Action regarding U.S. Appl. No. 15/419,394, dated Sep. 11, 2017.
Applicant-Initiated Interview Summary regarding U.S. Appl. No. 15/419,423 dated Dec. 12, 2018.
Notice of Allowance regarding U.S. Appl. No. 15/419,464 dated Sep. 24, 2018.
Non-Final Office Action regarding U.S. Appl. No. 15/419,349 dated Oct. 18, 2018.
Non-Final Office Action regarding U.S. Appl. No. 15/419,423 dated Oct. 11, 2018.
Notice of Allowance regarding U.S. Appl. No. 15/487,027 dated Oct. 2, 2018.
Notice of Allowance regarding U.S. Appl. No. 15/487,175 dated Oct. 3, 2018.
Final Office Action regarding U.S. Appl. No. 15/487,101 dated Nov. 14, 2018.
U.S. Appl. No. 15/419,349, filed Jan. 30, 2017, Charles E. Green.
U.S. Appl. No. 15/419,394, filed Jan. 30, 2017, Charles E. Green.
U.S. Appl. No. 15/419,423, filed Jan. 30, 2017, Charles E. Green.
U.S. Appl. No. 15/419,464, filed Jan. 30, 2017, Charles E. Green.
U.S. Appl. No. 15/487,027, filed Apr. 13, 2017, Joseph G. Marcinkiewicz.
U.S. Appl. No. 15/487,101, filed Apr. 13, 2017, Joseph G. Marcinkiewicz.
U.S. Appl. No. 15/487,175, filed Apr. 13, 2017, Joseph G. Marcinkiewicz.
U.S. Appl. No. 15/487,226, filed Apr. 13, 2017, Joseph G. Marcinkiewicz.
U.S. Appl. No. 15/943,660, filed Apr. 2, 2018, Charles E. Green.

* cited by examiner

POWER FACTOR CORRECTION CIRCUITS AND METHODS INCLUDING PARTIAL POWER FACTOR CORRECTION OPERATION FOR BOOST AND BUCK POWER CONVERTERS

CROSS-REFERENCE TO RELATED APPLICATIONS

This application claims the benefit of U.S. Provisional Application No. 62/323,498, filed on Apr. 15, 2016, U.S. Provisional Application No. 62/323,505, filed Apr. 15, 2016, U.S. Provisional Application No. 62/323,607, filed Apr. 15, 2016, U.S. Provisional Application No. 62/398,641, filed on Sep. 23, 2016, and U.S. Provisional Application No. 62/398,658, filed on Sep. 23, 2016. The entire disclosures of the applications referenced above are incorporated herein by reference.

FIELD

The present disclosure relates to power factor correction circuits.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Compressors are used in a wide variety of industrial and residential applications including, but not limited to, heating, ventilating, and air conditioning (HVAC) systems. Electric motors are used to power and/or actuate elements of the compressors. A control system for controlling operation of an electric motor of a compressor can include a drive. The drive can include a power factor correction (PFC) circuit for providing power factor correction between an inputted alternating current (AC) and a generated direct current (DC).

A power factor is an indicator of a relationship between current and voltage in a circuit, or how effectively a circuit uses actual electrical power as compared to reactive power, which is stored and returned to a power source. A power factor can be expressed as a value between zero and one. A power factor can be equal to a ratio of actual electrical power dissipated by a circuit relative to a product of root mean squared (RMS) values of current and voltage for the circuit. The power factor approaches 1 as this ratio increases. The PFC circuit can be implemented to increase a power factor of a drive, thereby increasing an amount of actual electrical power used by the circuit as compared with an amount of reactive power the circuit stores and returns to the power source.

SUMMARY

A power factor correction circuit is provided and includes a bridge rectification circuit, a power converter, a current sensor, and a control module. The bridge rectification circuit is configured to (i) receive an AC voltage, and (ii) generate a rectified AC voltage. The power converter is configured to convert the rectified AC voltage to a first DC voltage, where the power converter includes a switch and supplies the first DC voltage to a DC bus to power a compressor. The current sensor is configured to detect an amount of current (i) passing through the power converter, or (ii) returning from an output of the power factor correction circuit. The control module is configured to, while operating in a partial power factor correction mode: based on the rectified AC voltage, a phase angle of the rectified AC voltage, a second DC voltage, or the detected amount of current, control operation of the switch to transition between operating in (i) a high activity mode and (ii) an inactive mode or a low activity mode, wherein the second DC voltage is a detected DC voltage of the DC bus; transition the switch between an open state and a closed state while in the high activity mode and the low activity mode; and maintain the power converter in an OFF state while in the inactive mode.

In other features, a method of operating a power factor correction circuit is provided. The method includes: receiving an AC voltage; generating a rectified AC voltage via a bridge rectification circuit; and converting the rectified AC voltage to a first DC voltage via a power converter, wherein the power converter comprises a switch; supplying the first DC voltage to a DC bus to power a compressor; detecting an amount of current (i) passing through the power converter, or (ii) returning from an output of the power factor correction circuit. The method further includes, while operating in a partial power factor correction mode: based on the rectified AC voltage, a phase angle of the rectified AC voltage, a second DC voltage, or the detected amount of current, controlling operation of the switch to transition between operating in (i) a high activity mode and (ii) an inactive mode or a low activity mode, wherein the second DC voltage is a detected DC voltage of the DC bus; transitioning the switch between an open state and a closed state while in the high activity mode and the low activity mode; and maintaining the power converter in an OFF state while in the inactive mode.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1:
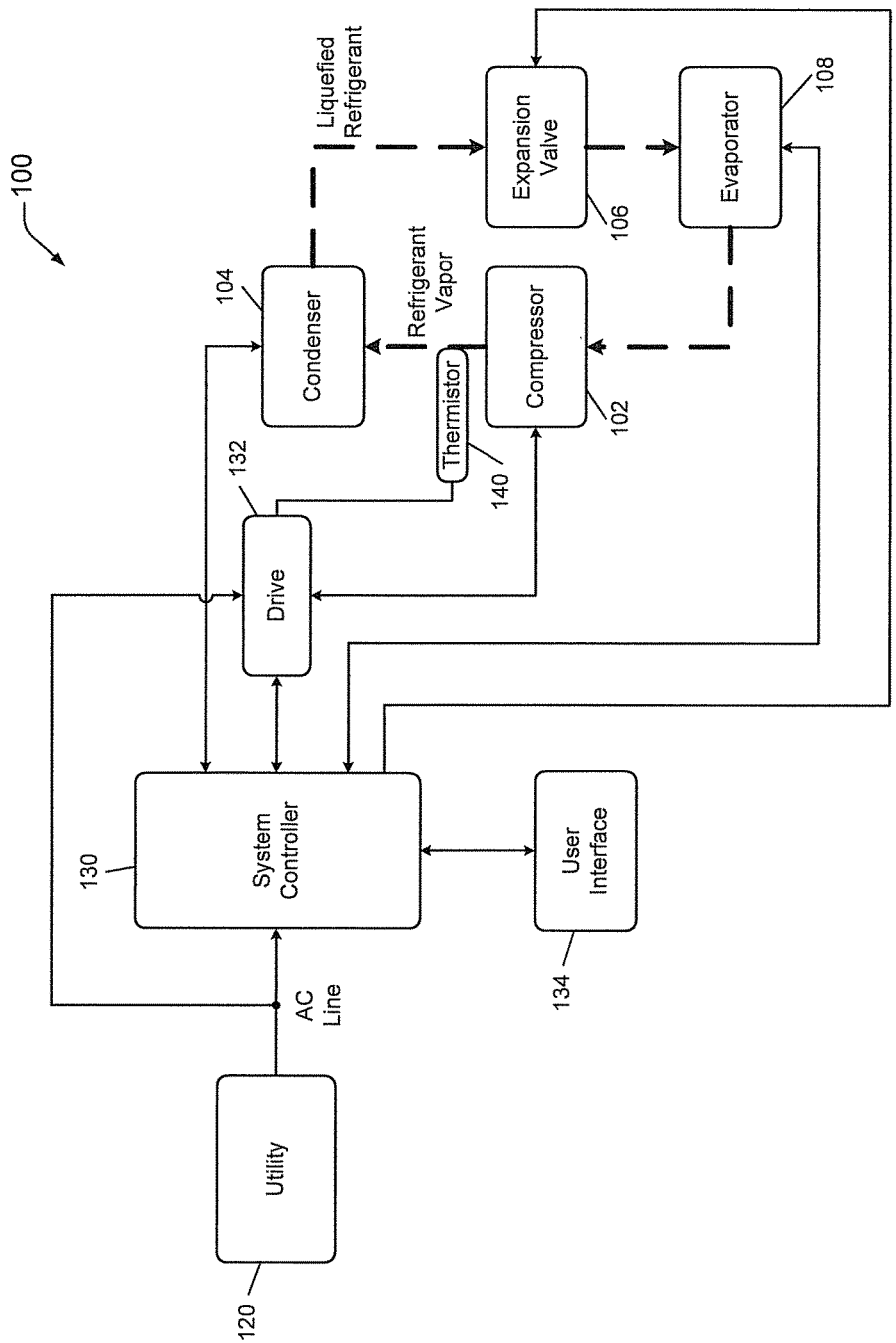
FIG. 1 is a functional block diagram of an example refrigeration system.

FIG. 1 is a functional block diagram of an example refrigeration system 100 including a compressor 102, a condenser 104, an expansion valve 106, and an evaporator 108. According to the principles of the present disclosure, the refrigeration system 100 may include additional and/or alternative components, such as a reversing valve or a filter-drier. In addition, the present disclosure is applicable to other types of refrigeration systems including, but not limited to, heating, ventilating, and air conditioning (HVAC), heat pump, refrigeration, and chiller systems.

The compressor 102 receives refrigerant in vapor form and compresses the refrigerant. The compressor 102 provides pressurized refrigerant in vapor form to the condenser 104. The compressor 102 includes an electric motor that drives a pump. For example only, the pump of the compressor 102 may include a scroll compressor and/or a reciprocating compressor.

All or a portion of the pressurized refrigerant is converted into liquid form within the condenser 104. The condenser 104 transfers heat away from the refrigerant, thereby cooling the refrigerant. When the refrigerant vapor is cooled to a temperature that is less than a saturation temperature, the refrigerant transforms into a liquid (or liquefied) refrigerant. The condenser 104 may include an electric fan that increases the rate of heat transfer away from the refrigerant.

The condenser 104 provides the refrigerant to the evaporator 108 via the expansion valve 106. The expansion valve 106 controls the flow rate at which the refrigerant is supplied to the evaporator 108. The expansion valve 106 may include a thermostatic expansion valve or may be controlled electronically by, for example, a system controller 130. A pressure drop caused by the expansion valve 106 may cause a portion of the liquefied refrigerant to transform back into the vapor form. In this manner, the evaporator 108 may receive a mixture of refrigerant vapor and liquefied refrigerant.

The refrigerant absorbs heat in the evaporator 108. Liquid refrigerant transitions into vapor form when warmed to a temperature that is greater than the saturation temperature of the refrigerant. The evaporator 108 may include an electric fan that increases the rate of heat transfer to the refrigerant.

A utility 120 provides power to the refrigeration system 100. For example only, the utility 120 may provide single-phase alternating current (AC) power at approximately 230 Volts root mean squared ($V_{RMS}$). In other implementations, the utility 120 may provide three-phase AC power at approximately 400 $V_{RMS}$, 480 $V_{RMS}$, or 600 $V_{RMS}$ at a line frequency of, for example, 50 or 60 Hz. When the three-phase AC power is nominally 600 $V_{RMS}$, the actual available voltage of the power may be 575 $V_{RMS}$.

The utility 120 may provide the AC power to the system controller 130 via an AC line, which includes two or more conductors. The AC power may also be provided to a drive 132 via the AC line. The system controller 130 controls the refrigeration system 100. For example only, the system controller 130 may control the refrigeration system 100 based on user inputs and/or parameters measured by various sensors (not shown). The sensors may include pressure sensors, temperature sensors, current sensors, voltage sensors, etc. The sensors may also include feedback information from the drive control, such as motor currents or torque, over a serial data bus or other suitable data buses.

A user interface 134 provides user inputs to the system controller 130. The user interface 134 may additionally or alternatively provide the user inputs directly to the drive 132. The user inputs may include, for example, a desired temperature, requests regarding operation of a fan (e.g., a request for continuous operation of the evaporator fan), and/or other suitable inputs. The user interface 134 may take the form of a thermostat, and some or all functions of the system controller (including, for example, actuating a heat source) may be incorporated into the thermostat.

The system controller 130 may control operation of the fan of the condenser 104, the fan of the evaporator 108, and the expansion valve 106. The drive 132 may control the compressor 102 based on commands from the system controller 130. For example only, the system controller 130 may instruct the drive 132 to operate the motor of the compressor 102 at a certain speed or to operate the compressor 102 at a certain capacity. In various implementations, the drive 132 may also control the condenser fan.

A thermistor 140 is thermally coupled to the refrigerant line exiting the compressor 102 that conveys refrigerant vapor to the condenser 104. The variable resistance of the thermistor 140 therefore varies with the discharge line temperature (DLT) of the compressor 102. As described in more detail, the drive 132 monitors the resistance of the thermistor 140 to determine the temperature of the refrigerant exiting the compressor 102.

The DLT may be used to control the compressor 102, such as by varying capacity of the compressor 102, and may also be used to detect a fault. For example, if the DLT exceeds the threshold, the drive 132 may power down the compressor 102 to prevent damage to the compressor 102.

Figure 2:
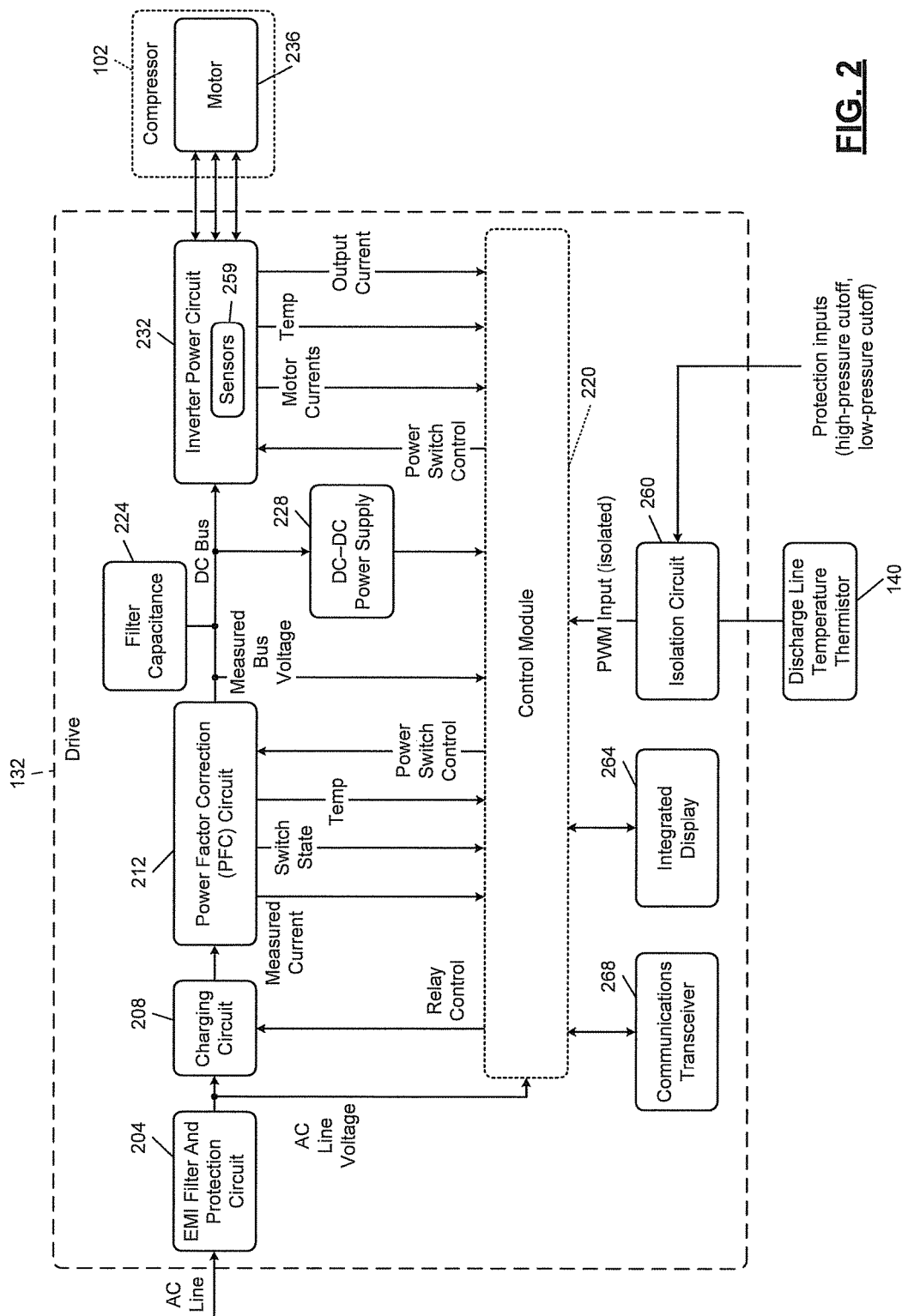
FIG. 2 is a block diagram of an example implementation of the compressor motor drive of FIG. 1.

In FIG. 2, an example implementation of the drive 132 includes an electromagnetic interference (EMI) filter and protection circuit 204, which receives power from an AC line. The EMI filter and protection circuit 204 reduces EMI that might otherwise be injected back onto the AC line from the drive 132. The EMI filter and protection circuit 204 may also remove or reduce EMI arriving from the AC line. Further, the EMI filter and protection circuit 204 protects against power surges, such as may be caused by lightening, and/or other other types of power surges and sags.

A charging circuit 208 controls power supplied from the EMI filter and protection circuit 204 to a power factor correction (PFC) circuit 212. For example, when the drive 132 initially powers up, the charging circuit 208 may place a resistance in series between the EMI filter and protection circuit 204 and the PFC circuit 212 to reduce the amount of current inrush. These current or power spikes may cause various components to prematurely fail.

After initial charging is completed, the charging circuit 208 may close a relay that bypasses the current-limiting resistor. For example, a control module 220 may provide a relay control signal to the relay within the charging circuit 208. In various implementations, the control module 220 may assert the relay control signal to bypass the current-limiting resistor after a predetermined period of time following start up, or based on closed loop feedback indicating that charging is near completion.

The PFC circuit 212 converts incoming AC power to DC power. The DC power may have voltage ripples, which are reduced by filter capacitor 224. Filter capacitor 224 may include one or more capacitors arranged in parallel and connected to the DC bus. The PFC circuit 212 may attempt to draw current from the AC line in a sinusoidal pattern that matches the sinusoidal pattern of the incoming voltage. As the sinusoids align, the power factor approaches one, which represents the greatest efficiency and the least demanding load on the AC line.

The PFC circuit 212, if implemented as an active PFC circuit, may include (i) one or more switches, (ii) a rectification circuit, and (iii) an AC choke or a DC choke depending on whether the choke is upstream or downstream of the rectification circuit. The PFC circuit 212 includes one or more switches that are controlled by the control module 220 using one or more signals labeled as power switch control. The switches are controlled by the control module 220 using one or more signals labeled as power switch control. The control module 220 determines the power switch control signals based on a measured voltage of the DC bus, measured current in the PFC circuit 212, AC line voltages, temperature or temperatures of the PFC circuit 212, and the measured state of a power switch in the PFC circuit 212. While the example of use of measured values is provided, the control module 220 may determine the power switch control signals based on an estimated voltage of the DC bus, estimated current in the PFC circuit 212, estimated AC line voltages, estimated temperature or temperatures of the PFC circuit 212, and/or the estimated or expected state of a power switch in the PFC circuit 212. In various implementations, the AC line voltages are measured or estimated subsequent to the EMI filter and protection circuit 204 but prior to the charging circuit 208. In various implementations, the AC line voltages are measured subsequent to the EMI filter and protection circuit 204 but prior to the charging circuit 208. The PFC circuit 212, if implemented as a passive PFC circuit may include a rectification circuit and an AC choke or a DC choke depending on whether the choke is upstream or downstream of the rectification circuit.

The control module 220 is powered by a DC-DC power supply 228, which provides a voltage suitable for logic of the control module 220, such as 3.3 Volts, 2.5 Volts, etc. The DC-DC power supply 228 may also provide DC power for operating switches of the PFC circuit 212 and an inverter power circuit 232. For example only, this voltage may be a higher voltage than for digital logic, with 15 Volts being one example.

The inverter power circuit 232 also receives power switch control signals from the control module 220. In response to the power switch control signals, switches within the inverter power circuit 232 cause current to flow in respective windings of a motor 236 of the compressor 102. The control module 220 may receive a measurement or estimate of motor current for each winding of the motor 236 or each leg of the inverter power circuit 232. The control module 220 may also receive a temperature indication from the inverter power circuit 232.

For example only, the temperature from the inverter power circuit 232 and the temperature from the PFC circuit 212 are used only for fault purposes. In other words, once the temperature exceeds a predetermined threshold, a fault is declared and the drive 132 is either powered down or operated at a reduced capacity. For example, the drive 132 may be operated at a reduced capacity and if the temperature does not decrease at a predetermined rate, the drive 132 transitions to a shutdown state. The inverter power circuit 232 may include one or more current sensors 259 for detecting current out of the inverter power circuit 232 and drawn by the motor 236.

The control module 220 may also receive an indication of the discharge line temperature from the compressor 102 using the thermistor 140. An isolation circuit 260 may provide a pulse-width-modulated representation of the resistance of the thermistor 140 to the control module 220. The isolation circuit 260 may include galvanic isolation so that there is no electrical connection between the thermistor 140 and the control module 220.

The isolation circuit 260 may further receive protection inputs indicating faults, such as a high pressure cutoff or a low pressure cutoff, where pressure refers to refrigerant pressure. If any of the protection inputs indicate a fault and, in some implementations, if any of the protection inputs become disconnected from the isolation circuit 260, the isolation circuit 260 ceases sending the PWM temperature signal to the control module 220. Therefore, the control module 220 may infer that a protection input has been received from an absence from the PWM signal. The control module 220 may, in response, shut down the drive 132.

The control module 220 controls an integrated display 264, which may include a grid of LEDs and/or a single LED package, which may be a tri-color LED. The control module 220 can provide status information, such as firmware versions, as well as error information using the integrated display 264. The control module 220 communicates with external devices, such as the system controller 130 in FIG. 1, using a communications transceiver 268. For example only, the communications transceiver 268 may conform to the RS-485 or RS-232 serial bus standards or to the Controller Area Network (CAN) bus standard.

Figure 3A:
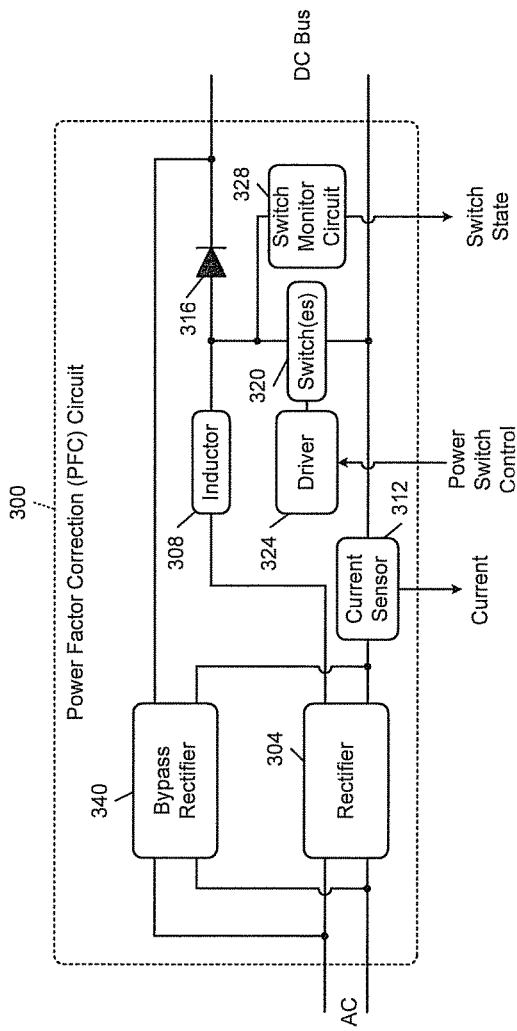
FIG. 3A is a block diagram of an example implementation of the power factor correction (PFC) circuit of FIG. 2.

In FIG. 3A, a PFC circuit 300 is one implementation of the PFC circuit 212 of FIG. 2. The PFC circuit 300 includes a rectifier 304 that converts incoming AC into pulsating DC. In various implementations, the rectifier 304 includes a full-wave diode bridge. The DC output of the rectifier 304 is across first and second terminals. The first terminal is connected to an inductor 308, while the second terminal is connected to a current sensor 312. An opposite end of the inductor 308 is connected to a node that is common to the inductor 308, an anode of a diode 316, and first terminal of a switch 320. Although described as a single switch having single first, second and control terminals, the switch 320 may include multiple switches and corresponding terminals.

The PFC circuit 300 generates a DC bus, where a first terminal of the DC bus is connected to a cathode of the diode 316 while a second terminal of the DC bus is connected to the second output terminal of the rectifier 304 via the current sensor 312. The current sensor 312 can therefore sense the current within the switch 320 as well as the current in the DC bus and current in the inductor 308. The second terminal of the DC bus is also connected to a second terminal of the switch.

A driver 324 receives the power switch control signal from the control module 220 of FIG. 2 and rapidly charges or discharges a control terminal of the switch 320. For example, the switch 320 may be a field effect transistor with a gate terminal as the control terminal. The driver 324, in response to the power switch control signal, charges or discharges the capacitor at the gate of the field effect transistor.

More specifically, the switch 320 may be a power metal-oxide-semiconductor field-effect transistor (MOSFET), such as the STW38N65M5 power MOSFET from STMicroelectronics. A switch monitor circuit 328 measures whether the switch is on or off. This closed loop control enables the control module 220 to determine whether the switch 320 has reacted to a command provided by the power switch control signal and may also be used to determine how long it takes the switch 320 to respond to that control signal. The measured switch state is output from the switch monitor circuit 328 back to the control module 220. The control module 220 may update its control of the power switch control signal to compensate for delays in turning on and/or turning off the switch 320.

In FIG. 3A, the inductor, the switch 320, and the diode 316 are arranged in a boost configuration. In brief, the switch 320 closes, causing current through the inductor 308 to increase. When the switch 320 is closed, the current through the inductor 308 cannot change instantaneously because the voltage across an inductor is proportional to the derivative of the current. The voltage across the inductor 308 becomes negative, meaning that the end of the inductor 308 connected to the anode of the diode 316 increases above the voltage output from the rectifier 304.

Once the voltage at the anode of the diode 316 increases above the turn on voltage of the diode 316, the current through the inductor 308 can be fed through the diode 316 to the DC bus. The current through the inductor 308 decreases and then the switch 320 is closed once more, causing the current and the inductor 308 to increase.

In various implementations, the switch 320 may be turned on until the current sensor 312 determines that a predetermined threshold of current has been exceeded. At that time, a switch 320 is turned off for a specified period of time. This specified period may be adaptive, changing along with the voltage of the DC bus as well as the voltage of the AC input change. However, the off time (when the switch 320 is open) is a specified value. Once a time equal to the specified value has elapsed, the switch 320 is turned back on again and the process repeats. The off time can be fixed or variable. In the case of the off time being variable, the off time can be limited to at least a predetermined minimum off time.

To reduce the physical size and parts cost of the PFC circuit 300, the inductance of the inductor 308 (which may be the largest contributor to physical size of the PFC circuit 300) may be lowered. However, with a lower inductance, the inductor 308 will saturate more quickly. Therefore, the switch 320 will have to operate more quickly. While more quickly and smaller are relative terms, present power switching control operates in the range of 10 kilohertz to 20 kilohertz switching frequencies. In the present application, the switching frequency of the switch 320 may be increased to more than 50 kilohertz, more than 100 kilohertz, or more than 200 kilohertz. For example, the switching frequency of the switch may be controlled to be approximately 200 kilohertz.

The switch 320 is therefore chosen to allow for faster switching as well as to have low switching losses. With faster switching, the inductance of the inductor 308 can be smaller. In addition, the diode 316 may need to be faster. Silicon carbide diodes may have fast response times. For example, the diode 316 may be a STPSC2006CW Silicon Carbide dual diode package from STMicroelectronics.

In order to accurately drive the switch 320 when operating at higher speeds, the control strategy must similarly be accelerated. For example only, the control module 220 may include multiple devices, such as a microprocessor configured to perform more involved calculations and an FPGA (field programmable gate array) or PLD (programmable logic device) configured to monitor and respond to inputs in near real time. In this context, near real time means that the time resolution of measurement and delay in responding to inputs of the FPGA or PLD is negligible compared to the timeframes of interest.

A bypass rectifier 340 is connected in parallel with the rectifier 304 at the AC line input. A second output terminal of the bypass rectifier 340 is connected to the second terminal rectifier 304. However, a first output terminal of the bypass rectifier 340 is connected to the cathode of the diode 316.

As a result, when the PFC circuit 300 is not operating to boost the DC bus voltage, the bypass rectifier 340 will be active when the line-to-line voltage of the AC input exceeds the voltage across the DC bus. The bypass rectifier 340, in these situations, diverts current from passing through the diode 316. Because the inductor 308 is small, and the switch 320 switches rapidly, the diode 316 is selected to also exhibit fast switching times. The diode 316 may therefore be more sensitive to current, which is selectively shunted around the diode 316 by the bypass rectifier 340.

In addition, the current path through the rectifier 304 and the diode 316 experiences three diode voltage drops or two diode voltage drops and the switch voltage drop, while the path through the bypass rectifier 340 experiences only two diode voltage drops. While the single phase AC input in FIG. 3A is associated with a boost converter topology, the present disclosure also encompasses a buck converter topology or a buck-boost converter topology.

Figure 3B:
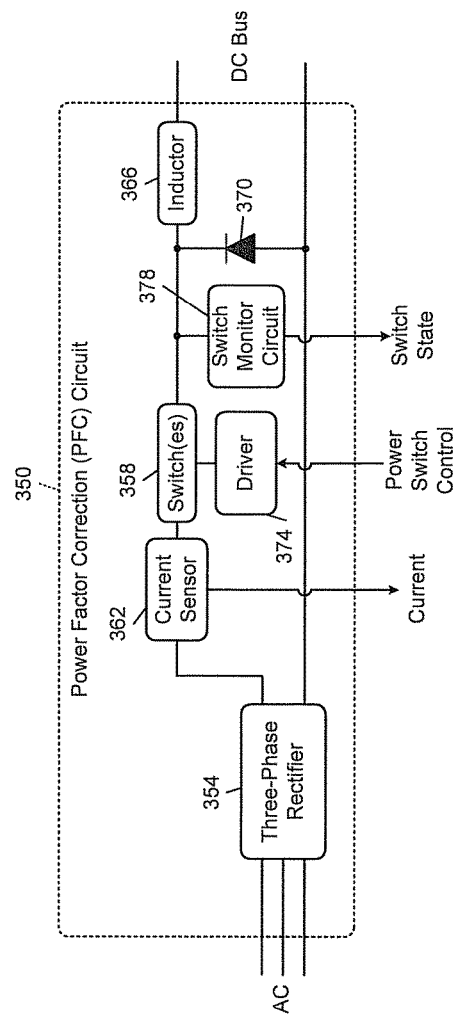
FIG. 3B is a block diagram of another example implementation of the PFC circuit of FIG. 2.

In FIG. 3B, a buck converter topology is shown with a three-phase AC input signal. Note that the principles of the present disclosure also apply to a boost converter or buck-boost converter topology used with a three-phase AC input. A PFC circuit 350 represents another implementation of the PFC circuit 212 of FIG. 2.

A three-phase rectifier 354 receives three-phase AC and generates pulsating DC across first and second terminals. A switch 358 is connected to the first terminal of the three-phase rectifier 354 by a current sensor 362. The switch 358 is connected to an inductor 366 at a common node. The common node is also connected to a cathode of a power diode 370.

An anode of the power diode 370 is connected to a second terminal of the three-phase rectifier 354. An opposite terminal of the inductor 366 establishes one terminal of the DC bus, while the second output of the three-phase rectifier 354 establishes the other terminal of the DC bus. In the configuration shown in FIG. 3B, the switch 358, the inductor 366, and the diode 370 are configured in a buck topology.

The current sensor 362 measures current through the inductor 366 as well as current through the DC bus. A driver 374 drives a control terminal of the switch 358 based on a power switch control signal from the control module 220 in FIG. 2. A switch monitor circuit 378 detects whether the switch 358 has opened or closed and reports the switch state to the control module 220. With the location of the current sensor 362, the current sensor 362 will measure approximately zero current when the switch 358 is open.

Figure 4:
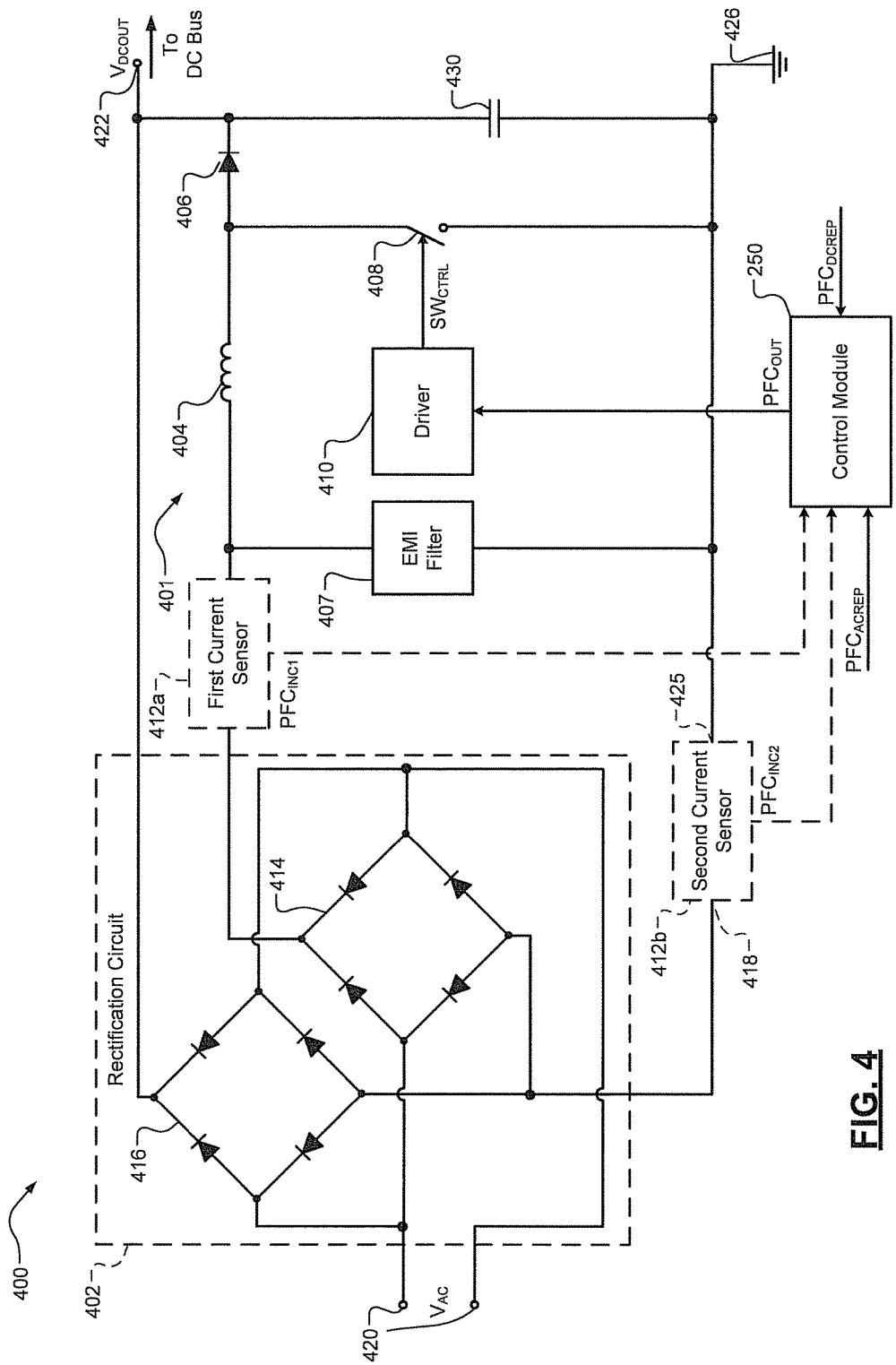
FIG. 4 is a schematic diagram of an example of a portion of a PFC circuit of the drive of FIG. 2 including a boost converter in accordance with an embodiment of the present disclosure.

FIG. 4 shows a portion 400 of the PFC circuit 212 of the drive 132 of FIG. 2 including a boost converter 401. Although the portion 400 of FIG. 4 includes a boost converter 401 and is configured for reception of a single phase AC signal, the portion may be implemented multiple times; once for each phase of a 3-phase input signal. The portion 400 includes a rectification circuit 402, an inductor 404, a diode 406, an EMI filter 407, a switch 408, a driver 410 and one or more current sensors 412a, 412b (collectively current sensors 412). The rectification circuit 402 includes a primary (or first) bridge rectifier 414 and a secondary (or second) bridge rectifier 416. The secondary bridge rectifier 416 may be referred to as a bypass rectifier and allows for current to bypass the primary bridge rectifier 414 and the boost converter 401. Each of the bridge rectifiers 414, 416 may include four diodes, as shown.

Each of the bridge rectifiers 414, 416 includes AC inputs, a return input and an output. The AC inputs of each of the bridge rectifiers 414, 416 are connected to a differential AC input 420 that receives an AC voltage $V_{AC}$ from the EMI filter 202. The return inputs are connected to a same output 418 of the second current sensor 412b. The output of the primary bridge rectifier 414 is connected to an input of the first current sensor 412a or the inductor 404. The output of the secondary bridge rectifier 416 is connected to a DC output 422 of the PFC circuit 212. The output voltages of the bridge rectifiers 414, 416 may be referred to as main voltages. Although current sensors 412a and 412b are shown, other current sensors may be alternatively or additionally incorporated into the portion 400. For example, a current sensor may be connected in series with one or more of the diode 406, the switch 408, and the capacitor 430. This current sensor may detect current passing through the diode 406, the switch 408 and/or the capacitor 430. In one embodiment, the current sensor is connected between the inductor 404 and the switch 408. In another embodiment, the current sensor is connected between the switch 408 and the reference terminal 426. Also, any or all of the disclosed current sensors may be utilized. Any of the signals and/or parameters derived from the signals of the disclosed current sensors may be utilized in the below described circuits and methods.

The EMI filter 407 may be connected to the output of the primary bridge rectifier 414 or an output of the first current sensor 412a. The EMI filter 407 filters an output of the primary bridge rectifier 414. The EMI filter 407 decouples the boost converter 401 from the primary bridge rectifier 414 to minimize noise generated by the boost converter 401 from being seen at the primary bridge rectifier 414. The DC output 422 may be connected to the DC bus, which is connected between the PFC circuit 212 and the inverter power circuit 208 of FIG. 2.

The inductor 404, diode 406, switch 408 and driver 410 provide the boost converter 401, which increases a DC output voltage $V_{DCOUT}$ and/or a DC bus voltage of the DC bus to a commanded (or predetermined) DC voltage $V_{DCCOM}$. The boost converter 401 is a power converter. The commanded DC voltage $V_{DCCOM}$ may be determined by the control module 250 and may be set to be less than a peak (or maximum) output voltage of the bridge rectifiers 414, 416. The inductor 404 is connected in series with the diode 406 between (i) the output of the primary bridge rectifier 414 and/or the first current sensor 412a and (ii) the DC output 422. The inductor 404 is connected (i) at a first end, to the output of the primary bridge rectifier 414 or the output of the first current sensor 412, and (ii) at a second end, to an anode of the diode 406 and a first terminal of the switch 408. The inductor 404 may be small (e.g., 80 micro-Henry (µH)) and operates as a choke. The diode 406 may be formed of, for example, silicon carbide SiC for quick switching frequencies and no reverse recovery time. The diode 406 may include multiple diodes connected in parallel.

The switch 408 may be a transistor, such as a super-junction field effect transistor (FET), a power metal oxide semiconductor field-effect transistor (MOSFET), and/or a super-junction MOSFET. The switch 408 may be configured to be oscillated between ON (e.g., closed) and OFF (e.g., open) states at a high frequency (e.g., greater than or equal to 200 kilo-hertz (kHz)). The first terminal of the switch 408 is connected to the inductor 404 and the anode of the diode 406. A second terminal of the switch 408 is connected to an input 425 of the second current sensor 412b and a reference terminal 426 (e.g., a ground reference). A control terminal of the switch 408 receives a control signal $SW_{CTRL}$ from the driver 410. The driver 410 generates the control signal $SW_{CTRL}$ based on an output signal $PFC_{OUT}$ of the control module 250. The control module 250 generates the output signal $PFC_{OUT}$ based on: one or more current sense signals $PFC_{INC1}$, $PFC_{INC2}$ from the current sensors 412a, 412b; an AC signal $PFC_{ACREP}$ representative of the AC voltage $V_{AC}$; and a DC signal $PFC_{DCREP}$ that is representative of the DC output voltage $V_{DCOUT}$ of the PFC circuit 212. The current sense signal $PFC_{INC1}$ may be equal to and/or indicative of an amount of current (i) passing through the inductor 404, and/or (ii) passing through the PFC circuit 212. The current sense signal $PFC_{INC2}$ may be equal to and/or indicative of an amount of current (i) returning from the DC output 422 to the second current sensor 412b, and/or (ii) passing through the PFC circuit 212. The AC signal $PFC_{ACREP}$ may be equal to and/or indicative of the AC voltage $V_{AC}$. The DC signal $PFC_{DCREP}$ may be equal to and/or indicative of the DC output voltage $V_{DCOUT}$.

A capacitor 430 may be connected between the DC output 422 and the reference terminal 426. The capacitor 430 may be connected (i) at a first end, to a cathode of the diode 406 and to the DC output 422, and (ii) at a second end, to the reference terminal 426 and the input 425 of the second current sensor 412b.

During operation, the boost converter may be ON when the DC bus voltage is greater than the AC voltage $V_{AC}$. Current does not pass from the secondary rectifier 416 to the DC bus when the DC bus voltage is greater than the AC voltage $V_{AC}$. When the DC bus voltage is less than the AC voltage $V_{AC}$, then the boost circuit 401 may be active and storing energy in the inductor 404 and releasing energy from the inductor 404 onto the DC bus to boost voltage of the DC bus. The energy may be stored when the switch 408 is closed and released when the switch 408 is opened.

Figure 5:
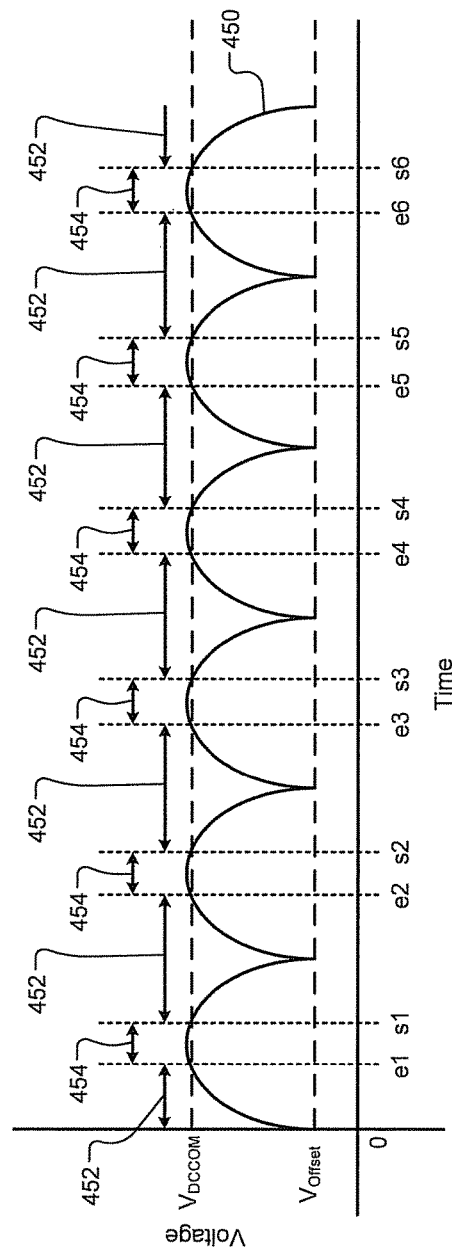
FIG. 5 is an example plot of a rectified AC signal, a predetermined DC voltage and operational switch periods in accordance with an embodiment of the present disclosure.

FIG. 5 shows a plot of a rectified AC signal 450. The rectified AC signal 450 may represent an output of the primary bridge rectifier 414 and/or an output of the secondary bridge rectifier 416 of FIG. 4. The rectified AC signal 450 may be offset from zero, such that a minimum voltage of the rectified AC signal 450 is at an offset voltage $V_{Offset}$.

The control module 250 may control operation of the driver 410 to control a state of the switch 408, such that the DC output voltage $V_{DCOUT}$ is equal to or within a predetermined range of the commanded DC voltage $V_{DCCOM}$. The control module 250 controls operation of the driver 410, such that the switch 408 is oscillated between open and closed states at a predetermined frequency during active periods 452 and is maintained in an OFF (or open) state during inactive periods 454.

During operation, an output of the diode 406 is provided to the DC output 422 while the switch 408 is in an open state and the DC output voltage $V_{DCOUT}$ is less than an output voltage of the primary bridge rectifier 414. This may occur during the active periods 452. During the active periods, voltages of the rectified AC signal 450 are increased (i.e. boosted) to match the commanded DC voltage $V_{DCCOM}$. An amount of time that the switch 408 is maintained in the OFF (or open) state affects how much a voltage of the rectified AC signal 450 is boosted to match the commanded DC voltage $V_{DCCOM}$. The boost converter 401 is ON during the active periods 452. Conversely, the boost converter 401 is OFF during the inactive periods. When the boost converter 401 is OFF, current does not pass through the inductor 404 and diode 406 to the DC bus. This may be because the diode 406 is in a reversed bias state. Pure rectification through the secondary bridge rectifier 416 may be provided when the boost converter 401 is OFF.

The ON time and the OFF time of the switch 408 per AC cycle and thus the duty cycle of the switch 408 is controlled by the control module 250. The control module 250 and/or the driver 410 may adjust the duty cycle of the switch 408 including adjusting the OFF time and/or the ON time of each pulse of the control signal $SW_{CTRL}$. Operational control of the switch 408 is further described below.

An output of the secondary bridge rectifier 416 is provided to the DC output 422 when the DC output voltage $V_{DCOUT}$ is less than an output voltage of the primary bridge rectifier 416, which may occur during (i) the active periods 452 when the switch 408 is being oscillated, and (ii) inactive periods 454 when the switch 408 is not being oscillated. During the inactive periods the switch 408 may be in an open state and the DC output voltage $V_{DCOUT}$ changes based on an output of the secondary bridge rectifier 416. The diode 406 is bypassed while the switch 408 is in the closed state. The DC output voltage $V_{DCOUT}$ may increase from a voltage less than or equal to the commanded DC voltage $V_{DCCOM}$ to a voltage greater than or equal to the commanded DC voltage $V_{DCCOM}$. The amount of increase may depend on durations of the active periods and/or the inactive periods.

In FIG. 5, start times s1-s6 and end times e1-e6 of active operation of the switch 408 are shown. The switch 408 is oscillated between ON and OFF states during the active periods 452. The switch 408 is not oscillated between ON and OFF states during the inactive periods 454. Although start times s1-s6 and end times e1-e6 are shown at certain angles (or phases) of the rectified AC signal 450, the start times s1-s6 and end times e1-e6 may be adjusted in time relative to the rectified AC signal 450. As shown, the end times e1-e6 correspond to moments in time when a voltage of the rectified AC signal 450 is increasing and matches the commanded DC voltage $V_{DCCOM}$ at a first (increasing) cross-over point. As shown, the start times s1-s6 correspond to moments in time when a voltage of the rectified AC signal 450 is decreasing and matches the commanded DC voltage $V_{DCCOM}$ at a second (decreasing) cross-over point.

Various implementations are described below with respect phase angles of $V_{AC}$ and/or outputs of the bridge rectifiers 414, 416. The implementations and corresponding conditions and task may be determined and/or performed, as described below, based on $V_{AC}$, voltages of outputs of the bridge rectifiers 414, 416 and/or voltages of an output of a corresponding power converter. The voltages may be monitored and used as an alternative to or in addition to the phase angles when performing the below described tasks.

As an example, the end times e1-e6 may be adjusted to occur earlier in time and at phase angles of the rectified AC signal 450 prior to respective increasing cross-over points with the commanded DC voltage $V_{DCCOM}$. As another example, the start times s1-s6 may be advanced to occur earlier in time and at phase angles of the rectified AC signal 450 prior to respective decreasing cross-over points with the commanded DC voltage $V_{DCCOM}$ and/or closer in time to the corresponding end times e1-e6. These adjustments may minimize how much the DC output voltage $V_{DCOUT}$ exceeds the commanded DC voltage $V_{DCCOM}$ and/or minimize peak current during the inactive periods. By having the start times s1-s6 closer in time to the end times e1-e6, the inactive periods are reduced in length, which decreases the amount of time that the output of the secondary bridge 416 is solely provided to the DC output 422 and/or decreases durations of the inactive periods.

During the active periods and due to the oscillated operation of the switch 408, the current within the inductor 404 ramps up and down. When the current ramps down, the secondary bridge rectifier 416 protects the diode 406 from transient spikes in voltage out of the inductor 404 by allowing current to pass from the secondary bridge rectifier 416 directly to the DC output 422. The secondary bridge rectifier 416 minimizes the number of components between the differential AC input 420 and the DC output 422. When current is passing through the secondary bridge rectifier 416 to the DC output 422, the current passes through a single diode of the secondary bridge rectifier 416 instead of passing through a diode of the primary bridge rectifier 414, the inductor 404, and the diode 406. This reduces the number of components from 3 to 1, which reduces voltage and power losses.

In an alternative embodiment, the frequency of oscillated operation of the switch 408 is decreased rather than deactivated. The frequency may be decreased to less than, for example, 200 kHz during low activity periods (or low activity mode). Timing of the low activity periods may be the same or similar to that of the previously described inactive periods. As an example, the frequency during the low activity periods may be an order of magnitude less than during the active periods (or active mode). As such, operation of the switch 408 may be transitioned between low activity modes and high activity modes rather than between inactive modes and active modes. The switch 408 may be operated in the low activity mode during periods between the end points e1-e6 and the successive start points s1-s6. The ON time (or closed periods) of the switch 408 may be decreased for operation in the low activity mode and increased for operation in the high activity mode.

Although the start times s1-s6 are described with respect to start times of the active or high activity mode, the start times s1-s6 also refer to end times of an inactive mode or low activity mode. Also, although the end times e1-e6 are described with respect to end times of the active or high activity mode, the end times e1-e6 also refer to start times of the inactive mode or low activity mode.

During the high-activity mode, current in the inductor 404 ramps up and down. While ramping down, the secondary bridge rectifier 416 protects the diode 406 from spikes in voltage out of the inductor 404. The secondary bridge rectifier 416 minimizes number of components between the AC input 420 and the DC bus and/or DC output 422. When transitioning from the high-activity mode to the low-activity mode, the ON/OFF frequency of the switch 408 is decreased.

Figure 6:
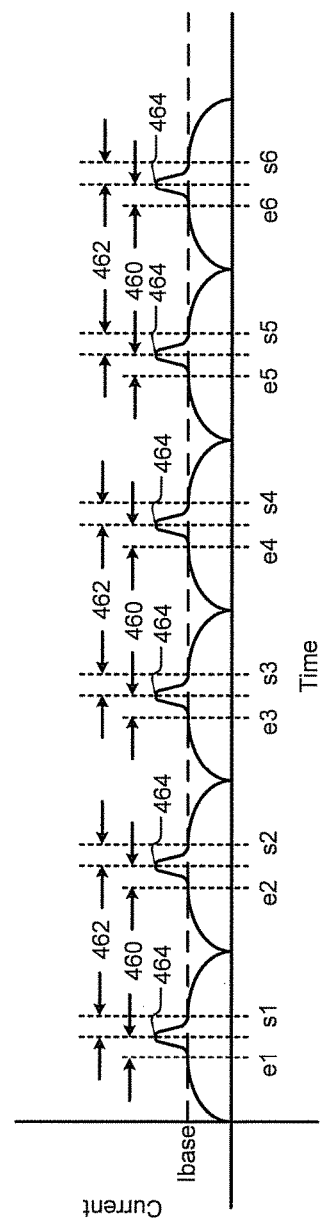
FIG. 6 is an example plot of sensed current in the drive of FIG. 2 in accordance with an embodiment of the present disclosure.

FIG. 6 shows an example of changes in an amount of current sensed by the second current sensor 412b of FIG. 4 due to the activation and deactivation of oscillated operation of the switch 408. The oscillated operation of the switch 408 is enabled at start times s1-s6 and disabled at end times e1-e6, which correspond with the start times s1-s6 and end times e1-e6 of FIG. 5. Lengths of increasing current periods 460 and decreasing current periods 462 may be adjusted to change peaks of current 464 by altering the start times s1-s6 and end times e1-e6, as described above. The peaks of current 464 may be adjusted relative to a base peak current level Ibase.

The above-described dual bridge circuit configurations of the bridge rectification circuit 402 of FIG. 4 are able to handle an increased maximum allowable forward surge current (IFSM). The secondary bridge circuit 416 is able to handle increased current over a single bypass diode arrangement, where the secondary bridge circuit 416 is replaced with two diodes instead of a full bridge. Arrangement provides higher efficiency if active PFC is not running. As an alternative, a single diode may be used to replace the secondary bridge 416 by (i) connecting the anode of the single diode to the cathodes of the two diodes connected to the first current sensor 412a, and (ii) a cathode of the diode to the output terminal 422. The dual bridge circuit configurations also provide the conduction path for partial PFC operation when the peak of the input line voltage $V_{AC}$ is greater than $V_{DCOUT}$.

Figure 7:
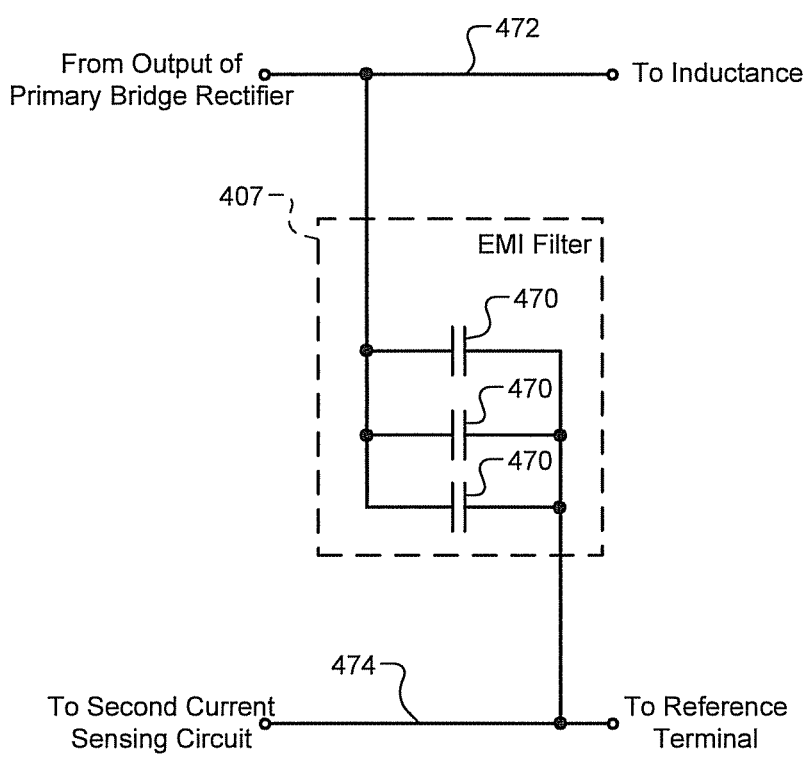
FIG. 7 is a schematic diagram of an example electromagnetic interference (EMI) filter in accordance with an embodiment of the present disclosure.

FIG. 7 shows an example of the EMI filter 407. The EMI filter 407 may include one or more capacitors 470. If more than one capacitor is included, the capacitors are connected in parallel between a first bus 472 and a second bus 474. The first bus is connected between the output of the bridge rectifier 414 and the inductor 404. The second bus 474 is connected between the second current sensor 412b and the reference terminal 426. By having multiple (e.g., 3) capacitors connected in parallel, parasitic inductance associated with the EMI filter 407 is reduced.

Figure 8:
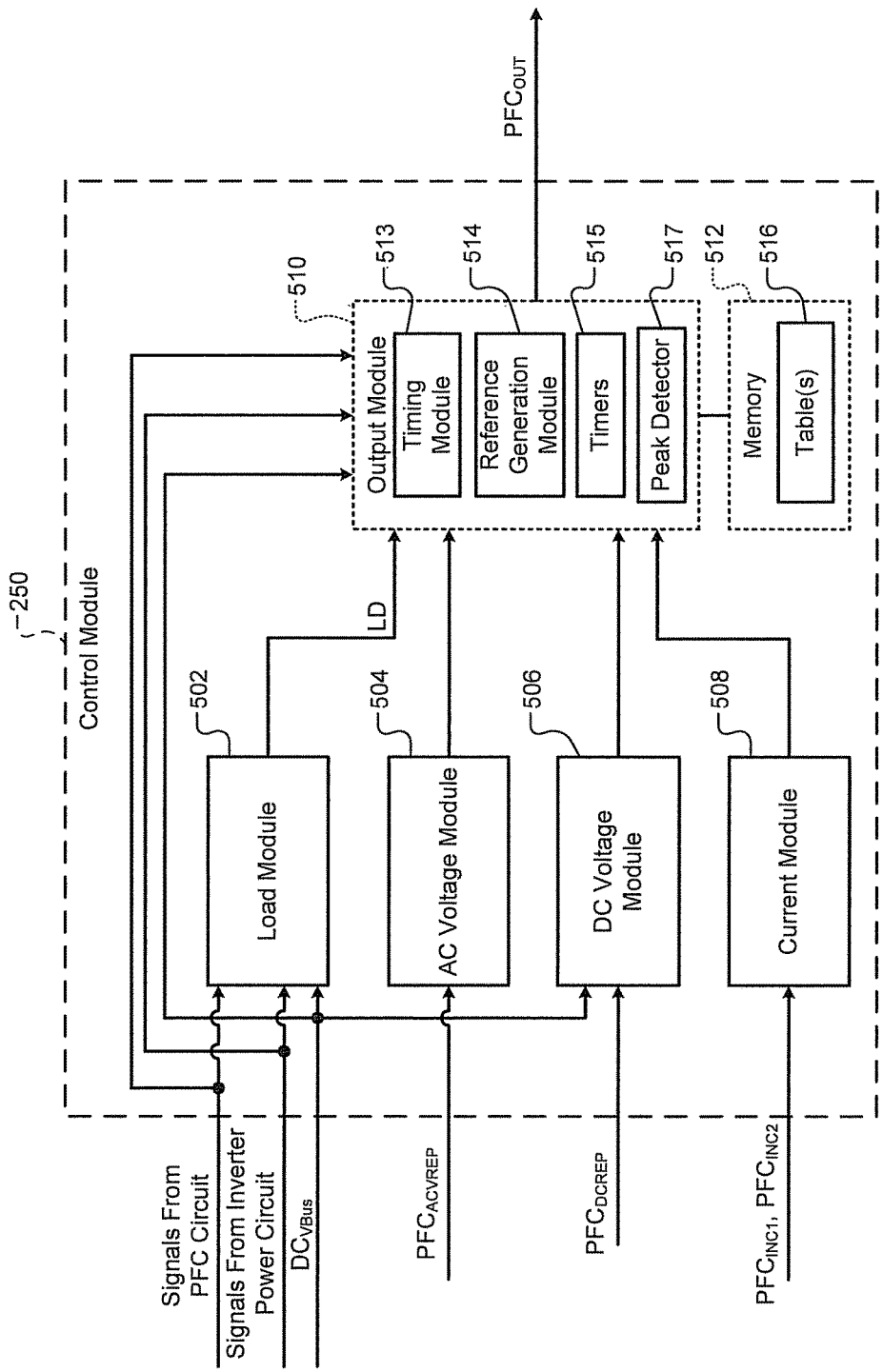
FIG. 8 is a functional block diagram of an example of a PFC switch control module in accordance with an embodiment of the present disclosure.

FIG. 8 shows the control module 250 that includes a load module 502, an AC voltage module 504, a DC voltage module 506, a current module 508, an output module 510 and a memory 512. Although the modules 502, 504, 506, 508, 510 and the memory 512 are shown as part of the control module 250, one or more of the modules 502, 504, 506, 508, 510 and the memory 512 may be part of or also included in the system control module 270. The information (data, parameters, and signals) received and/or generated by the module 502, 504, 506, 508, 510 may be shared between the modules 502, 504, 506, 508, 510. The output module 510 may include a timing module 513, a reference generation module 514, timers 515 and/or a peak detector 517. The memory 512 may include one or more tables 516. Operation of the modules 502, 504, 506, 508, 510 and memory 512 are described below with respect to the methods of FIGS. 9 and 11-12.

The output module 510 may operate in the active mode, the inactive mode, the low activity mode, the high activity mode, a full PFC mode, and a partial PFC mode. The full PFC mode may refer to when the boosting converter 401 is continuously in an active or high activity mode to boost the DC bus voltage to match the commanded DC voltage $V_{DCCOM}$. This may occur when the commanded DC voltage $V_{DCCOM}$ is greater than or equal to a peak voltage of the AC voltage $V_{AC}$ and/or outputs of the bridge rectifiers 414, 416. The partial PFC mode refers to switching between operating in (i) an active or high activity mode and (ii) an inactive or low activity mode.

In one embodiment, the timing module 513 switches from operating in the full PFC mode to operating in the partial PFC mode. The partial PFC mode reduces power losses by operating at reduced DC voltages and provides improved operating efficiency. The timing module 513 may, for example, operate in the partial PFC mode during light compressor loading conditions (e.g., load on compressor less than a predetermined load) and operate in the full PFC mode during heavy compressor loading conditions (e.g., load on compressor greater than or equal to the predetermined load).

Referring to FIGS. 6 and 8, although during the inactive periods the current is permitted to increase above a current threshold level corresponding to a transition end time as shown, the amount of increase can be controlled and/or minimized. Also, although the current increases that occur during the inactive periods can negatively affect a power factor of the PFC circuit, the improved efficiency provided during the partial PFC mode outweighs the small negative affect on the power factor. The efficiency may refer to a ratio between output power and input power of the boost converter 401, the PFC circuit 212 and/or the drive 132, which may be less than or equal to 1%.

For further defined structure of the modules of FIGS. 2-4 see below provided method of FIGS. 9 and 12 and below provided definition for the term "module".

Figure 9:
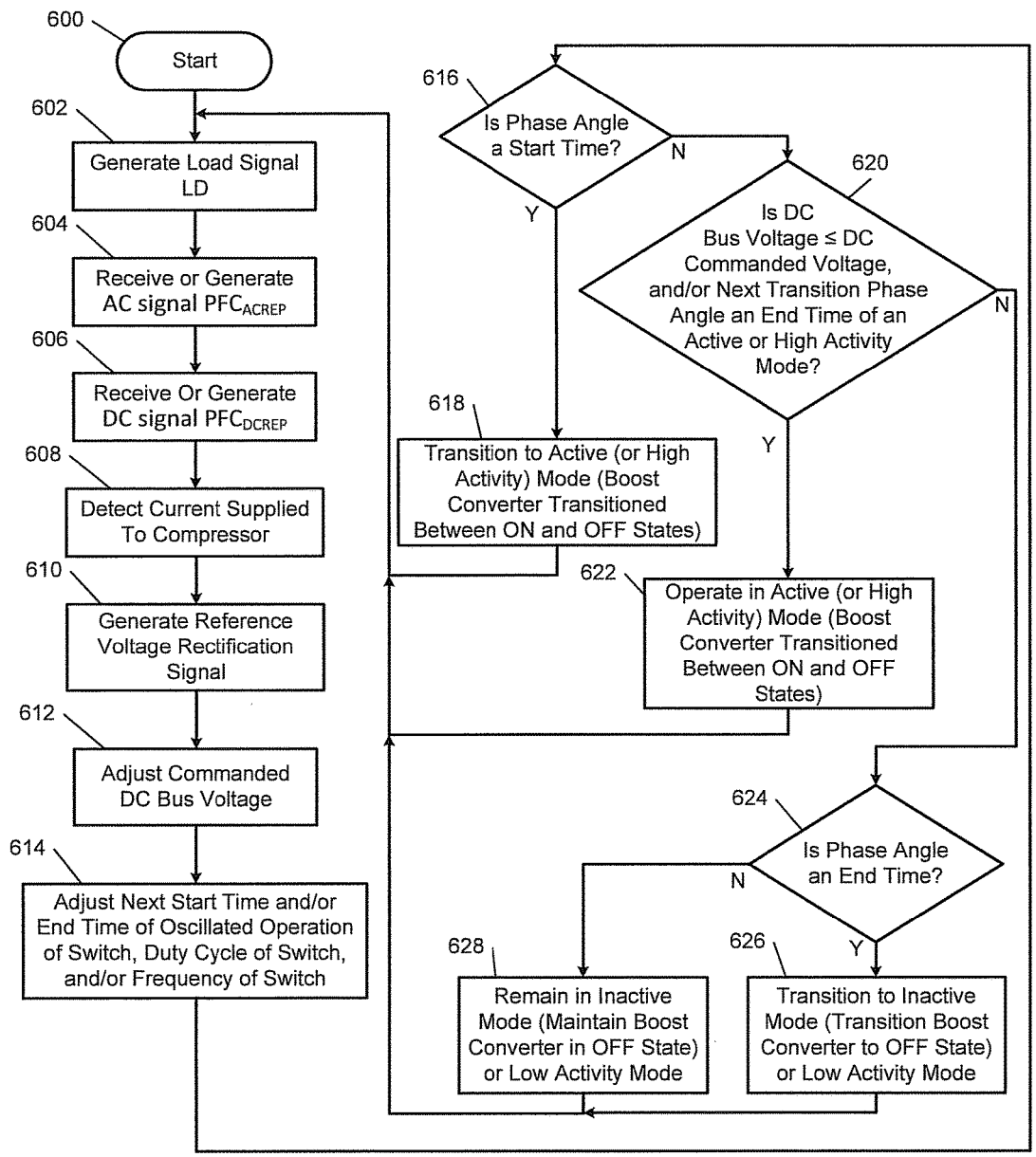
FIG. 9 is a flow diagram illustrating an example method of operating a drive with a PFC circuit having a boost converter in accordance with an embodiment of the present disclosure.
Figure 11:
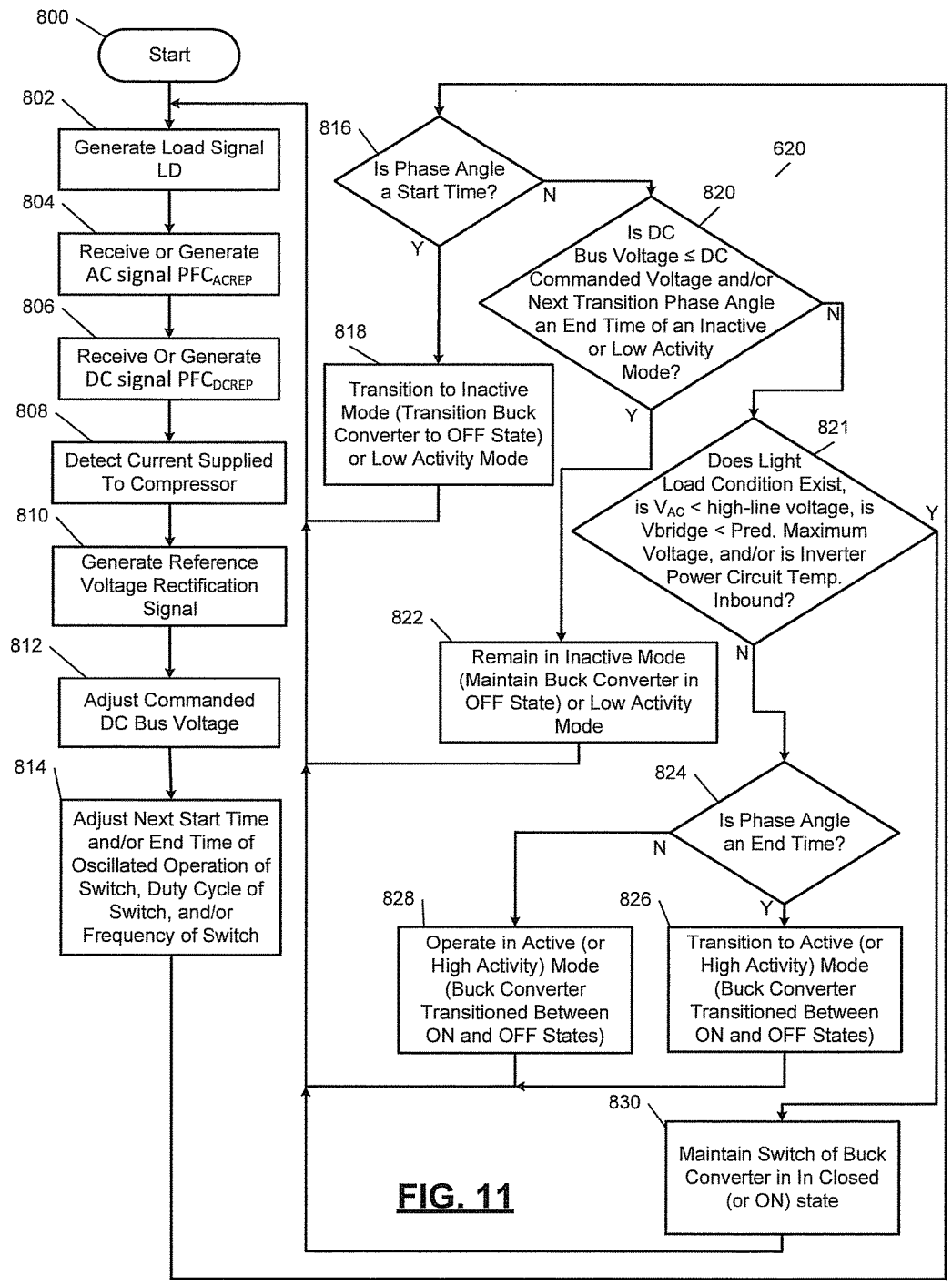
FIG. 11 is a flow diagram illustrating an example method of operating a drive with a PFC circuit having a buck converter in accordance with an embodiment of the present disclosure.
Figure 12:
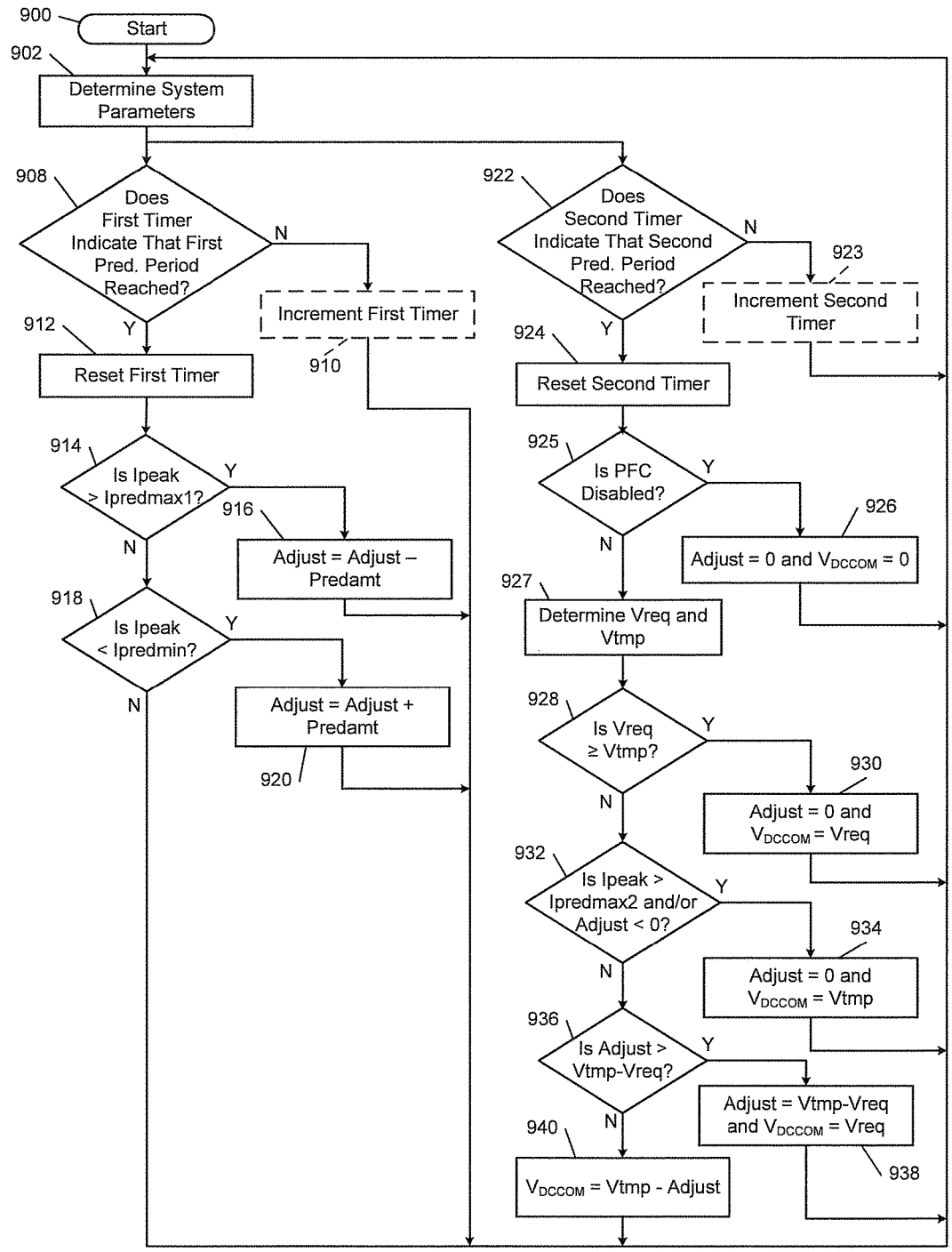
FIG. 12 is a flow diagram illustrating an example method of operating a drive with a PFC circuit having a power converter in accordance with an embodiment of the present disclosure.

The systems disclosed herein may be operated using numerous methods, example methods are illustrated in FIGS. 9 and 11-12. In FIG. 9, a method of operating a drive (e.g., the drive 132 of FIG. 2) with a boost converter (e.g., the boost converter 401 of FIG. 4) and a PFC circuit (e.g., the PFC circuit 212 of FIG. 2) is shown. Although the following tasks are primarily described with respect to the implementations of FIGS. 4-8, the tasks may be easily modified to apply to other implementations of the present disclosure. The tasks may be iteratively performed. Tasks 602-614 may be performed while tasks 616-628 are performed.

The method may begin at 600. At 602, the load module 502 may receive various signals and parameters from (i) the PFC circuit 212 of FIG. 2 including signals and parameters from the portion 400 of FIG. 4, and (ii) the inverter power circuit 208 of FIG. 2. The signals and parameters may include a voltage $DC_{VBus}$ of the DC bus between the PFC circuit 212 and the inverter power circuit 208. At least some of the signals and parameters are disclosed in and described with respect to FIG. 2. The signals and parameters may include DC signals and/or measured DC voltages corresponding to DC voltages on the DC bus, amounts of current supplied to the compressor 102, voltages of power supplied to the compressor 102, sensor input data, commanded and/or manually entered parameters, and/or other shared data and parameters. The load module 502 may generate a load signal LD that is indicative of a load on the compressor 102 based on the stated signals and parameters. The load signal LD may be generated based on a load algorithm, one or more maps, one or more equations, one or more tables (e.g., one or more of the tables 516), predetermined (or historical) data, and/or predicted (or estimated) future data. The load algorithm, maps, equations and/or tables may relate the signals and parameters to provide a calculated load and/or value indicative of the load on the compressor.

At 604, the AC voltage module 504 may receive or generate the AC signal $PFC_{ACREP}$. The AC voltage module 504 may detect voltages at the outputs of the bridge rectifiers 414, 416. The AC signal $PFC_{ACREP}$ may be set equal to and/or be representative of one or more of the outputs of the bridge rectifiers 414, 416.

At 606, the DC voltage module 506 may receive or generate the DC signal $PFC_{DCREP}$. The DC voltage module 506 may (i) detect the voltage $DC_{VBus}$ at the DC bus between the PFC circuit 212 and the inverter power circuit 208, and/or (ii) receive a DC bus voltage indication signal from a sensor and/or module external to the control module 250 and/or the DC voltage module 506.

At 608, the current module 508 may determine an amount of current: supplied to the compressor 102 and/or passing through one or more of the current sensors 412. This may be based on the current sense signals $PFC_{INC1}$, $PFC_{INC2}$.

At 610, the reference generation module 514 may generate a reference sinusoidal signal and/or a reference rectified sinusoidal signal. The references signals may be generated based on the AC input signal $V_{AC}$, the outputs of the bridge rectifiers 414, 416, and/or an output of the EMI filter 407. In one embodiment, the reference signals are generated based on the output of the EMI filter 407. This may include estimating the phase of the output of the EMI filter 407. The AC input signal $V_{AC}$, the outputs of the bridge rectifiers 414, 416 and/or the output of the EMI filter 407 may have noise or irregular activity as not to be a perfect sinusoidal and/or rectified sinusoidal waves. The reference generation module 514 generates the reference signals to be pure sinusoidal and/or rectified sinusoidal reference signals having the same phase as the AC input signal $V_{AC}$, the outputs of the bridge rectifiers 414, 416 and/or the output of the EMI filter 407. This synchronizes the reference signals to the AC input signal $V_{AC}$, the outputs of the bridge rectifiers 414, 416 and/or the output of the EMI filter 407. The reference generation module 514 may output reference data signals including phase, frequency, period, and/or other time-varying derivative (or gradient) of the reference data signals. The reference data may include scaled versions of the reference data signals.

At 612, the timing module 513 generates the commanded DC voltage $V_{DCCOM}$ to be less than a peak (or maximum) AC input voltage $V_{AC}$ and/or a peak (or maximum) output voltage of the bridge rectifiers 414, 416. This is unlike traditional PFC circuits, which always have the commanded DC voltages above a peak AC input voltage. The commanded DC voltage $V_{DCCOM}$ may be set to be within a predetermined range of the peak output voltage of one or more of the bridge rectifiers 414, 416. As an example, as the load on the compressor 102 increases, the commanded DC voltage $V_{DCCOM}$ may be decreased. By lowering the commanded DC voltage $V_{DCCOM}$, the amount of time between end times and successive start times (or times between active modes and following inactive modes) of oscillated switch control operation increases. This allows the DC output voltage $V_{DCOUT}$ and current to increase during inactive periods to a higher peak voltage and higher peak current. Mode transition points refer to transitions between (i) the active (and/or high activity) mode (oscillated switch operation enabled) and (ii) the inactive mode (oscillated switch operation disabled) or low activity mode. Examples of mode transition points are shown as cross-over points in FIG. 5, however the mode transition points may not match corresponding cross-over points depending on the start times and end times (i.e. phase angles and/or corresponding voltages) of the mode transition points. As another example, by increasing the commanded DC voltage $V_{DCCOM}$ relative to the peak voltage of $V_{AC}$ and/or outputs of the bridge rectifiers 414, 416, periods when oscillated operation of the switch 408 are decreased in length. A small change in the commanded DC voltage $V_{DCCOM}$ can make a large difference in peak current supplied.

At 614, the timing module 513 may adjust (i) next start times and/or end times of the oscillated operation of the switch 408, (ii) duty cycle of the oscillated operation of the switch 408, and/or (iii) frequency of the oscillated operation of the switch 408. This may include adjusting times of rising and/or falling edges of the control signal $SW_{CTRL}$. The stated adjustment(s) may be based on the load of the compressor determined at 602, the AC voltage received and/or generated at 604, the DC voltage received and/or generated at 606, one or more of the current levels detected at 608, and/or one or more of the reference signals generated at 610. The adjustments may also be based on capacitance of the DC bus, torque commanded of the compressor 102, predicted voltages of the outputs of the bridge rectifiers 414, 416, and/or other parameters associated with operation of the portion 400. The adjustments may advance or delay the transition start times and/or the transition end times. The adjustments may be determined based on equations, algorithms, maps, and/or tables relating the stated parameters, which may be stored in the memory 512 and accessed by the timing module 513. The adjustments may also be based on previous (historical) values and/or results, which may be stored in and accessed from the memory 512. For example, if a last peak DC bus voltage or peak detected current (current detected by one of the current sensors 412a, 412b) was above a predetermined threshold, than the next transition end time or transition start time may be advanced to reduce the peak DC bus voltage or peak detected current.

At 616, the timing module 513 determines whether the phase angle of the output of one or more of the bridge rectifiers 414, 416 matches a predetermined start time of an active period. In addition or alternatively, voltages of the outputs of the bridge rectifiers 414, 416 (or input of the inductor 404) and/or the output of the boost converter 401 (or output of the diode 406) may be compared to predetermined voltages for the predetermined start time to determine whether the stated condition exists. If there is a match, task 618 is performed, otherwise task 620 is performed.

At 618, the timing module 513 transitions to the active (or high activity) mode. This includes oscillated operation of the switch 408 at a first (or high) frequency. The duty cycle of the switch 408, including durations of ON times and OFF times, may correspond to duty cycle information determined at 614. Task 602 may be performed subsequent to task 618.

At 620, the timing module 513 may determine whether the DC bus voltage is less than or equal to the commanded DC voltage $V_{DCCOM}$ and/or whether a next transition phase angle (next phase angle at which point a transition between operating modes occurs) is an end time (e.g., one of the end times e1-e6 of FIGS. 5-6) for an active mode and/or high activity mode. In addition or alternatively, voltages of the outputs of the bridge rectifiers 414, 416 and/or the boost converter 401 may be compared to predetermined voltages for the end time to determine whether one or more of the stated conditions exist. The timing module 513 may also or alternatively determine whether the current transition phase angle is within a predetermined phase angle range (e.g., between a last start time and a subsequent end time) of a current active mode and/or high activity mode. In addition or alternatively, voltages of the outputs of the bridge rectifiers 414, 416 and/or the boost converter 401 may be compared to a predetermined voltage ranges corresponding to the predetermined phase angle range to determine whether the stated condition exists. At the end time, the timing module 513 transitions from an active and/or high activity mode to an inactive or low activity mode. If the DC bus voltage is less than or equal to the commanded DC voltage $V_{DCCOM}$ and/or the next transition phase angle is at an end time for an active mode and/or high activity mode, then task 622 is performed, otherwise task 624 is performed.

At 622, the timing module 513 operates in the active mode and/or high activity mode. Task 602 may be performed subsequent to task 622. At 624, the timing module 513 determines whether the phase angle is an end time of an active mode and/or a high activity mode. In addition or alternatively, voltages of the outputs of the bridge rectifiers 414, 416 and/or the boost converter 401 may be compared to predetermined voltages for the end time to determine whether the stated condition exists. If the phase angle is an end time, task 626 is performed, otherwise task 628 is performed. At 626, the timing module 513 transitions to the inactive mode or low activity mode. If the timing module 513 transitions to the inactive mode, then the boost converter 401 is transitioned to an OFF state and the switch 408 is switched to a closed state. This allows for pure rectification via the secondary bridge rectifier 416. The output of the secondary bridge rectifier 416 is provided to the DC output 422 without receiving current from the primary bridge rectifier 414, the inductor 404 and the diode 406. The pure rectification reduces voltage and power losses. If the timing module 513 transitions to the low activity mode, then oscillated operation of the switch 408 continues, but at a reduced frequency and/or at an increased duty cycle, such that OFF times of the switch 408 are increased and/or the ON times of the switch 408 are decreased. Task 602 may be performed subsequent to task 626. At 628, the timing module 513 remains in the inactive mode or operating in the low activity mode. Task 602 may be performed subsequent to task 628.

Although the above tasks 616-628 are provided in a particular order, tasks 616-628 may be performed in a different order. As an example, task 624, 626, 628 may be performed prior to tasks 616, 618, 620 and 622. If task 624, 626, 628 are performed prior to tasks 616, 618, 620 and 622, then task 620 may be modified to determine whether the DC bus voltage is greater than or equal to the commanded voltage, the next transition phase angle is a start time of an inactive mode or low activity mode, and/or the current phase angle is within a predetermined range (e.g., between an end time of an active mode and/or high activity mode and a subsequent start time of the active mode and/or high activity mode). This may include comparing voltages of the outputs of the bridge rectifiers 414, 416 and/or the boost converter 401 to corresponding predetermined voltages and ranges to effectively determine if the next transition phase angle is a start time of an inactive mode or low activity mode, and/or the current phase angle is within a predetermined range.

Figure 10:
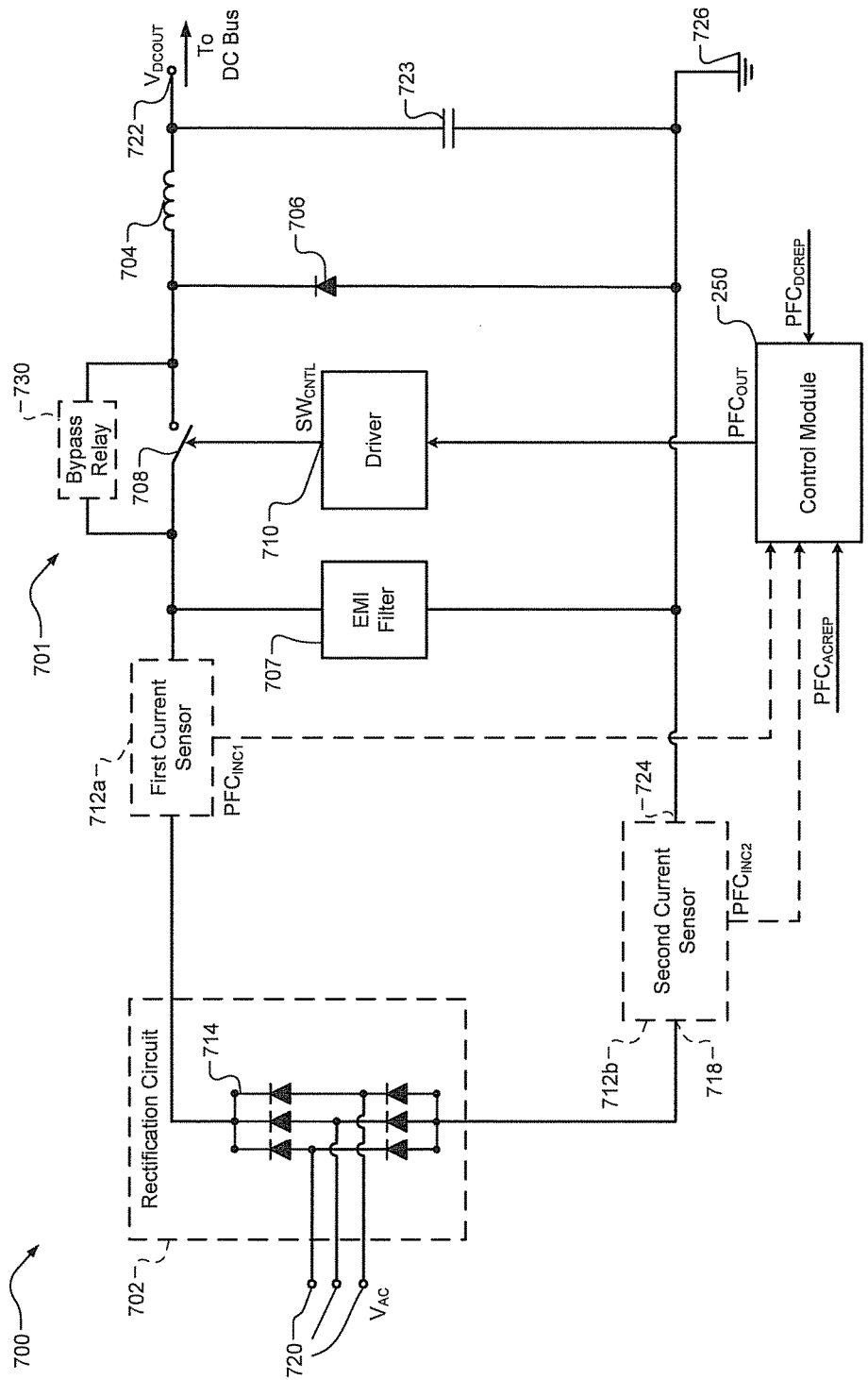
FIG. 10 is a schematic diagram of an example of a portion of a PFC circuit of a drive including a buck converter in accordance with an embodiment of the present disclosure.

FIG. 10 is a schematic diagram of a portion 700 of a PFC circuit (e.g., the PFC circuit 212 of FIG. 2) of a drive (e.g., the drive 132 of FIG. 1) including a buck converter 701. The portion 700 includes a rectification circuit 702, an inductor 704, a diode 706, an EMI filter 707, a switch 708, a driver 710 and one or more current sensors 712a, 712b. The rectification circuit 702 includes a bridge rectifier 714. The bridge rectifier 714 may include six diodes, as shown. The bridge rectifier 714 includes AC inputs, a return input and an output. The AC inputs of the bridge rectifier 714 receive a 3-phase AC voltage $V_{AC}$ from a 3-phase AC input 720. The return inputs are connected to a same output 718 of the second current sensor 712b. The output of the bridge rectifier 714 is connected to the switch 708. An output voltage of the bridge rectifier 714 may be referred to as a main voltage.

The EMI filter 707 may be connected to the output of the bridge rectifier 714 or an output of the first current sensor 712a. The EMI filter 707 filters output of the bridge rectifier 714. The EMI filter 707 decouples the buck converter 701 from the bridge rectifier 714 to minimize noise generated by the buck converter 701 from being seen at the bridge rectifier 714. An example EMI filter that may replace the EMI filter 707 is shown in FIG. 7. The DC output 722 may be connected to an input of the DC bus, which is connected between the PFC circuit 212 and the inverter power circuit 208 of FIG. 2.

The inductor 704, diode 706, switch 708 and driver 710 provide the buck converter 701. The buck converter 701 operates as a power converter. The buck converter 701, instead of boosting voltage as does the boost converter 401 of FIG. 4, steps down voltage while stepping up current. The buck converter 701 may be (i) OFF (operating in an inactive mode and switch 708 is held in an open state) or ON and switching the switch 708 between ON and OFF states at a low frequency for rising and falling portions of rectified AC signal out of the bridge rectifier 714, or (ii) ON and switching the switch 708 between ON and OFF states at a high frequency near peaks of the rectified AC signal out of the bridge rectifier 714. This is the opposite of the boost converter 401 of FIG. 4, which is (i) ON and switching the switch 408 between ON and OFF states at a high frequency during rising and falling portions of a rectified AC signals out of the bridge rectifiers 414, 416, and (ii) OFF (switch 408 is held open) or ON and switching the switch 408 between ON and OFF states at a low frequency near peaks of the rectified AC signals out of the bridge rectifiers 414, 416. The operation of the buck converter 701 limits the DC output voltage $V_{DCOUT}$ at the DC output terminal 722 while reducing power losses of the buck converter 701.

The timing module 513 of FIG. 8 may command a DC output voltage $V_{DCOUT}$ and/or DC bus voltage (first predetermined voltage) that are greater than a peak voltage of the input voltage $V_{AC}$, the output of the bridge rectifier 714, and/or during rising and falling portions of the rectified AC signal out of the bridge rectifier 714. The timing module 513 may command a DC output voltage $V_{DCOUT}$ and/or a DC bus voltage (second predetermined voltage) that are less than the peak voltage of the input voltage $V_{AC}$ and/or the output of the bridge rectifier 714 during a period when the DC output voltage $V_{DCOUT}$ and/or the DC bus voltage are within a predetermined range. The predetermined range may be centered on the peak voltage of the input voltage $V_{AC}$ and/or the output of the bridge rectifier 714. The commanded voltages may be determined by the control module 250.

The inductor 704 is connected (i) at a first end, to the switch and a cathode of the diode 706, and (ii) at a second end, to the DC output terminal 722 and a capacitor 723. The inductor 704 operates as a choke and may be small (e.g., 80 micro-Henry (μH)). The diode 706 may be formed of, for example, silicon carbide SiC. The anode of the diode 706 is connected to an input 724 of the second current sensor 712b and a reference terminal 726 (e.g., a ground reference). The switch 708 is connected in series with the inductor 704 between (i) the output of the primary bridge rectifier 714 and/or the first current sensor 712a and (ii) the inductor 704.

The switch 708 may be a transistor, such as a super-junction field effect transistor (FET), a power metal oxide semiconductor field-effect transistor (MOSFET), and/or a super-junction MOSFET. The switch 708 may be configured to be oscillated between ON (e.g., closed) and OFF (e.g., open) states at a high frequency (e.g., greater than or equal to 200 kilo-hertz (kHz)). A first terminal of the switch 708 is connected to the output of the primary bridge rectifier 714 or an output of the first current sensor 712a. A second terminal of the switch 708 is connected to the inductor 704 and a cathode of the diode 706.

A control terminal of the switch 708 receives a control signal $SW_{CTRL}$ from the switch driving (or control) circuit 710. The driver 710 generates the control signal $SW_{CTRL}$ based on an output signal $PFC_{OUT}$ of the control module 250. The control module 250 generates the output signal $PFC_{OUT}$ based on: one or more current sense signal $PFC_{INC1}$, $PFC_{INC2}$ from the current sensors 712; an AC signal $PFC_{ACREP}$ representative of the AC voltage $V_{AC}$; and a DC signal $PFC_{DCREP}$ that is representative of the DC output voltage $V_{DCOUT}$ of the PFC circuit 212. The current sense signal $PFC_{INC1}$ may be equal to and/or indicative of an amount of current (i) passing through the inductor 704, and/or (ii) passing through the PFC circuit 212. The current sense signal $PFC_{INC2}$ may be equal to and/or indicative of an amount of current (i) returning from the DC output 722 to the second current sensor 712b, and/or (ii) passing through the PFC circuit 212. The AC signal $PFC_{ACREP}$ may be equal to and/or indicative of the AC voltage $V_{AC}$. The DC signal $PFC_{DCREP}$ may be equal to and/or indicative of the DC output voltage $V_{DCOUT}$.

The capacitor 723 may be connected between the DC output 722 and the reference terminal 726. The capacitor 723 may be connected (i) at a first end, to the inductor 704 and the DC output terminal 722, and (ii) at a second end, to the input 724 of the second current sensor 712b and the reference terminal 726.

The buck converter 701 may be turned ON (i.e. the switch 708 is closed) and is maintained in the ON state, such that there is no switching loses. This may occur during light load conditions. For further defined structure of the modules of FIGS. 2-4 and 10 see below provided methods of FIGS. 11-12 and below provided definition for the term "module".

In one embodiment, the buck converter 701 includes a bypass relay 730 that is connected across the switch 708 and is controlled by the control module 250. The bypass relay 730 may be ON (i.e. conducting) and the switch 708 may be OFF (or OPEN) when $V_{AC}$ and/or Vbridge (voltage out of rectification circuit 702) is less than a maximum allowable predetermined voltage (e.g., a maximum voltage that can be applied to the corresponding power module and/or received by the portion 700) and/or when the level of current out of the inverter power circuit 232 is less than a predetermined maximum level of current. The bypass relay 730 may be OFF (i.e. not conducting) and the switch 708 may be ON (or CLOSED) or pulse width modulated when $V_{AC}$ and/or Vbridge is greater than or equal to the maximum allowable predetermined voltage and/or when the level of current out of the inverter power circuit 232 is greater than or equal the predetermined maximum level of current. As described below, peak current mode control or average current mode control may be performed when the switch 708 is ON or pulse width modulated. This may include adjusting the duty cycle and/or frequency of the $SW_{CTRL}$. The stated operation of the bypass relay 730 and switch 708 may be performed as described below with respect to FIGS. 17-18 for the first partial buck mode.

In FIG. 11, shows a method of operating a drive (e.g., the drive 132 of FIG. 2) with a buck converter (e.g., the buck converter 701) and a PFC circuit (e.g., the PFC circuit 212 of FIG. 2) is shown. Although the following tasks are primarily described with respect to the implementations of FIGS. 8 and 10, the tasks may be easily modified to apply to other implementations of the present disclosure. The tasks may be iteratively performed. Tasks 802-814 may be performed while tasks 816-828 are performed.

The method may begin at 800. At 802, the load module 502 may receive various signals and parameters from (i) the PFC circuit 212 of FIG. 2 including signals and parameters from the portion 700 of FIG. 10, and (ii) the inverter power circuit 208 of FIG. 2. The signals and parameters may include a voltage $DC_{VBus}$ of the DC bus between the PFC circuit 212 and the inverter power circuit 208. At least some of the signals and parameters are disclosed in and described with respect to FIG. 2. The signals and parameters may include DC signals and/or measured DC voltages corresponding to DC voltages on the DC bus, amounts of current supplied to the compressor 102, voltages of power supplied to the compressor 102, sensor input data, commanded and/or manually entered parameters, and/or other shared data and parameters. The load module 502 may generate a load signal LD that is indicative of a load on the compressor 102 based on the stated signals and parameters. The load signal LD may be generated based on a load algorithm, one or more maps, one or more equations, one or more tables (e.g., one or more of the tables 516), predetermined (or historical) data, and/or predicted (or estimated) future data. The load algorithm, maps, equations and/or tables may relate the signals and parameters to provide a calculated load and/or value indicative of the load on the compressor.

At 804, the AC voltage module 504 may receive or generate the AC signal $PFC_{ACREP}$. The AC voltage module 504 may detect voltages at the output of the bridge rectifier 714. The AC signal $PFC_{ACREP}$ may be set equal to and/or be representative of one or more of the output of the bridge rectifier 714.

At 806, the DC voltage module 506 may receive or generate the DC signal $PFC_{DCREP}$. The DC voltage module 506 may (i) detect the voltage $DC_{VBus}$ at the DC bus between the PFC circuit 212 and the inverter power circuit 208, and/or (ii) receive a DC bus voltage indication signal from a sensor and/or module external to the control module 250 and/or the DC voltage module 506.

At 808, the current module 508 may determine an amount of current: supplied to the compressor 102 and/or passing through one or more of the current sensors 712. This may be based on the current sense signals $PFC_{INC1}$, $PFC_{INC2}$.

At 810, the reference generation module 514 may generate a reference sinusoidal signal and/or a reference rectified sinusoidal signal. The references signals may be generated based on the AC input signal $V_{AC}$, the output of the bridge rectifier 714, and/or an output of the EMI filter 707. In one embodiment, the reference signals are generated based on the output of the EMI filter 707. This may include estimating the phase of the output of the EMI filter 707. The AC input signal $V_{AC}$, the output of the bridge rectifier 714 and/or the output of the EMI filter 707 may have noise or irregular activity as not to be perfect sinusoidal and/or rectified sinusoidal waves. The reference generation module 514 generates the reference signals to be pure sinusoidal and/or rectified sinusoidal reference signals having the same phase as the AC input signal $V_{AC}$, the output of the bridge rectifier 714 and/or the output of the EMI filter 707. This synchronizes the reference signals to the AC input signal $V_{AC}$, the output of the bridge rectifier 714 and/or the output of the EMI filter 707. The reference generation module 514 may output reference data including phase, frequency, period, and/or other time-varying derivative (or gradient) of the reference signals. The reference data may include scaled versions of the reference signals.

At 812, the timing module 513 generates the commanded DC voltage $V_{DCCOM}$ to be less than a peak (or maximum) AC input voltage $V_{AC}$ and/or a peak (or maximum) output voltage of the bridge rectifier 714. This is unlike traditional PFC circuits, which always have the commanded DC voltages above a peak AC input voltage. The commanded DC voltage $V_{DCCOM}$ may be set to be within a predetermined range of the peak output voltage of the bridge rectifier 714. As an example, as the load on the compressor 102 increases, the commanded DC voltage $V_{DCCOM}$ may be decreased. By lowering the commanded DC voltage $V_{DCCOM}$, the amount of time between end times and successive start times (or times between active modes and following inactive modes) of oscillated switch control operation increases. This allows the DC output voltage $V_{DCOUT}$ to increase during inactive periods to a higher peak voltage. Mode transition points refer to transitions between (i) the active (and/or high activity) mode (oscillated switch operation enabled) and (ii) the inactive mode (oscillated switch operation disabled) or low activity mode. Examples of mode transition points are shown as cross-over points in FIG. 5, however the mode transition points may not match corresponding cross-over points depending on the start times and end times (i.e. phase angles) of the mode transition points. As another example, by increasing the commanded DC voltage $V_{DCCOM}$ relative to the peak voltage of $V_{AC}$ and/or output of the bridge rectifier 714, periods when oscillated operation of the switch 708 are decreased in length. A small change in the commanded DC voltage $V_{DCCOM}$ can make a large difference in peak current supplied.

At 814, the timing module 513 may adjust (i) next start times and/or end times of the oscillated operation of the switch 708, (ii) duty cycle of the oscillated operation of the switch 708, and/or (iii) frequency of the oscillated operation of the switch 708. This may include adjusting times of rising and/or falling edges of the control signal $SW_{CTRL}$. The stated adjustment(s) may be based on the load of the compressor determined at 802, the AC voltage received and/or generated at 804, the DC voltage received and/or generated at 606, one or more of the current levels detected at 808, and/or one or more of the reference signals generated at 810. The adjustments may also be based on capacitance of the DC bus, torque commanded of the compressor 102, predicted voltages of the output of the bridge rectifier 714, and/or other parameters associated with operation of the portion 700. The adjustments may advance or delay the transition start times and/or the transition end times. The adjustments may be determined based on equations, algorithms, maps, and/or tables relating the stated parameters, which may be stored in the memory 512 and accessed by the timing module 513. The adjustments may also be based on previous (historical) values and/or results, which may also be stored in and accessed from the memory 512. For example, if a last peak DC bus voltage or peak detected current (current detected by one of the current sensors 712a, 712b) was above a predetermined threshold, than the next transition end time or transition start time may be advanced to reduce the peak DC bus voltage and/or peak detected current.

At 816, the timing module 513 determines whether the phase angle of the output of the bridge rectifier 714 matches a predetermined start time of an active period. In addition or alternatively, voltages of the output of the bridge rectifier 714 (or input to switch 708) and/or the output of the buck converter 701 (or output of the inductor 704) may be compared to predetermined voltages for the predetermined start time to determine whether the stated condition exists. If there is a match, task 818 is performed, otherwise task 620 is performed.

At 818, the timing module 513 transitions to the inactive mode or low activity mode. If the timing module 513 transitions to the inactive mode, then the buck converter 701 is transitioned to an OFF state and the switch 408 is switched to an open state. If the timing module 513 transitions to the low activity mode, then oscillated operation of the switch 708 continues, but at a reduced frequency and/or at a reduced duty cycle, such that OFF times of the switch 708 are increased and/or ON times of the switch 708 are decreased. Task 802 may be performed subsequent to task 818.

At 820, the timing module 513 may determine whether the DC bus voltage is less than or equal to the commanded DC voltage $V_{DCCOM}$ and/or whether a next transition phase angle (next phase angle at which point a transition between operating modes occurs) is an end time (e.g., one of the end times e1-e6 of FIGS. 5-6) for an inactive mode and/or low activity mode. In addition or alternatively, voltages of the output of the bridge rectifier 714 and/or the buck converter 701 may be compared to predetermined voltages for the predetermined end time to determine whether one or more of the stated conditions exist. The timing module 513 may also or alternatively determine whether the current transition phase angle is within a predetermined range (e.g., between a last start time and a subsequent end time) of a current inactive mode or low activity mode. In addition or alternatively, voltages of the output of the bridge rectifier 714 and/or the buck converter 701 may be compared to predetermined voltages for the predetermined range to determine whether the stated condition exists. At the end time, the timing module 513 transitions from an inactive mode or low activity mode to an active and/or high activity mode. If the DC bus voltage is less than or equal to the commanded DC voltage $V_{DCCOM}$ and/or the next transition phase angle is at an end time for an inactive mode or low activity mode, then task 822 is performed, otherwise task 821 is performed.

At 821, the timing module 513 determines whether (i) a light load condition exists, (ii) $V_{AC}$ is less than a "high-line" voltage (is at or near a maximum operating voltage) and/or voltage out of the bridge 714 (or Vbridge) is less than a predetermined maximum voltage, and/or (iii) if temperature of the inverter power circuit 232 is inbound (i.e. within a predetermined temperature range). By checking if $V_{AC}$ is less than the "high-line" voltage and/or output of the bridge 714 Vbridge is less than the predetermined maximum voltage, the system prevents stress on the inverter power circuit 232 of FIG. 2. If a light load condition exists, $V_{AC}$ is less than a "high-line" voltage, Vbridge is less than a predetermined maximum voltage, and/or the temperature of the inverter power circuit 232 is inbound, then task 830 is performed, otherwise task 824 is performed. In one embodiment, when (i) a light load condition exists, (ii) $V_{AC}$ is less than a "high-line" voltage and/or Vbridge is less than a predetermined maximum voltage, and (iii) the temperature of the inverter power circuit 232 is inbound, task 830 is performed, otherwise task 824 is performed.

At 822, the timing module 513 remains in the inactive mode or operating in the low activity mode. Task 802 may be performed subsequent to task 822. At 824, the timing module 513 determines whether the phase angle is an end time of an active mode and/or a high activity mode. In addition or alternatively, a voltage of the output of the bridge rectifier 714 and/or the buck converter 701 may be compared to predetermined voltages for the end time to determine whether the stated condition exists. If the phase angle is an end time, task 826 is performed, otherwise task 828 is performed.

At 826, the timing module 513 transitions to the active (or high activity) mode. This includes oscillated operation of the switch 708 at a first (or high) frequency. The duty cycle of the switch 808, including durations of ON times and OFF times, may correspond to duty cycle information determined at 814. Task 802 may be performed subsequent to task 826. At 828, the timing module 513 operates in the active mode or high activity mode. Task 802 may be performed subsequent to task 828.

At 830, the switch 708 is held in a closed (or ON) state and is not switched between states. When the switch is ON, the portion 700 performs as a 3-phase rectifier with a DC choke. Thus, no switching occurs when $V_{AC}$ is at a nominal or low-line voltage. Task 802 may be performed subsequent to task 830.

When $V_{AC}$ is too high (e.g., greater than predetermined voltage), switching of the switch 708 (or bucking) occurs to decrease the bus voltage $V_{DCOUT}$. As the load increases, the bus voltage $V_{DCOUT}$ is decreased, the amount of current through the inductor 704 increases and the control module 250 begins bucking by pulse width modulating the switch 708 to lower the bus voltage $V_{DCOUT}$ (e.g., at tasks 826, 828) to a selected command voltage. The control module 250 may shape the current by adjusting the duty cycle of $SW_{CTRL}$ during this period for PFC operation. This may include providing a flat (or constant) amount of current through the choke or a profiled current shape. The ability to buck during certain conditions and not to buck during other conditions is referred to as "partial buck" operation.

During the light load condition, the switch 708 is left ON since the amount of current through the inductor 704 is low. As the current through the inductor 704 increases for increased load, the switch may be pulse width modulated to decrease the bus voltage. This prevents overheating the inverter power circuit 232 of FIG. 2 during heavy load conditions.

Although the above tasks 816-830 are provided in a particular order, tasks 816-830 may be performed in a different order. As an example, task 821, 824, 826, 828 may be performed prior to tasks 816, 818, 820 and 822. If task 821, 824, 826, 828 are performed prior to tasks 816, 818, 820 and 822, then task 820 may be modified to determine whether the DC bus voltage is greater than or equal to the commanded voltage, the next transition phase angle is a start time of an active mode and/or high activity mode, and/or the current phase angle is within a predetermined range (e.g., between an end time of an inactive mode or a low activity mode and a subsequent start time of the inactive mode or low activity mode). This may include comparing a voltage of the outputs of the bridge rectifier 714 and/or the buck converter 701 to corresponding predetermined voltages and ranges to effectively determine if the next transition phase angle is a start time of an active mode and/or high activity mode, and/or the current phase angle is within a predetermined range.

The above-described tasks of FIGS. 9 and 11 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The above-described examples provide high bandwidth peak mode control that allow for precise control of turn ON and OFF points of the boost converter 401 and buck converter 701. Peak mode control refers to operating mode transition control near peak DC bus voltages and controls peak voltages of the DC bus voltages. This is because of high speed switch control and transitioning between operating modes based on transition phase angles. The transitioning phase angles are determined based on a generated reference sinusoidal signal. Thus, the transition phase angles are not determined based only on an AC input and/or an output of a bridge rectifier, but rather are determined based on both (i) an AC input and/or the output of the bridge rectifier, and (ii) the reference sinusoidal signal. This high speed control is provided with feedback control based on various parameters feedback to the control module 250, as described above.

Although the above described tasks of FIGS. 9 and 11 are primarily described with respect to adjusting phase angles at which start times and end times of operating modes occur, voltage thresholds and/or current thresholds may be adjusted, monitored and/or used as a basis for transitioning between operating modes. For example, the voltage $DC_{VBus}$ of the DC bus may be monitored and when the voltage $DC_{VBus}$ exceeds or drops below voltage thresholds, the timing module 513 of FIG. 8 may transition between (i) the active mode and/or high activity mode and (ii) the inactive or low activity mode. The voltage thresholds may correspond to the transition phase angles of the rectified AC signals out of one or more of the bridge rectifiers of the PFC circuit 212.

Instead of monitoring the phase and/or voltages of the AC input voltage $V_{AC}$ and/or outputs of the bridge rectifiers 414, 416 of FIG. 4, the method of FIG. 12 may be performed to adjust transition timing between operating modes (the active mode, the high activity mode, the inactive mode, and/or the low activity mode). The method of FIG. 12 may be performed to maintain current levels detected by the current sensors 412 between predetermined operating ranges. The method of FIG. 12 may also be performed to adjust the DC bus voltage to be within a predetermined range for partial PFC operation.

In FIG. 12, a method of operating a drive (e.g., the drive 132 of FIG. 2) with a power converter (e.g., the boost converter 401 of FIG. 4) and a PFC circuit (e.g., the PFC circuit 212 of FIG. 2) is shown. Although the following tasks are primarily described with respect to the implementations of FIGS. 4 and 8, the tasks may be easily modified to apply to other implementations of the present disclosure. The tasks may be modified to apply to the buck converter 701 of FIG. 10. The tasks may be iteratively performed. Tasks 908-920 may be performed while tasks 922-940 are performed.

The method may begin at 900, which may include resetting the timers 515 of FIG. 8. At 902, the modules 502, 504, 506, 508 may receive and/or determine various signals and/or parameters, such as the signals received and determined during tasks 602-608 of FIG. 9. In one embodiment, the parameters include a measured DC bus voltage, a speed of a compressor, an amount of load, and/or an amount of current drawn by the compressor and/or detected by one or more of the current sensors 412.

At 908, the output module 510 may determine whether a first timer (one of timers 515) is indicative that a first predetermined period has been reached (e.g., 100 ms). The first predetermined period may be set to provide stability. If the first predetermined period (or amount of time) has passed, task 912 is performed, otherwise task 910 may be performed. At 910, the first timer may be incremented, if implemented as a counter. Task 902 may be performed subsequent to tasks 908 and/or 910. At 912, the first timer may be reset.

At 914, the output module 510 determines whether a peak current Ipeak and/or measured current level is greater than a first predetermined maximum current level Ipredmax1 (e.g., 20 A). Task 914 may be performed to determine if partial PFC has been performed too long, such that the peak current Ipeak is high and should be decreased to be within a predetermined range (e.g., between 15 A and 20 A). The peak current Ipeak may be, for example, current detected by the second current sensor 412b or indicated by $PFC_{INC2}$. If the peak current Ipeak is greater than the first predetermined maximum current level Ipredmax1, then task 916 is performed, otherwise task 918 is performed.

At 916, the output module 510 sets an adjustment variable Adjust equal to Adjust minus a predetermined amount (e.g., 2V). The adjustment variable Adjust is used to adjust a commanded DC voltage $V_{DCCOM}$ at 940. For example, if commanded DC voltage $V_{DCCOM}$ is increased, then less partial PFC operation. If commanded DC voltage $V_{DCCOM}$ is decreased, then more (or longer) partial PFC operation is performed. Task 902 may be performed after task 916.

At 918, the output module 510 determines whether Ipeak and/or measured current level is less than a predetermined minimum current level Ipredmin (e.g., 15 A). Task 918 may be performed to determine if Ipeak is low and partial PFC operation can be performed longer to increase Ipeak to be within the predetermined range. When initially starting the drive 132, the current detected by the current sensors 412 may be low and gradually increase. As an example, the current detected by the current sensor 412b may gradually increase to be between Ipredmin and Ipredmax1. If Ipeak and/or measured current level is less than Ipredmin, then task 920 is performed, otherwise task 902 is performed. At 920, Adjust is set equal to Adjust plus a predetermined amount (e.g., 2V).

At 922, the output module 510 determines whether a second timer (another one of the timers 515) is indicative of a second predetermined period (e.g., 1 ms) being reached. The second predetermined period may be less than the first predetermined period and may be set to allow detection of quick changes in current and/or voltage. If the second predetermined period (or amount of time) has passed, task 924 is performed, otherwise task 923 may be performed. At 923, the second timer may be incremented, if implemented as a counter. Task 902 may be performed subsequent to tasks 922 and/or 923. At 924, the second timer may be reset.

At 925, the control module 250 determines whether power factor correction is disabled. If power factor correction is disabled, task 926 is performed, otherwise task 927 is performed. At 926, the output module 510 sets Adjust equal to 0 and $V_{DCCOM}$ equal to 0.

At 927, the output module 510 may (i) determine initial values for a requested voltage Vreq (e.g., 280V) and a temporary voltage Vtmp if the corresponding drive 132 is powered up, or (ii) adjust and/or maintain current values of Vreq and Vtmp if performing an additional iteration of the method of FIG. 12. The requested voltage Vreq may refer to a minimum voltage requested for operation of the compressor 102. The temporary voltage Vtmp may be set equal to a peak voltage Vpeak (e.g., 325V) plus an offset voltage (e.g., 10V). Vtmp may be initially set high, such that there are not any current peaks, such as peaks 464 of FIG. 6, and the current peak is Ibase. The peak voltage Vpeak is a peak AC $V_{AC}$ input voltage or peak voltage out of the bridge rectifiers 414, 416. The requested voltage Vreq may be determined based on the signals and/or parameters received, generated and/or determined during task 902. The requested voltage Vreq may be based on a speed of a motor of the compressor 102 and/or other operating conditions (e.g., load on the compressor 102). The requested voltage Vreq may be determined based on an algorithm, a map, a table, and/or equations. As an example, the table may relate speeds of the motor of the compressor 102 to requested voltages.

At 928, the output module 510 determines whether Vreq is greater than or equal to Vtmp. If Vreq is greater than or equal to Vtmp, then task 930 is performed, otherwise task 932 is performed. If Vreq is greater than or equal to Vtmp and the power converter is a boost converter, then the boost converter may be operated to continuously boost the DC bus voltage. At 930, the output module 510 sets Adjust equal to 0 and $V_{DCCOM}$ equal to Vreq.

At 932, the output module 510 determines whether (i) Ipeak and/or measured current level is greater than a second predetermined maximum current level Ipredmax2 (e.g., 25 A), and/or (ii) Adjust is less than 0. Ipredmax2 is greater than Ipredmax1. This task determines whether the current detected by one of the current sensors 412 is too high, which may occur when load on the compressor 102 increases. If Ipeak and/or measured current level is greater than Ipredmax2 and/or Adjust is less than 0, then task 934 is performed, otherwise task 936 is performed. Performance of tasks 932 and 934 allows the control module 250 executing the PFC algorithm to quickly adjust and prevent tripping of a power shut off procedure. If a trip occurs, power to the compressor is shut off. The control module 250 instead of gradually reducing the current, performs task 934 to quickly reduce the current, such that the control module is operating in the full PFC mode rather than the partial PFC mode. This is unlike when performing, for example, tasks 914-920 when the control module 250 may be operating in the partial PFC mode. Task 934 may also be performed when Adjust is a negative value. This prevents voltage from being adjusted in an upward direction. At 934, the output module sets (i) Adjust equal to 0, and (ii) $V_{DCCOM}$ equal to Vtmp. This resets Adjust and $V_{DCCOM}$ to initial values.

At 936, the output module 510 determines whether Adjust is greater than Vtmp minus Vreq. This task prevents $V_{DCCOM}$ from dropping below Vreq. If Adjust is greater than Vtmp−Vreq, then task 938 is performed, otherwise task 940 is performed. At 938, the output module 510 sets (i) Adjust equal to Vtmp minus Vreq, and (ii) $V_{DCCOM}$ equal to Vreq.

At 940, the output module 510 sets the commanded DC voltage $V_{DCCOM}$ equal to Vtmp minus Adjust. Task 902 may be performed subsequent to tasks 930, 934, 938 and 940.

During the above-described tasks, Vpeak and Ipeak may be detected via the peak detector 517. The peak detector 517 may detect peak voltages and/or current levels of the power converter and/or the DC bus. The peak detector 517 may store and update the peak voltages and/or current levels. The peak detector 517 may update increasing peak levels quicker than decreasing peak levels. The peak detector 517 may thus perform as a filter for peak levels that are decreasing and may not perform as a filter for peak levels that are increasing. The peak detector 517 may track peak levels over each cycle of the AC input voltage $V_{AC}$ and/or outputs of the bridge rectifiers 414, 416. The tracking and updating of the peak voltages and current levels may be performed as described in U.S. Pat. No. 8,508,166, which is incorporated herein by reference.

The above-described tasks of FIG. 12 may be performed for single phase, 3-phase, and/or multi-phase operation. The above-described tasks of FIG. 12 may be applied to a circuit having a single rectifier converting a 3-phase input to a single rectified (or DC) output. The above-described tasks of FIG. 12 may also be applied to a circuit receiving multiple independent phases of current and having multiple rectifiers receiving a respective one of the independent phases and outputting a respective rectified (or DC) output. The above-described tasks of FIG. 12 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

Although the above-described tasks 908-920 are described with respect to peak mode control, average mode control may be used as an alternative. This includes changing the decisions of tasks 914 and 918 to be based on average current rather than peak current.

The method of FIG. 12 may be modified for the buck converter 701 of FIG. 10. During a buck converter implementation, the bus current may be adjusted in an upward direction rather than in a downward direction as in a boost converter implementation. The above-described tasks 908-920 are associated with an inner current control loop. The above-described tasks 922-940 are associated with an outer voltage control loop. In one buck converter embodiment, the voltage control loop is used and not the current control loop, where the bus voltage is equal to a product of (i) the voltage out of the rectification circuit 702 or Vbridge, and (ii) a duty cycle of $SW_{CTRL}$. In one embodiment, the outer voltage loop associated with tasks 922-940 is the same for buck converter operation. In another embodiment, the inner current control loop and the outer voltage control loop are utilized. For buck operation, the inductance of the inductor 704 may be smaller for peak current mode control than for average current mode control. The method of FIG. 12 may be modified for buck operation based on the disclosure provided below with respect to FIGS. 17-19.

Figure 13:
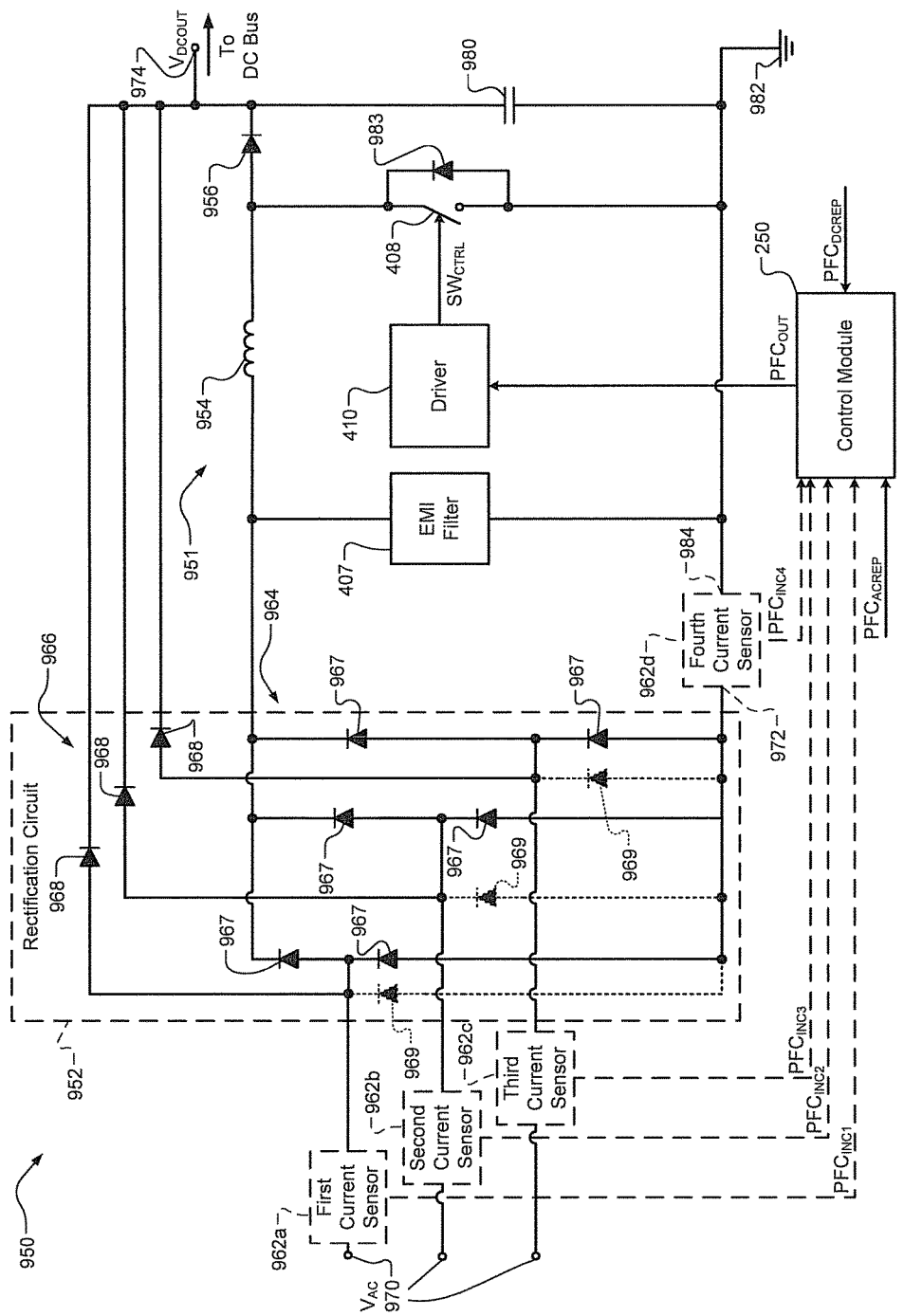
FIG. 13 is a schematic diagram of an example of a portion of a PFC circuit of the drive of FIG. 2 including a boost converter for a 3-phase implementation in accordance with an embodiment of the present disclosure.

FIG. 13 shows an example of a portion 950 of a PFC circuit of the drive of FIG. 2 including a boost converter 951 for a 3-phase implementation. The portion 950 includes a rectification circuit 952, an inductor 954, a diode 406, the EMI filter 407, the switch 408, the driver 410 and one or more current sensors 962a, 962b, 962c, 962d (collectively current sensors 962). The rectification circuit 952 includes a primary (or first) bridge rectifier 964 and a secondary (or second) bridge rectifier 966. The secondary bridge rectifier 966 may be referred to as a bypass rectifier and allows for current to bypass the primary bridge rectifier 964 and the boost converter 951. The primary bridge rectifier 964 includes six diodes 967 (or a diode pair for each input phase of $V_{AC}$). In one embodiment, the secondary bridge rectifier 966 includes six diodes; three bypass 968 and three optional diodes 969. In another embodiment, the bypass diodes 968 are included and the optional diodes 969 are not included.

Each of the bridge rectifiers 964, 966 includes 3-phase AC inputs, a return input and an output. The 3-phase AC inputs of each of the bridge rectifiers 964, 966 are connected respectively to outputs of the current sensors 962a, 962b, 962c. Inputs of the current sensors 962a, 962b, 962c are connected to AC input terminals 970, which receive phases of the 3-phase AC voltage $V_{AC}$ from the EMI filter 407. The return inputs of the bridge rectifiers 964, 966 are connected to a same output 972 of the fourth current sensor 962d. The output of the bridge rectifier 964 is connected to the inductor 954. The output of the bridge rectifier 966 is connected to an output terminal 974, which is connected to the DC bus. In one embodiment, a current sensor is located in series with the inductor 954 and upstream or downstream from the inductor. In another embodiment, a current sensor is located in series with and on either side of the switch 408 or the capacitor 980. In another embodiment, a current sensor is located on the DC bus. Current sensors may be located anywhere in the portion 190 and the corresponding sensor signals may be provided to the control module 250 and used to control a state of the switch 408.

The output voltages of the bridge rectifiers 964, 966 may be referred to as main voltages. Although current sensors 962a, 962b, 962c, 962d are shown, other current sensors may be alternatively or additionally incorporated into the portion 950. For example, one or more current sensors may be connected in series with one or more of the diode 956, the switch 408, and a capacitor 980. The capacitor 980 is connected between the output terminal 974 and ground (or reference) terminal 982. The capacitor 980 may be connected (i) at a first end, to a cathode of the diode 956 and to the output terminal 974, and (ii) at a second end, to the reference terminal 982 and the input 984 of the fourth current sensor 412d. The other current sensors, connected in series with one or more of the diode 956, the switch 408, and a capacitor 980, may detect current passing through the diode 956, the switch 408 and/or the capacitor 980. A diode 983 may be connected across the switch 408. In one embodiment, a current sensor is connected between the inductor 954 and the switch 408. In another embodiment, the current sensor is connected between the switch 408 and the reference terminal 982. Also, any or all of the disclosed current sensors may be utilized. Any of the signals and/or parameters derived from the signals of the disclosed current sensors may be utilized in the circuits and methods disclosed herein.

The EMI filter 407 may be connected to the output of the primary bridge rectifier 964. The EMI filter 407 filters an output of the primary bridge rectifier 964. The EMI filter 407 decouples the boost converter 951 from the primary bridge rectifier 954 to minimize noise generated by the boost converter 951 from being seen at the primary bridge rectifier 954. The output terminal 974 may be connected to the DC bus, which is connected between the PFC circuit 212 and the inverter power circuit 208 of FIG. 2.

The inductor 954, diode 956, switch 408 and driver 410 provide the boost converter 951, which increases a DC output voltage $V_{DCOUT}$ and/or a DC bus voltage of the DC bus to a commanded (or predetermined) DC voltage $V_{DCCOM}$. The boost converter 951 is a power converter. The commanded DC voltage $V_{DCCOM}$ may be determined by the control module 250 and may be set to be less than a peak (or maximum) output voltage of the bridge rectifiers 964, 966. The inductor 954 is connected in series with the diode 956 between the output of the primary bridge rectifier 954 and the output terminal 974. The inductor 954 is connected (i) at a first end, to the output of the primary bridge rectifier 954, and (ii) at a second end, to an anode of the diode 956 and a first terminal of the switch 408. The inductor 954 may be small (e.g., 80 micro-Henry (µH)) and operates as a choke. The diode 956 may be formed of, for example, silicon carbide SiC for quick switching frequencies and no reverse recovery time. The diode 956 may include multiple diodes connected in parallel.

The switch 408 may be a transistor, such as a super-junction field effect transistor (FET), a power metal oxide semiconductor field-effect transistor (MOSFET), and/or a super-junction MOSFET. The switch 408 may be configured to be oscillated between ON (e.g., closed) and OFF (e.g., open) states at a high frequency (e.g., greater than or equal to 200 kilo-hertz (kHz)). The first terminal of the switch 408 is connected to the inductor 954 and the anode of the diode 956. A second terminal of the switch 408 is connected to an input 984 of the fourth current sensor 412d and the reference terminal 982.

A control terminal of the switch 408 receives a control signal $SW_{CTRL}$ from the driver 410. The driver 410 generates the control signal $SW_{CTRL}$ based on an output signal $PFC_{OUT}$ of the control module 250. The control module 250 generates the output signal $PFC_{OUT}$ based on: one or more current sense signals $PFC_{INC1}$, $PFC_{INC2}$, $PFC_{INC3}$, $PFC_{INC4}$ from the current sensors 962a, 962b, 962c, 962d; an AC signal $PFC_{ACREP}$ representative of the AC voltage $V_{AC}$; and a DC signal $PFC_{DCREP}$ that is representative of the DC output voltage $V_{DCOUT}$ of the PFC circuit 212. The current sense signals $PFC_{INC1}$, $PFC_{INC2}$, $PFC_{INC3}$ may be equal to and/or indicative of the amounts of current (i) provided from each phase of the input voltage $V_{AC}$, (ii) collectively equal to an amount of current passing through the inductor 954, and/or passing through the PFC circuit 212. The current sense signal $PFC_{INC4}$ may be equal to and/or indicative of an amount of current (i) returning from the output terminal 974 to the fourth current sensor 412d, and/or (ii) passing through the PFC circuit 212. The AC signal $PFC_{ACREP}$ may be equal to and/or indicative of the AC voltage $V_{AC}$. The DC signal $PFC_{DCREP}$ may be equal to and/or indicative of the DC output voltage $V_{DCOUT}$.

During operation, the boost converter 951 may be ON when the DC bus voltage is greater than the AC voltage $V_{AC}$. Current does not pass from the secondary rectifier 966 to the DC bus when the DC bus voltage is greater than the AC voltage $V_{AC}$. When the DC bus voltage is less than the AC voltage $V_{AC}$, then the boost circuit 951 may be active and storing energy in the inductor 954 and releasing energy from the inductor 954 onto the DC bus to boost voltage of the DC bus. The energy may be stored when the switch 408 is closed and released when the switch 958 is opened.

The control module 250 may control operation of the driver 410 to control a state of the switch 408, such that the DC output voltage $V_{DCOUT}$ is equal to or within a predetermined range of the commanded DC voltage $V_{DCCOM}$. The control module 250 may control operation of the driver 410, such that the switch 408 is oscillated between open and closed states at a predetermined frequency during, for example, active periods 452 and is maintained in an OFF (or open) state during inactive periods 454 of FIG. 5.

The 3-phases are rectified by the primary bridge rectifier 964 to provide 3-phase rectified output voltages. Partial PFC operation for the boost converter 951 may be the same or similarly to partial PFC operation of the boost converter 401 of FIG. 4. The additional bridge connections provided by diodes 968 for the 3-phases conduct when $V_{AC}$ is greater than the bus voltage of the DC bus and/or $V_{DCOUT}$. This provides improved efficiency by reducing switching losses and reduced EMI. The 3-phase operation is similar to the single phase operation except the 3-phases are essentially 'ORed' together. If the bus voltage is controlled to be less than a peak voltage of $V_{AC}$, then the rectification circuit 952 conducts current and the switch is OFF (i.e. no switching) when the bus voltage is less than the peak voltage of $V_{AC}$. Current shaping may be performed by the control module 250 and the driver 410 when $V_{AC}$ is less than a peak of the bus voltage.

When the switch 408 is ON, the bus voltage is equal to the voltage received by the inductor (or choke) 954. The switch 408 may be turned OFF during small adjustment windows for 3-phase operation similar as for single phase operation.

Figure 14:
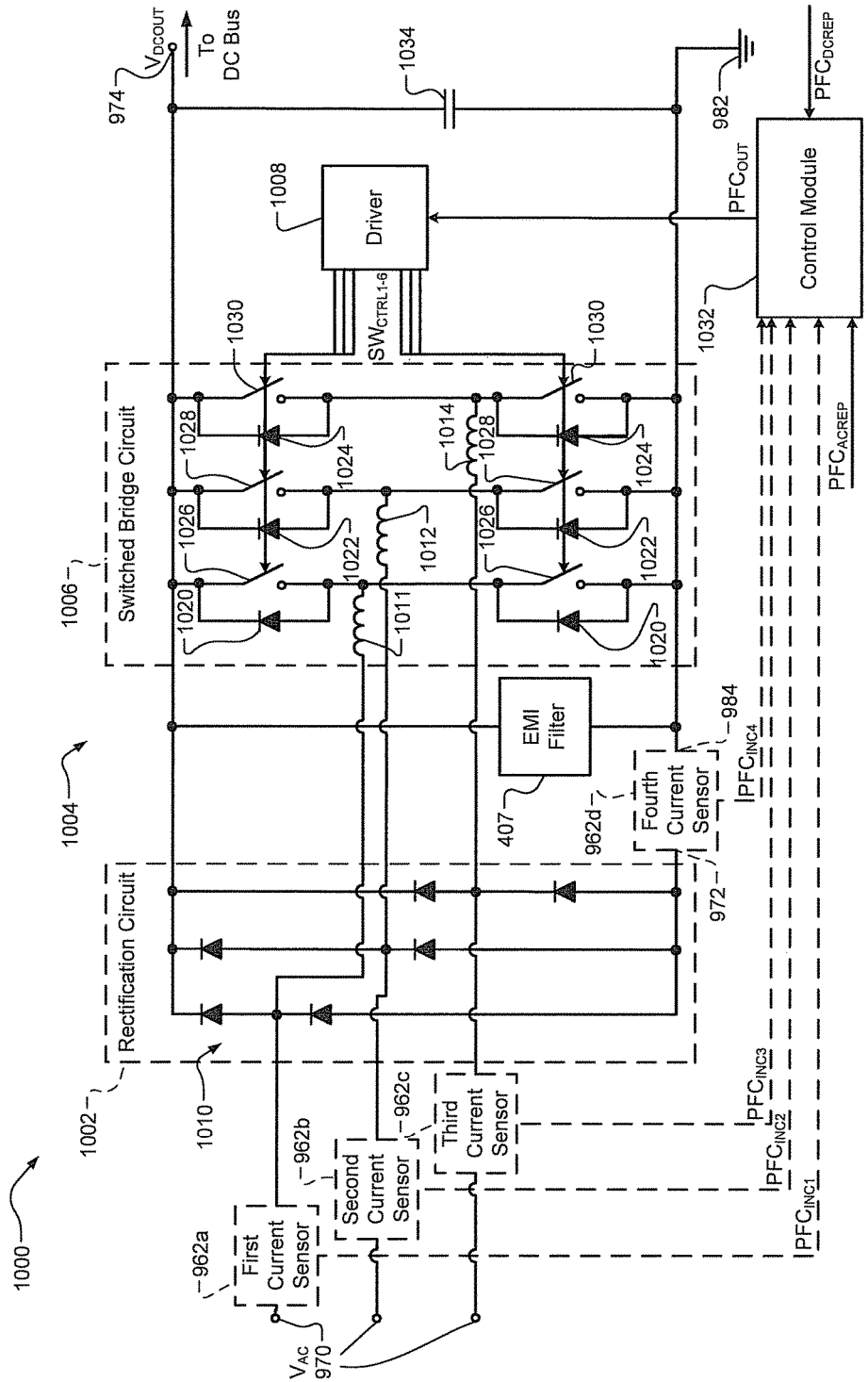
FIG. 14 is a schematic diagram of another example of a portion of a PFC circuit of the drive of FIG. 2 including an inverter and a boost converter for a 3-phase implementation in accordance with an embodiment of the present disclosure.

FIG. 14 shows another example of a portion 1000 of a PFC circuit of the drive of FIG. 2 for a 3-phase implementation. The portion 1000 includes a rectification circuit 1002 and a boost converter 1004 with a switched bridge circuit 1006 and a driver 1008. The rectification circuit 1002 includes a bridge 1010 rectifier with six diodes (a diode pair for each phase of $V_{AC}$. The inputs of the bridge rectifier 1010 receive respective phases of $V_{AC}$ and are respectively connected to (i) the current sensors 962a, 962b, 962c, and (ii) inputs of inductors 1011, 1012, 1014. The output of the bridge rectifier 1010 is connected to the output terminal 974 and/or the DC bus. The return input of the bridge rectifier 1010 is connected to the output 972 of the fourth current sensor 962d.

The switched bridge circuit 1006 includes three sets of diode pairs and switch pairs. Each set includes a diode pair (identified as diodes 1020, 1022, 1024) and a switch pair (identified as switches 1026, 1028, 1030). The diodes in each of the diode pairs are connected in series between (i) the output terminal 974 and (ii) the reference terminal 982. The switches in each of the switch pairs are connected in series between (i) the output terminal 974 and (ii) the reference terminal 982. Each of the diodes is connected across a respective one of the switches. In one embodiment, the switches 1026, 1028, 1030 of FIGS. 13-14 may be IGBTs.

The portion 1000 may further include the EMI filter 407 and includes a control module 1032, which may be used instead of and operate similarly to the control module 250 of FIG. 4. The control module 1032 receives signals from the sensors 962 and controls the driver 1008 based on the signals. The driver 1008 generates control signals (identified as $SW_{CTRL1\text{-}6}$) to control states of the switches 1026, 1028,

1030. Although current sensors 962*a*, 962*b*, 962*c*, 962*d* are shown, other current sensors may be alternatively or additionally incorporated into the portion 1000. For example, current sensors may be connected in series with one or more of the diodes 1020, 1022, 1024, the switches 1026, 1028, 1030, and a capacitor 1034. The capacitor 1034 is connected between the output terminal 974 and the reference terminal 982. The control module 1032 may control the driver 1008 based on signals from any of the current sensors.

The control module 1032 may control operation of the driver 1008 to control a state of the switches 1026, 1028, 1030, such that the DC output voltage $V_{DCOUT}$ is equal to or within a predetermined range of the commanded DC voltage $V_{DCCOM}$. The control module 1032 may control operation of the driver 1008, such that the switch 408 is oscillated between open and closed states at a predetermined frequency during, for example, active periods 452 and is maintained in an OFF (or open) state during inactive periods 454 of FIG. 5.

When $V_{AC}$ is greater than the bus voltage, the diodes of the rectification circuit 1002 conducts and the switches 1026, 1028, 1030 are OFF (or OPEN), which provides different voltages at inputs of inductors 1011, 1012 and 1014 than at the DC bus. This provides improved efficiency by reducing switching losses and reduced EMI. The bus voltage may be commanded to be slightly less (within a predetermined range of) a peak voltage of $V_{AC}$. If the bus voltage is controlled to be less than the peak voltage of $V_{AC}$ and $V_{AC}$ is greater than the bus voltage, then the rectification circuit 1002 conducts and the switches 1026, 1028, 1030 are OFF (or OPEN). This occurs near the peak voltage of $V_{AC}$. Current shaping may be performed including pulse width modulating $SW_{CTRL1\text{-}6}$ and/or adjusting duty cycles of $SW_{CTRL1\text{-}6}$ when $V_{AC}$ is less than the bus voltage. The portion 1000 of FIG. 14 provides more control than the portion 950 of FIG. 13 due to the inclusion of the inductors 1011, 1012, 1014, the diodes 1020, 1022, 1024, and the switches 1026, 1028, 1030. In one embodiment, the control module 1032 independently controls current through each of the inductors 1011, 1012, 1014 for each of the phases to shape current through the inductors 1011, 1012, 1014. The control module 1032 and the driver 1008 actuate the switches 1026, 1028, 1030 based on one or more of $PFC_{INC1}$, $PFC_{INC2}$, $PFC_{INC3}$, $PFC_{INC4}$, $PFC_{ACREP}$, $PFC_{DCPREP}$.

Figure 15:
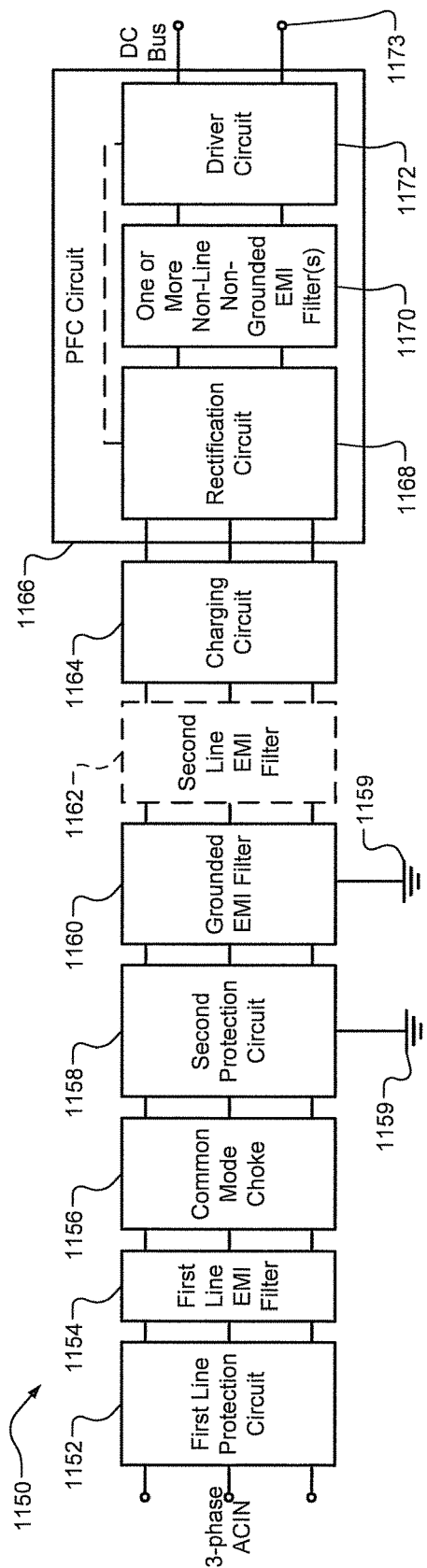
FIG. 15 is a functional block diagram of an example of a 3-phase converter circuit including a non-line non-grounded EMI filter in a PFC circuit in accordance with an embodiment of the present disclosure.

FIG. 15 is a functional block diagram of an example of a 3-phase converter circuit 1150 that includes a first line protection circuit 1152, a first line EMI filter 1154, a common mode choke 1156, a second protection circuit 1158, a grounded EMI filter 1160, a second line EMI filter 1162, a charging circuit 1164, and a PFC circuit 1166. The PFC circuit 1166 may include the portion 700 of FIG. 10, portion 950 of FIG. 13, or portion 1000 of FIG. 14.

The PFC circuit 1166 includes a rectification circuit 1168, one or more non-line non-grounded EMI filter(s) 1170 and a driver circuit 1172. The converter circuit 1150 converts 3-phase AC input voltages (e.g., 480 V AC or 600V AC) to a DC voltage, which is provided on a DC bus (e.g., the DC bus shown in FIG. 2). The first line protection circuit 1152 provides line surge protection to limit current, including at startup, provided from AC inputs (may be referred to as "mains") of the first line protection circuit 1152 to circuits (e.g., the common mode choke 1156, the charging circuit 1164, and the PFC circuit 1166) downstream from the first line protection circuit 1152. The first line protection circuit 1152 may include fuses and MOVs.

The first line EMI filter 1154 filters an output of the first line protection circuit 1152 and decouples circuits downstream from the first line EMI filter 1154 from the AC inputs of the first line protection circuit 1152. The first line EMI filter 1154 may include one or more across-the-line capacitors (e.g., X-rated capacitors) connected across the outputs of the first line protection circuit 1152.

The common mode choke 1156 provides high impedance to a common mode signal to provide EMI filtering and filters an output of the first line EMI filter 1154. The common mode choke 1156 decouples circuits downstream from the common mode choke 1156 from circuits upstream from the common mode choke 1156.

The second protection circuit 1158 provides line to ground surge protection and may include MOVs and a GDT. The grounded EMI filter 1160 provides EMI filtering and may include line-to-ground capacitors (e.g., Y-rated capacitors). The second protection circuit 1158 and the line-to-ground capacitors may be connected to ground 1159 (e.g., earth ground).

The charging circuit 1164 limits, including at startup, an amount of current that flows from the AC inputs of the first line protection circuit 1152 to the DC bus. Impedance between the mains and capacitors downstream from the rectification circuit 1168 may be small. For this reason, the charging circuit 1164 limits the amount of current to prevent damage to circuit components downstream from the charging circuit 1164. The charging circuit 1164 may include a relay, variable resistors, and other circuit components.

The PFC circuit 1166 may be replaced by, include and/or be configured similarly to one of the other 3-phase input PFC circuits disclosed herein (e.g., the PFC circuit 700 of FIG. 10). The rectification circuit 1168 may include one or more rectifiers. The non-line non-grounded EMI filter(s) 1170 filter an output of the rectification circuit 1168 and decouples a converter (e.g., buck converter 701 of FIG. 10, the boost converter 951 of FIG. 13, or the boost converter 1004 of FIG. 14) or the driver circuit 1172 from a bridge rectifier (e.g., the primary bridge rectifier 714 of FIG. 10, the primary bridge rectifier 964 of FIG. 13 or the rectification circuit 1002 of FIG. 14) to minimize noise generated by the converter from being seen at the bridge rectifier. The rectification circuit 1168 may be configured similarly to the rectification circuit 702 of FIG. 10, the rectification circuit 952 of FIG. 13, or the rectification circuit 1002 of FIG. 14.

Figure 16:
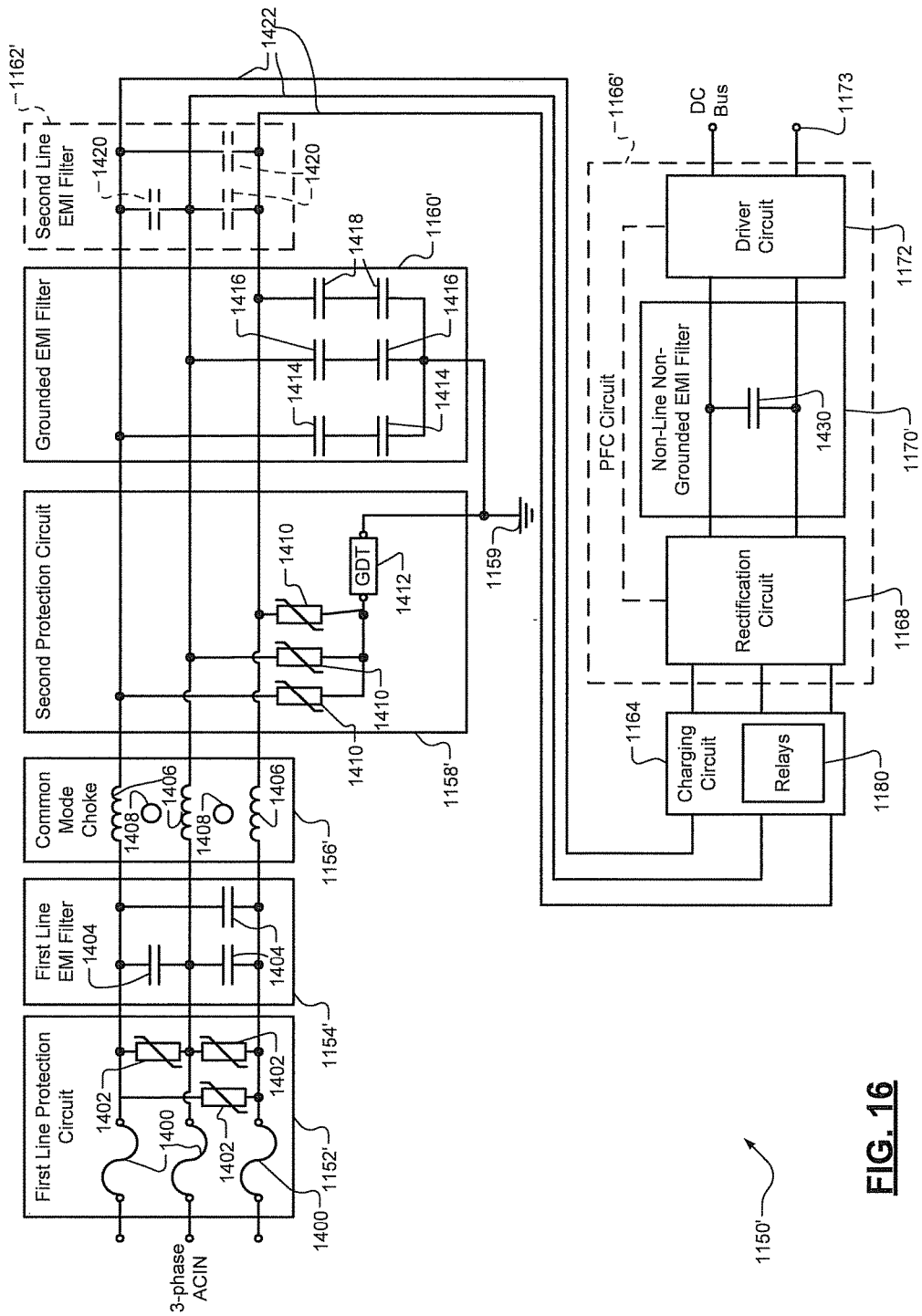
FIG. 16 is a functional block and schematic diagram of an example of the 3-phase converter circuit of FIG. 15.

The non-line non-grounded EMI filter(s) 1170 may include one or more capacitors connected in parallel. An example of the non-line non-grounded EMI filter(s) 1170 is shown in FIGS. 7 and 16 and is provided to reduce and/or eliminate the need for the second line EMI filter 1162. The capacitances of the capacitors in the second EMI filter 1162 depend on the capacitance(s) of the one or more capacitors in the non-line non-grounded EMI filter(s) 1170. The larger the capacitance(s) of the non-line non-grounded EMI filter(s) 1170, the smaller the capacitances of the second EMI filter 1162. The number of capacitors in the non-line non-grounded EMI filter 1170 may be less than the number of capacitors in the second EMI filter 1162. This reduces the number, costs and sizes of the capacitors associated with the converter circuit 1150, which reduces an envelope of the converter circuit 1150 and size of a corresponding PCB and heat sink (an example PCB and heat sink are shown in FIG. 22).

In addition, the capacitors of the EMI filters 1154 and 1162 are X-capacitors because the capacitors rated for high-voltage and are connected across mains (or AC lines). The capacitors of the grounded EMI filter 1160 are line-to-ground capacitors because the capacitors are rated for a high-voltage and are connected from the AC lines to ground

1159. In contrast, the capacitors of the non-line non-grounded EMI filter(s) 1170 are connected between a DC voltage line and a reference terminal 1173 and the DC voltage of the DC voltage line is less than the AC voltages across the mains. Thus, the capacitors of the non-line non-grounded EMI filter(s) 1170 do not need to satisfy power and safety requirements as associated with the use of X-capacitors and/or Y-capacitors and can be much smaller in size and constructed differently than X-capacitors and Y-capacitors. In addition, each X-capacitor and Y-capacitor transitions to an open state in an event of a failure of the X-capacitor or Y-capacitor. Each of the capacitors (referred to as a DC bus rated capacitor) of the non-line non-grounded EMI filter(s) 1170 are rated for the DC bus and may be in an open state or a shorted (i.e. providing a low resistive connection) state in an event of a failure of the DC bus rated capacitor.

The DC bus rated capacitors have a higher resonance frequency than the X-capacitors and the Y-capacitors due to the reduced size and different construction of the DC bus rated capacitors. In addition, by having the DC bus rated capacitors downstream from the rectification circuit 1018 rather than X-capacitors upstream from the rectification circuit, the effective overall capacitance of the rectification circuit and the DC bus rated capacitors is increased, thereby providing a lower cutoff frequency and thus increased filtering (i.e. filtering out an increased number of frequencies).

The non-line non-grounded EMI filter(s) 1070 may have multiple capacitors connected in parallel as shown in FIG. 7. The smaller in size and the more capacitors that are connected in parallel, the better the high frequency characteristics of the non-line non-grounded EMI filter(s) 1070. For example, 3 small capacitors (having small capacitances) connected in parallel downstream from the rectification circuit 1068 have better high frequency characteristics than a single larger capacitor (having a large capacitance) connected upstream from the rectification circuit 1068. The 3 small capacitors have a higher resonance frequency than the single large capacitor. Each capacitor has parasitic equivalent series resistance (ESR) and parasitic equivalent series inductance (ESC), which can be undesirable characteristics. Connecting in parallel 3 small capacitors can significantly reduce the effects of the parasitic ESR and parasitic ESL as compared to using a single larger capacitor.

Examples of the protection circuits 1152, 1158, the EMI filters 1154, 1160, 1170, and the common mode choke 1156 are shown in FIGS. 21-22. Examples of the PFC circuit 1166 are shown in FIGS. 10, 24. The driver circuit 1172 may include a boost converter (e.g., one of the boost converts of FIGS. 13-14), a buck converter (e.g., the buck converter of FIG. 10) or other driver circuit and provides a DC output on the DC bus. The driver circuit 1172 has an output reference terminal 1173.

FIG. 16 shows an example of the converter circuit 1150 of FIG. 15. FIG. 16 shows a 3-phase converter circuit 1150' that includes a first line protection circuit 1152', a first line EMI filter 1154', a common mode choke 1156', a second protection circuit 1158', a grounded EMI filter 1160', a second line EMI filter 1162', the charging circuit 1164, and a PFC circuit 1166'. The PFC circuit 1166' includes the rectification circuit 1168, a non-line non-grounded EMI filter 1170' and the driver circuit 1172. The converter circuit 1150' converts 3-phase AC input voltages (e.g., 480 V AC or 600V AC) to a DC voltage, which is provided on a DC bus (e.g., the DC bus shown in FIG. 2). The first line protection circuit 1152' provides line surge protection to limit current, including at startup, provided from AC inputs (may be referred to as "mains") of the first line protection circuit 1152' to circuits (e.g., the common mode choke 1156', the charging circuit 1164, and the PFC circuit 1166') downstream from the first line protection circuit 1152'. The first line protection circuit 1152' may include fuses 1400 and MOVs 1402.

The first line EMI filter 1154' filters an output of the first line protection circuit 1152' and decouples circuits downstream from the first line EMI filter 1154' from the AC inputs of the first line protection circuit 1152'. The first line EMI filter 1154' may include one or more across-the-line capacitors 1404 (e.g., X-rated capacitors) connected across the outputs of the first line protection circuit 1152'.

The common mode choke 1156' provides high impedance to a common mode signal to provide EMI filtering and filters an output of the first line EMI filter 1154'. The common mode choke 1156' decouples circuits downstream from the common mode choke 1156' from circuits upstream from the common mode choke 1156'. The common mode choke includes inductors 1406 (one for each phase) and cores 1408.

The second protection circuit 1158' provides line to ground surge protection and may include MOVs 1410 (one for each phase) and a GDT 1412. The grounded EMI filter 1160' provides EMI filtering and may include line-to-ground capacitors 1414, 1416, 1418 (e.g., Y-rated capacitors). The second protection circuit 1158' and the line-to-ground capacitors 1414, 1416, and 1418 may be connected to ground 1159 (e.g., earth ground). The line-to-ground capacitors 1414, 1416, and 1418 may include three pairs of capacitors (one pair for each phase) as shown or a different number of capacitors depending on the voltage and/or number of phases.

The second line EMI filter 1162' may include across-the-line capacitors 1420, which are connected across respective pairs of the AC lines 1422. The size and capacitance of the capacitors 1420 are small due to the inclusion of the non-line non-grounded EMI filter 1170'. In one embodiment, the second line EMI filter 1162' is not included.

The charging circuit 1164 may include multiple relays 1180. In one embodiment, two relays are included, one for each of two of the 3-phases. As an example, a relay may be provided for L1 and L3 (L1, L2, L3 may refer to the lines providing the 3-phase voltage VAC to the PFC circuit 1166'. The relays may be controlled by any of the control modules disclosed herein. The relays for L1 and L3 may be OPEN during precharging of capacitors downstream from the charging circuit and closed subsequent to precharging. This prevents voltage on L1 and L3 from being received by the PFC circuit 1166' and prevents a surge of current from being received at the capacitors when power is activated converter circuit 1150' and/or initially provided to the PFC circuit 1166'. In one embodiment, the one of the relays (e.g., the relay for L1) may not be included and the current to the capacitors may be limited by controlling one or more of the switches of the PFC circuit 1166'. The EMI filter in the PFC circuit 1166' also limits current received by the capacitor(s) connected to the DC bus at an output of the PFC circuit 1166'. A relay for one of the phases (e.g., the relay for L3) may be opened during light-load conditions, as further described below with respect to FIG. 19. The opening of one of the phases changes the voltage being received by the PFC circuit 1166' from a 3-phase voltage to a single phase voltage.

The non-line non-grounded EMI filter 1170' filters an output of the rectification circuit 1168 and decouples a converter (e.g., buck converter 701 of FIG. 10) or the driver circuit 1172 from a bridge rectifier (e.g., the primary bridge rectifier 714 of FIG. 10) to minimize noise generated by the converter from being seen at the bridge rectifier. The non-line non-grounded EMI filter 1170' may include one or more DC bus rated capacitors (one capacitor 1430 is shown). In one embodiment, the non-line non-grounded EMI filter 1170' includes a single DC bus rated capacitor 1430 as shown and the second line EMI filter 1162' is not included. As a result, the number, size and cost of the capacitors are reduced. The single capacitor 1430 replaces the three capacitors 1420 and may be smaller in size and have a smaller capacitance than each capacitor of the second line EMI filter 1162'. For example, if the non-line non-grounded EMI filter 1170' is not included, then the capacitors 1420 may each be large (e.g., 0.47 µF). If the non-line non-grounded EMI filter 1170' is included, capacitance of each of the capacitors 1420 may be substantially reduced (0.01-0.1 µF) or the second line EMI filter 1162' may not be included. As an example, capacitance of each of the capacitors 1402 and 1430 may be 0.33 µF. In one embodiment, each of the capacitors of the non-line non-grounded EMI filter 1170 is less than or equal to capacitance of each of the across-the-line capacitors upstream from the charging circuit 1164 and/or the rectification circuit 1168.

Figure 17:
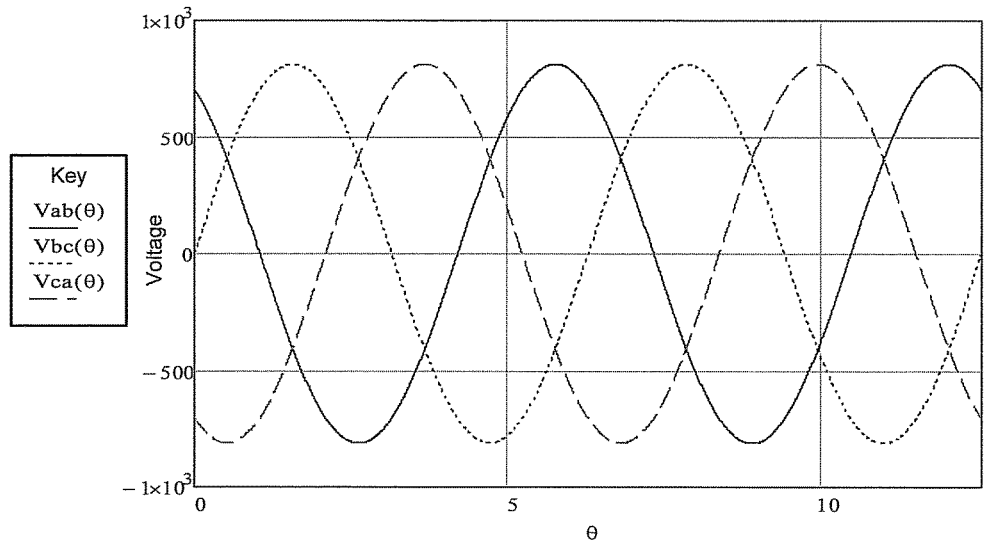
FIG. 17 is a plot illustrating example 3-phase input voltages provided to the portion of FIG. 10 in accordance with an embodiment of the present disclosure.
Figure 18:
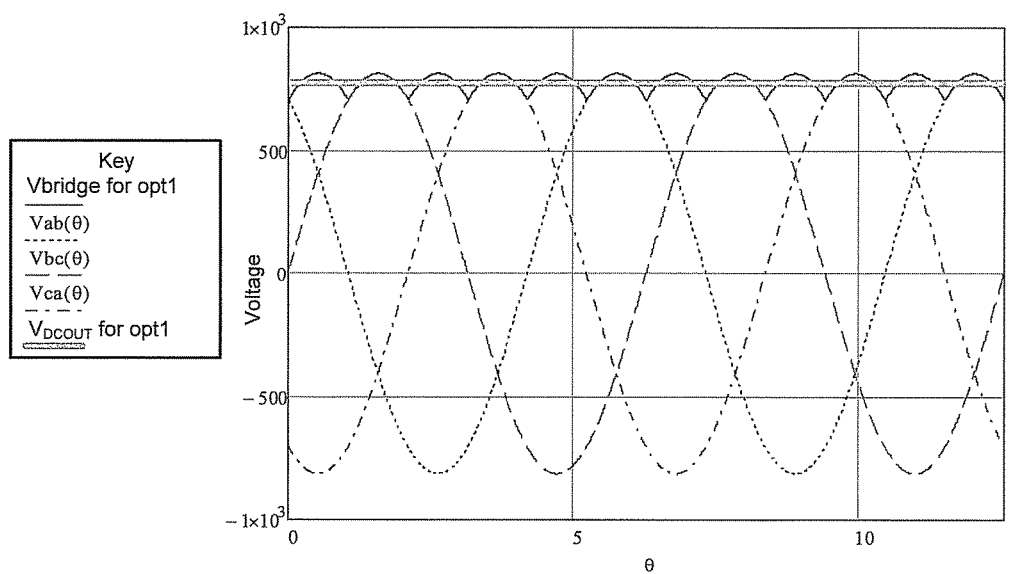
FIG. 18 is a plot illustrating rectification and bus voltages overlaid on the 3-phase input voltages of FIG. 17 and for the portion of FIG. 10 in accordance with an embodiment of the present disclosure.
Figure 19:
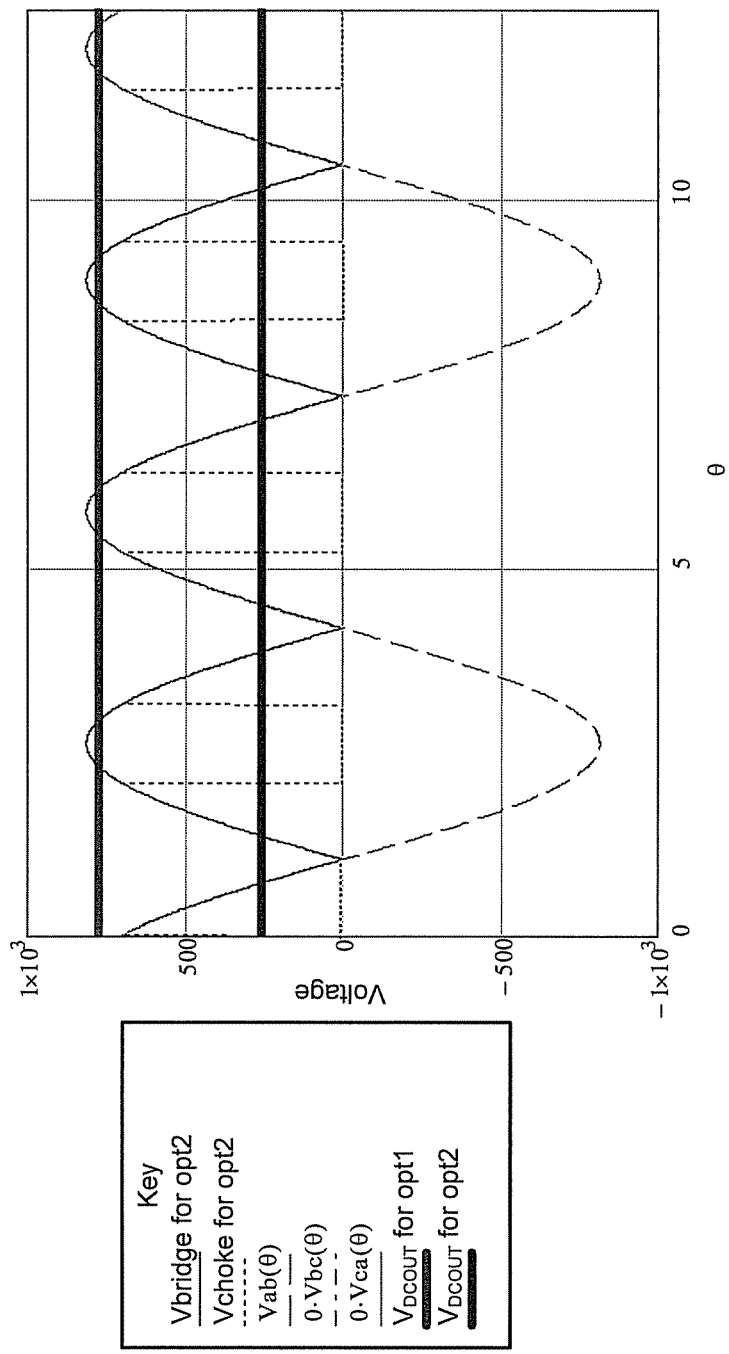
FIG. 19 is a plot illustrating rectification, choke, and bus voltages overlaid on the 3-phase input voltages of FIG. 17 and for the portion of FIG. 10 in accordance with another embodiment of the present disclosure.

Example signal plots are provided in FIGS. 17-19 for the portion 700 of FIG. 10. FIG. 17 is a plot illustrating example 3-phase input line-to-line voltages Vab, Vbc, Vca provided to the rectification circuit 702 of FIG. 10, which may be received from the charging circuit 1164 of FIG. 15 or 16. FIG. 18 is a plot illustrating a rectification voltage Vbridge and a bus voltage $V_{DCOUT}$ overlaid on the 3-phase input voltages of FIG. 17 and for the portion 700 of FIG. 10. The rectification voltage Vbridge and the bus voltage $V_{DCOUT}$ are shown for a first partial buck mode example embodiment of the present disclosure. The first partial buck mode is identified as "opt1" in FIGS. 18 and 19.

When operating in the first partial buck mode, the relays for L1, L2, L3 are closed such that the PFC circuit 1166' of FIG. 16 is receiving a 3-phase $V_{AC}$. The voltage out of the bridge 714 (or Vbridge) may be represented by equation 1, where Vbridge is equal to a maximum magnitude of one of Vab, Bbc, Vca, where θ is a phase angle.

$$V\text{bridge} = \max(|Vab(\theta)|, |Vbc(\theta)|, |Vca(\theta)|) \quad (1)$$

If the inductance of the inductor 704 is large, such that the cut-off frequency of the LC combination of the inductor 704 and the capacitor 723 is lower than a predetermined frequency (e.g., 360 Hz if in the U.S. or 300 Hz if in Europe) for 3-phase $V_{AC}$ operation, then the bus voltage $V_{DCOUT}$ can be represented by equation 2, where T is time. The predetermined frequency may be, for example, (i) 120 Hz if in the U.S. and single-phasing, or (ii) 100 Hz if in Europe and single-phasing. $V_{AC}$ may be at 60 Hz for U.S. operation and 50 Hz for European operation.

$$V_{DCOUT}(\theta, T) = \frac{1}{T}\int_0^T V\text{bridge}(\theta)d\theta \quad (2)$$

At light load conditions, the bus voltage $V_{DCOUT}$ is high. At heavy load conditions, the bus voltage $V_{DCOUT}$ is low. During light load conditions and when $V_{AC}$ is less than a "high-line" voltage (is at or near a maximum operating voltage) and/or output of the bridge 714 Vbridge is less than a predetermined maximum voltage (is at or near a maximum operating voltage), the switch 708 is held in a closed (or ON) state and is not switched between states. When the switch is ON, the portion 700 performs as a 3-phase rectifier with a DC choke. By checking if $V_{AC}$ is less than the "high-line" voltage and/or output of the bridge 714 Vbridge is less than the predetermined maximum voltage, the system prevents stress on the inverter power circuit 232 of FIG. 2. Thus, no switching occurs when $V_{AC}$ is at a nominal or low-line voltage. When $V_{AC}$ is too high, switching of the switch 708 (or bucking) occurs to decrease the bus voltage $V_{DCOUT}$. As the load increases, the bus voltage $V_{DCOUT}$ is decreased, the amount of current through the inductor 704 increases and the control module 250 begins bucking by pulse width modulating the switch 708 to lower the bus voltage $V_{DCOUT}$ to a selected command voltage. The control module 250 may shape the current by adjusting the duty cycle of $SW_{CTRL}$ during this period for PFC operation. This may include providing a flat (or constant) amount of current through the choke. The ability to buck during certain conditions and not to buck during other conditions is referred to as "partial buck" operation.

During the light load condition, the switch 708 is left ON since the amount of current through the inductor 704 is low. As the current through the inductor 704 increases for increased load, the switch may be pulse width modulated to decrease the bus voltage. This prevents overheating the inverter power circuit 232 of FIG. 2 during heavy load conditions.

FIG. 19 is a plot illustrating rectification, choke, and bus voltages Vbridge, Vchoke, and $V_{DCOUT}$ overlaid on the 3-phase input voltages of FIG. 17 and for the portion of FIG. 10. The voltages are shown for a second partial buck mode example embodiment of the present disclosure. The second partial buck mode is identified as "opt2" in FIG. 19. In addition, the rectification voltage Vbridge for the first partial buck mode is also shown to illustrate a difference between operation in the first partial buck mode relative to operation in the second partial buck mode. During the second partial buck mode, one of the relays 1180 is opened, such that the PFC circuit 1166' is receiving a single phase voltage $V_{AC}$. This is referred to as "single phasing". This occurs during light load conditions of, for example, a compressor downstream from the PFC circuit 1166'. The control module 250 may detect a light load condition base on, for example, one or more of signals $PFC_{INC1}$, $PFC_{INC2}$, $PFC_{ACREP}$, $PFC_{DCREP}$ and signals provided by the sensors 259 of FIG. 2. During heavy load conditions, the relays 1180 for lines L1, L2, and L3 are closed, such that the PFC circuit 1166' receives all 3-phases.

During the second partial buck mode, the choke voltage Vchoke, which is the voltage received by the inductor 704 may be represented by equation 3.

$$V\text{choke}(\theta, V\max) = \begin{cases} V\text{bridge}(\theta), & \text{if } V\text{bridge} < V\max \\ 0, & \text{otherwise} \end{cases} \quad (3)$$

Based on equation 3, the buck converter is active and thus switching the switch 708 when Vbridge is high and/or greater than or equal to Vmax (a predetermined voltage). The switch 708 is provided with a PWM signal $SW_{CTRL}$ when Vbridge is high and/or greater than or equal to Vmax. As an alternative, the switch 708 may be left open (or OFF), such that no voltage is applied to the corresponding inductor (e.g., the inductor 954 of FIG. 13) when $V_{AC}$ is too high and/or Vbridge is high and/or greater than or equal to Vmax.

If the inductance of the inductor 704 is large, such that the cut-off frequency of the LC combination of the inductor 704 and the capacitor 723 is lower than a predetermined frequency, then the bus voltage $V_{DCOUT}$ can be represented by equation 4 for opt2. For 3-phase $V_{AC}$ operation, the predetermined frequency may be, for example, 360 Hz if in the U.S. or 300 Hz if in Europe. The predetermined frequency may be, for example, (i) 120 Hz if in the U.S. and single-phasing, or (ii) 100 Hz if in Europe and single-phasing.

$$V_{DCOUT}(\theta, T, V\max) = \frac{1}{T}\int_0^T V choke(\theta, V\max)d\theta \quad (4)$$

As can be seen in FIG. 19, the bus voltage $V_{DCOUT}$ for the first partial buck mode (opt1) is higher than the bus voltage $V_{DCOUT}$ for the second partial buck mode (opt2). The large choke averages received voltages to provide the flat bus voltages $V_{DCOUT}$. As the inductance of the inductor 704 decreases, size (peak-to-peak) of the ripple in voltage increased for the bus voltage $V_{DCOUT}$. The bus voltage $V_{DCOUT}$ is also reduced with increases inductance of the inductor 704. If the inductance is reduced for the second partial buck mode, ripple in voltage of $V_{DCOUT}$ increases and the corresponding average voltage increases to be (i) higher than the $V_{DCOUT}$ for opt2 shown in FIG. 19, and (ii) less than $V_{DCOUT}$ for opt1 shown in FIG. 19 and a maximum of Vchoke shown in FIG. 19. When the choke is large, the bus voltage $V_{DCOUT}$ may be equal to an average of $V_{AC}$. As the size of the choke decreases, size of ripple in $V_{DCOUT}$ increases and $V_{DCOUT}$ is between the average of $V_{AC}$ and the peak of $V_{AC}$.

For the second partial buck mode and during light load conditions, if peak of $V_{AC}$ is too high relative to $V_{DCOUT}$, then the relay for L3 is opened to perform single phasing and the switch 708 is opened (or OFF). During light load conditions and when the peak of $V_{AC}$ is not too high, the switch 708 is pulse width modulated or maintained in a closed (or ON) position depending on how much current shaping is being performed. As an example, the switch 708 may be turned ON at a voltage zero-crossing point of $V_{AC}$ and left ON for a period of time and then subsequently turned OFF. As another example, the switch 708 may be pulse width modulated when $V_{AC}$ is less than a predetermined voltage and switched to and held in an OFF state when $V_{AC}$ is near a peak voltage. This is referred to as "double-sided phase control". The switch 708 may be pulse width modulated to shape the waveform of the current received at and passing through the inductor 704 to reduce the effective peak voltage. This reduces the switching losses.

For the second partial buck mode three periods of operations may be iteratively cycled through, where the second period refers to a period when Vbridge is at or near a peak voltage. For example, referring to FIG. 19, Vbridge is a rectified single that iteratively transitions between a minimum voltage (at or near 0V) and a peak voltage (shown as being above $V_{DCOUT}$ for opt1). The second period may refer to when Vbridge is within a predetermined range of the peak voltage. The first period may refer to when Vbridge is increasing and between (i) the minimum voltage and (ii) a low end voltage associated with the second period and/or a transition voltage (voltage when transitioning from first period to second period). The third period may refer to when Vbridge is decreasing and between (i) a low end voltage associated with the second period and/or a transition voltage (voltage when transitioning from the second period to the third period) and (ii) the minimum voltage.

As a first example, the switch 708 may be closed for duration of the first period, pulse width modulated for duration of the second period, and closed for duration of the third period. As another example, the switch 708 may be pulse width modulated for duration of the first period, open for duration of the second period, and pulse width modulated for duration of the third period. As yet another example, the switch 708 may be pulse width modulated or closed for duration of the first period, open for duration of the second period, and pulse width modulated or closed for duration of the third period. In another example, the switch 708 is pulse width modulated for duration of the first, second and third periods. In another embodiment, the switch 708 is closed for duration of the first period, open for duration of second period, and closed for duration of the third period. If Vbridge is too high, then the switch 708 is not held in the closed state for duration of the second period to prevent voltage on the bus from becoming too high. If Vbridge is too high, then the switch 708 may be closed, open or pulse width modulated for duration of the first period and the third period. If $V_{AC}$ is less than a predetermined voltage, then the switch 708 may be held in the closed state during the first, second and/or third period. As $V_{AC}$ increases the switch 708 may be switched to the open state and/or pulse width modulated to perform current shaping.

For both the first partial buck mode and the second partial buck mode, switching losses are decreased over a system which does not temporarily cease buck operation of a buck converter. The switching losses are reduced at the switch 708 and inductor 704.

Figure 20:
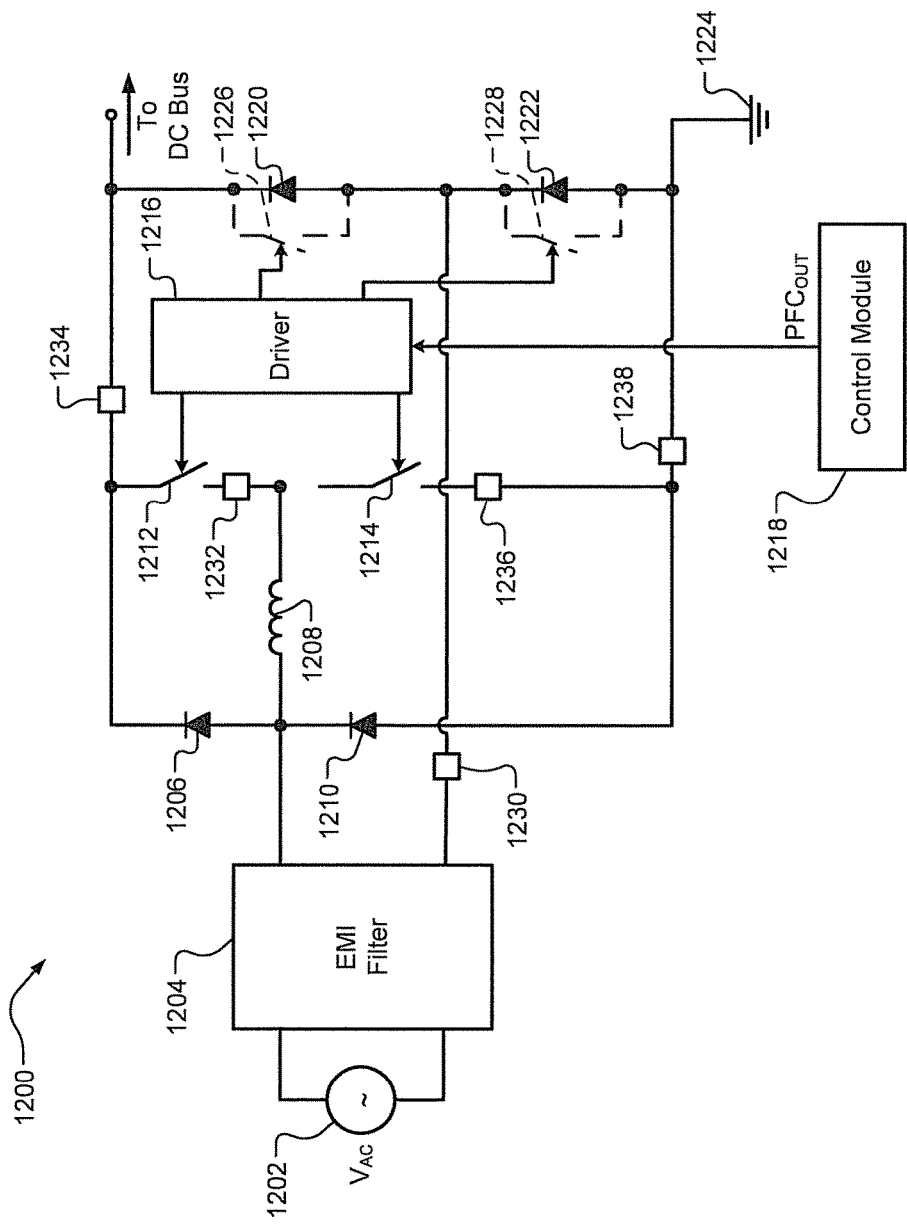
FIG. 20 is schematic diagram of a synchronous rectifier in accordance with another embodiment of the present disclosure.

FIG. 20 shows a portion (or synchronous rectifier) 1200 of a PFC circuit of the drive of FIG. 2. As an example, the synchronous rectifier 1200 may be configured for an 8 kW input power and 5 ton compressor implementation. The synchronous rectifier 1200 receives a single phase input voltage $V_{AC}$ from a single phase power source 1202. The synchronous rectifier 1200 includes an EMI filter 1204. The EMI filter 1204 has a first output terminal connected to an anode of a first diode 1206, an inductor 1208, and a cathode of a second diode 1210. A cathode of the first diode 1206 is connected to a first switch 1212. The first switch 1212 is connected in series with a second switch 1214 and receives a control signal from a driver 1216. The second switch 1214 receives a second control signal from the driver 1216. The driver 1216 may be controlled by a control module 1218, which may operate similar as the other control modules described herein.

An additional pair of diodes 1220, 1222 are included and are connected in series. The diodes 1206, 1210, 1220, 1222 may be included in a single bridge. A cathode of the third diode 1220 is connected to the first switch 1212 and the cathode of the first diode 1206. An anode of the third diode 1220 is connected to a cathode of the fourth diode 1222. An anode of the fourth diode 1222 is connected to ground 1224, the second switch 1214 and an anode of the second diode 1210. To improve operating efficiency and reduce voltage drop across the diodes 1220 and 1222, switches 1226, 1228 may be connected in parallel with the diodes 1220, 1222. In one embodiment, the switches 1226, 1228 are not included in the synchronous rectifier 1200. The switches 1226, 1228 may be controlled by control signals received from the driver 1216. The anode of the third diode 1220 and the cathode of the fourth diode 1222 are connected to a second output of the EMI filter 1204.

Current sensors may be included in various locations in the synchronous rectifier 1200. Example current sensors are represented by boxes 1230, 1232, 1234, 1236, 1238. The current sensors 1230, 1232, 1234, 1236, 1238 detect current flowing: out of the EMI filter 1204; through the switches 1212, 1214; to the DC bus from the first diode 1206 and/or the first switch 1212; and/or to the ground reference 1224 from the switch 1214. The driver 1216 may generate the control signals provided to the switches 1212, 1214, 1226, 1228 based on current signals received from the current sensors 1230, 1232, 1234, 1236, 1238. The control module 1218 may generate the signals $PFC_{OUT}$ based on the current signals received from the current sensors 1230, 1232, 1234, 1236, 1238.

In one embodiment, the switches 1212, 1214, 1226, 1228 are silicon carbide SiC switches. As an example, the switches 1212, 1214, may be FETs and may include diodes (referred to as antiparallel diodes) that are connected in series with the FETs. During operation, the second switch 1214 may be closed (tuned ON) and then opened (turned OFF). Upon turning OFF the second switch 1214, the first switch 1212 may be turned ON. When the second switch 1214 is turned OFF and current flows in the antiparallel diode of the first switch 1212, then within a predetermined period (or short period) of time, the first switch 1212 is turned ON. This reduces power loses.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®. The computer program may include Matlab® tools.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A power factor correction circuit comprising:
   a bridge rectification circuit configured to (i) receive an alternating current (AC) voltage, and (ii) generate a rectified AC voltage;
   a power converter configured to convert the rectified AC voltage to a first direct current (DC) voltage, wherein the power converter comprises a switch and supplies the first DC voltage to a DC bus to power a compressor;
   a current sensor configured to detect an amount of current (i) passing through the power converter, or (ii) returning from an output of the power factor correction circuit; and
   a control module configured to, while operating in a partial power factor correction mode,
      based on the rectified AC voltage, a phase angle of the rectified AC voltage, a second DC voltage, or the detected amount of current, control operation of the switch to transition between operating in (i) a high activity mode and (ii) an inactive mode or a low activity mode, wherein the second DC voltage is a detected DC voltage of the DC bus,
      transition the switch between an open state and a closed state while in the high activity mode and the low activity mode; and
      maintain the power converter in an OFF state while in the inactive mode.

2. The power factor correction circuit of claim 1, wherein the control module is configured to, based on the rectified AC voltage, the phase angle of the rectified AC voltage, the second DC voltage, and the detected amount of current, control operation of the switch to transition between operating in (i) the high activity mode and (ii) the inactive mode or the low activity mode.

3. The power factor correction circuit of claim 1, further comprising a driver configured to control operation of the switch based on an output signal,
   the control module is configured to, based on the rectified AC voltage, the second DC voltage, and the detected amount of current, generate the output signal to transition the driver between operating in (i) the high activity mode and (ii) the inactive mode or the low activity mode.

4. The power factor correction circuit of claim 1, wherein the control module is configured to:
   transition the switch between the open state and the closed state at a first frequency while in the high activity mode; and
   transition the switch between the open state and the closed state at a second frequency while in the low activity mode, wherein the second frequency is less than the first frequency.

5. The power factor correction circuit of claim 1, wherein the control module is configured to:
   operate the switch at a first duty cycle while in the high activity mode; and
   operate the switch at a second duty cycle while in the low activity mode,
   wherein the first duty cycle is less than the second duty cycle, such that the ON time of the switch per cycle is shorter during the high activity mode than during the low activity mode, or (ii) the OFF time of the switch per cycle is longer during the high activity mode than during the low activity mode.

6. The power factor correction circuit of claim 1, wherein the control module is configured to:
   operate the switch at a first duty cycle while in the high activity mode; and
   operate the switch at a second duty cycle while in the low activity mode,
   wherein the first duty cycle is greater than the second duty cycle, such that the ON time of the switch per cycle is longer during the high activity mode than during the low activity mode, or (ii) the OFF time of the switch per cycle is shorter during the high activity mode than during the low activity mode.

7. The power factor correction circuit of claim 1, wherein the control module is configured to, based on the phase angle of the first DC voltage, transition the power converter between (i) the high activity mode and (ii) the inactive mode or the low activity mode.

8. The power factor correction circuit of claim 1, wherein the control module is configured to (i) based on a load on the compressor, transition between the partial power factor correction mode and a full power factor correction mode, (ii) while in the partial power factor correction mode, transition the power converter between (a) the high activity mode and (b) the inactive mode or the low activity mode, and (iii) maintain operation in the high activity mode while in the full power factor correction mode.

9. The power factor correction circuit of claim 1, the bridge rectification circuit comprises:
   a first bridge rectifier configured to (i) receive the AC voltage, and (ii) generate the rectified AC voltage; and
   a second bridge rectifier configured to (i) receive the AC voltage, (ii) generate a second rectified AC voltage, and (ii) bypass the first bridge rectifier to provide the second rectified AC voltage to the DC bus.

10. The power factor correction circuit of claim 1, wherein the control module is configured to:
    determine the phase angle of the rectified AC voltage;
    if the phase angle is a start time for operating in the high activity mode, then transition to the high activity mode including transitioning the switch between the open state and the closed state to boost the second DC voltage of the DC bus to a predetermined DC voltage; and
    if the phase angle is an end time for operating in the high activity mode, then transition to the inactive mode or the low activity mode.

11. The power factor correction circuit of claim 10, wherein the control module is configured to:
    generate a commanded DC voltage based on the rectified AC voltage, a phase angle of the rectified AC voltage, the second DC voltage, or the detected amount of current, wherein the power converter is a boost converter; and
    if the phase angle is a start time for operating in the high activity mode and the second DC voltage is less than or equal to the commanded DC voltage, then operate in the high activity mode including transitioning the switch between the open state and the closed state to boost the second DC voltage of the DC bus to the predetermined DC voltage.

12. The power factor correction circuit of claim 1, wherein:
    the power converter is a boost converter; and
    the control module is configured to
        determine the phase angle of the rectified AC voltage,
        if the phase angle is a start time for operating in the inactive mode or the low activity mode, then transition to the inactive mode or the low activity mode, wherein if the control module transitions to the low activity mode, the control module transitions the switch between the open state and the closed state at a lower frequency than when in the high activity mode, and
        if the phase angle is an end time for operating in the inactive mode or the low activity mode, then transition to the high activity mode.

13. The power factor correction circuit of claim 1, wherein the control module is configured to:
    generate a commanded DC voltage based on the rectified AC voltage, a phase angle of the rectified AC voltage, the second DC voltage, or the detected amount of current, wherein the power converter is a buck converter; and
    if the phase angle is a start time for operating in the inactive mode or the low activity mode and the second DC voltage is less than or equal to the commanded DC voltage, then transition to the inactive mode or the low activity mode.

14. The power factor correction circuit of claim 1, further comprising an output module configured to:
    determine a peak current level of the detected amount of current;
    based on a timer, compare the peak current level to (i) a maximum current level, and (ii) a minimum current level;
    update an adjustment value based on the (i) comparison between the peak current level and the maximum current level, and (ii) comparison between the peak current level and the minimum current level; and
    update a commanded DC voltage for the DC bus based on the adjustment value.

15. The power factor correction circuit of claim 1, further comprising an output module configured to:
    determine a peak voltage level of the received AC voltage or the rectified AC voltage;
    determine a peak current level of the detected amount of current;
    set a requested voltage to a minimum voltage for the compressor;
    set a temporary voltage equal to the peak voltage level plus an offset value;
    based on a timer, determine whether the requested voltage is greater than or equal to the temporary voltage; and
    if the requested voltage is greater than or equal to the temporary voltage, set (i) an adjustment value for a commanded DC voltage equal to 0, and (ii) the commanded DC voltage equal to the requested voltage.

16. The power factor correction circuit of claim 1, further comprising an output module configured to:
    determine a peak voltage level of the received AC voltage or the rectified AC voltage;
    determine a peak current level of the detected amount of current;
    set a requested voltage to a minimum voltage for the compressor;
    set a temporary voltage equal to the peak voltage level plus an offset value;
    based on a timer, determine whether the peak current level is greater than a maximum current level; and
    if the peak current level is greater than the maximum current level or an adjustment value for a commanded DC voltage is less than 0, set the adjustment value equal to 0 and the commanded DC voltage equal to the temporary voltage.

17. The power factor correction circuit of claim 1, further comprising an output module configured to:
    determine a peak voltage level of the received AC voltage or the rectified AC voltage;
    determine a peak current level of the detected amount of current;
    set a requested voltage to a minimum voltage for the compressor;
    set a temporary voltage equal to the peak voltage level plus an offset value;
    based on a timer, determine whether an adjustment value is greater than a difference between the temporary voltage and the requested voltage;
    if the adjustment value for a commanded DC voltage is greater than a difference between the temporary voltage and the requested voltage, set (i) the adjustment value equal to the difference between the temporary voltage and the requested voltage, and (ii) the commanded DC voltage equal to the requested voltage; and
    if the adjustment value for the commanded DC voltage is less than or equal to the difference between the temporary voltage and the requested voltage, set the commanded DC voltage equal to a difference between the temporary voltage and the adjustment value.

18. The power factor correction circuit of claim 1, wherein:
    the switch is a first switch;
    the power converter comprises a plurality of switches and a plurality of diodes;
    the plurality of switches include the first switch;
    each of the plurality of diodes is connected in parallel with a respective one of the plurality of switches; and
    the control module is configured to, based on the rectified AC voltage, the phase angle of the rectified AC voltage, the second DC voltage, or the detected amount of current, control operation of the plurality of switches to transition between operating in (i) the high activity mode and (ii) the inactive mode or the low activity mode.

19. The power factor correction circuit of claim 1, wherein the control module is configured to (i) determine a load condition, (ii) if the load condition is determined to be a light load condition, maintain the switch in an ON state, (iii) if the load condition is determined to be a heavy load condition, pulse width modulate the switch.

20. The power factor correction circuit of claim 1, wherein the control module is configured to (i) determine an inverter output current level, (ii) if at least one of the rectified AC voltage is less than a predetermined maximum voltage and the inverter output current level is less than a predetermined maximum current level, maintain the switch in an ON state, and (iii) if at least one of the rectified AC voltage is greater than or equal to the predetermined maximum voltage and the inverter output current level is greater than or equal to the predetermined maximum current level, pulse width modulate the switch.

21. The power factor correction circuit of claim 1, wherein the control module is configured to (i) determine an inverter power circuit temperature, (ii) if at least one of the rectified AC voltage is less than a predetermined maximum voltage and the inverter power circuit temperature is inbound, maintain the switch in an ON state, and (iii) if at least one of the rectified AC voltage is greater than or equal to the predetermined maximum voltage and the inverter power circuit temperature is outbound, pulse width modulate the switch.

22. The power factor correction circuit of claim 1, further comprising a relay, wherein the control module is configured to (i) determine a load condition, (ii) if the load condition is determined to be a light load condition, control the relay such that the power factor correction circuit receives single phase power and is performing a single phasing operation, (iii) if the load condition is determined to be a heavy load condition, control the relay such that the power factor correction circuit receives 3-phase power.

23. A method of operating a power factor correction circuit, the method comprising:
receiving an alternating current (AC) voltage;
generating a rectified AC voltage via a bridge rectification circuit;
converting the rectified AC voltage to a first direct current (DC) voltage via a power converter, wherein the power converter comprises a switch;
supplying the first DC voltage to a DC bus to power a compressor;
detecting an amount of current (i) passing through the power converter, or (ii) returning from an output of the power factor correction circuit; and
while operating in a partial power factor correction mode, based on the rectified AC voltage, a phase angle of the rectified AC voltage, a second DC voltage, or the detected amount of current, controlling operation of the switch to transition between operating in (i) a high activity mode and (ii) an inactive mode or a low activity mode, wherein the second DC voltage is a detected DC voltage of the DC bus,
transitioning the switch between an open state and a closed state while in the high activity mode and the low activity mode, and
maintaining the power converter in an OFF state while in the inactive mode.

24. The method of claim 23, comprising, based on the rectified AC voltage, the phase angle of the rectified AC voltage, the second DC voltage, and the detected amount of current, control operation of the switch to transition between operating in (i) the high activity mode and (ii) the inactive mode or the low activity mode.

25. The method of claim 23, further comprising:
controlling operation of the switch via a driver based on an output signal; and
based on the rectified AC voltage, the second DC voltage, and the detected amount of current, generating the output signal to transition the driver between operating in (i) the high activity mode and (ii) the inactive mode or the low activity mode.

26. The method of claim 23, further comprising:
transitioning the switch between the open state and the closed state at a first frequency while in the high activity mode; and
transitioning the switch between the open state and the closed state at a second frequency while in the low activity mode, wherein the second frequency is less than the first frequency.

27. The method of claim 23, further comprising:
operating the switch at a first duty cycle while in the high activity mode; and
operating the switch at a second duty cycle while in the low activity mode,
wherein the first duty cycle is less than the second duty cycle, such that the ON time of the switch per cycle is shorter during the high activity mode than during the low activity mode, or (ii) the OFF time of the switch per cycle is longer during the high activity mode than during the low activity mode.

28. The method of claim 23, further comprising:
operating the switch at a first duty cycle while in the high activity mode; and
operating the switch at a second duty cycle while in the low activity mode,
wherein the first duty cycle is greater than the second duty cycle, such that the ON time of the switch per cycle is longer during the high activity mode than during the low activity mode, or (ii) the OFF time of the switch per cycle is shorter during the high activity mode than during the low activity mode.

29. The method of claim 23, further comprising, based on the phase angle of the first rectified AC voltage, transitioning the power converter between (i) the high activity mode and (ii) the inactive mode or the low activity mode.

30. The method of claim 23, further comprising:
based on a load on the compressor, transitioning between the partial power factor correction mode and a full power factor correction mode;
while in the partial power factor correction mode, transitioning the power converter between (i) the high activity mode and (ii) the inactive mode or the low activity mode; and
maintaining operation in the high activity mode while in the full power factor correction mode.

31. The method of claim 23, further comprising:
receiving the AC voltage at a first bridge rectifier;
generating the rectified AC voltage via the first bridge rectifier;
receiving the AC voltage at a second bridge rectifier;
generating a second rectified AC voltage via the second bridge rectifier; and
bypassing the first bridge rectifier to provide the second rectified AC voltage to the DC bus.

32. The method of claim 23, further comprising:
determining the phase angle of the rectified AC voltage;
if the phase angle is a start time for operating in the high activity mode, then transitioning to the high activity mode including transitioning the switch between the open state and the closed state to boost the second DC voltage of the DC bus to a predetermined DC voltage; and
if the phase angle is an end time for operating in the high activity mode, then transitioning to the inactive mode or the low activity mode.

33. The method of claim 32, further comprising:
generating a commanded DC voltage based on the rectified AC voltage, a phase angle of the rectified AC voltage, the second DC voltage, or the detected amount of current, wherein the power converter is a boost converter; and
if the phase angle is a start time for operating in the high activity mode and the second DC voltage is less than or equal to the commanded DC voltage, then operating the switch in the high activity mode including transitioning the switch between the open state and the closed state to boost the second DC voltage of the DC bus to the predetermined DC voltage.

34. The method of claim 23, further comprising:
determining the phase angle of the rectified AC voltage;
if the phase angle is a start time for operating in the inactive mode or the low activity mode, then transitioning to the inactive mode or the low activity mode, wherein if transitioning to the low activity mode, transitioning the switch between the open state and the closed state at a lower frequency than when in the high activity mode; and
if the phase angle is an end time for operating in the inactive mode or the low activity mode, then transitioning to the high activity mode.

35. The method of claim 34, further comprising:
generating a commanded DC voltage based on the rectified AC voltage, a phase angle of the rectified AC voltage, the second DC voltage, or the detected amount of current, wherein the power converter is a buck converter; and
if the phase angle is a start time for operating in the inactive mode or the low activity mode and the second DC voltage is less than or equal to the commanded DC voltage, then transitioning to operating the switch in the inactive mode or the low activity mode.

36. The method of claim 23, further comprising:
determining a peak current level of the detected amount of current;
based on a timer, comparing the peak current level to (i) a maximum current level, and (ii) a minimum current level;
updating an adjustment value based on the (i) comparison between the peak current level and the maximum current level, and (ii) comparison between the peak current level and the minimum current level; and
updating a commanded DC voltage for the DC bus based on the adjustment value.

37. The method of claim 23, further comprising:
determining a peak voltage level of the received AC voltage or the rectified AC voltage;
determining a peak current level of the detected amount of current;
setting a requested voltage to a minimum voltage for the compressor;
setting a temporary voltage equal to the peak voltage level plus an offset value;
based on a timer, determining whether the requested voltage is greater than or equal to the temporary voltage; and
if the requested voltage is greater than or equal to the temporary voltage, setting (i) an adjustment value for a commanded DC voltage equal to 0, and (ii) the commanded DC voltage equal to the requested voltage.

38. The method of claim 23, further comprising:
determining a peak voltage level of the received AC voltage or the rectified AC voltage;
determining a peak current level of the detected amount of current;
setting a requested voltage to a minimum voltage for the compressor;
setting a temporary voltage equal to the peak voltage level plus an offset value;
based on a timer, determining whether the peak current level is greater than a maximum current level; and
if the peak current level is greater than the maximum current level or an adjustment value for a commanded DC voltage is less than 0, setting the adjustment value equal to 0 and the commanded DC voltage equal to the temporary voltage.

39. The method of claim 23, further comprising:
determining a peak voltage level of the received AC voltage or the rectified AC voltage;
determining a peak current level of the detected amount of current;
setting a requested voltage to a minimum voltage for the compressor;
setting a temporary voltage equal to the peak voltage level plus an offset value;
based on a timer, determining whether an adjustment value is greater than a difference between the temporary voltage and the requested voltage;
if the adjustment value for a commanded DC voltage is greater than a difference between the temporary voltage and the requested voltage, setting (i) the adjustment value equal to the difference between the temporary voltage and the requested voltage, and (ii) the commanded DC voltage equal to the requested voltage; and
if the adjustment value for the commanded DC voltage is less than or equal to the difference between the temporary voltage and the requested voltage, setting the commanded DC voltage equal to a difference between the temporary voltage and the adjustment value.

* * * * *